United States Patent
Nakaya et al.

(10) Patent No.: US 9,210,608 B2
(45) Date of Patent: Dec. 8, 2015

(54) COMMUNICATION SYSTEM, CONTROL DEVICE, AND NODE DEVICE

(71) Applicant: FUJITSU LIMITED, Kawasaki-shi, Kanagawa (JP)

(72) Inventors: Yuuta Nakaya, Beijing (CN); Etsuko Katou, Hiratsuka (JP); Yuichi Inao, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 289 days.

(21) Appl. No.: 13/851,406

(22) Filed: Mar. 27, 2013

(65) Prior Publication Data
US 2013/0208598 A1 Aug. 15, 2013

Related U.S. Application Data

(63) Continuation of application No. PCT/JP2010/067010, filed on Sep. 29, 2010.

(51) Int. Cl.
*H04W 28/02* (2009.01)
*H04L 12/729* (2013.01)
*H04W 36/22* (2009.01)
*H04W 40/12* (2009.01)

(52) U.S. Cl.
CPC ......... *H04W 28/0236* (2013.01); *H04L 45/125* (2013.01); *H04W 36/22* (2013.01); *H04W 40/12* (2013.01)

(58) Field of Classification Search
CPC . H04W 28/0236; H04W 40/22; H04W 72/04; H04W 84/18
See application file for complete search history.

(56) References Cited

U.S. PATENT DOCUMENTS

2007/0195702 A1 8/2007 Yuen et al.

FOREIGN PATENT DOCUMENTS

| JP | 2005-510956 | 4/2005 |
|---|---|---|
| JP | 2006-203322 | 8/2006 |
| JP | 2007-221790 | 8/2007 |
| JP | 2008-172283 | 7/2008 |
| JP | 2008-532350 | 8/2008 |

(Continued)

OTHER PUBLICATIONS

Communication System and Communication Method, Applicant: Mitsubishi Electric Corp, Inventor: Kosaka Tetsuya, Nagai Yukimasa, Asahara Takashi, Hori Toshinori, Date of Publication: Mar. 4, 2010.*

(Continued)

*Primary Examiner* — Andrew Lai
*Assistant Examiner* — Leon Andrews
(74) *Attorney, Agent, or Firm* — Staas & Halsey LLP

(57) ABSTRACT

A wireless communication system is provided. A control device includes: a receiver configured to be able to receive information from radio frequency channels; a processor that judges whether a first channel is congested, and generates switchover instruction information when the first channel is judged to be congested; and a transmitter that transmits the switchover instruction information. Each node device includes: a receiver that receives information through the first channel; a transmitter that transmits information through a transmission channel; and a processor that recognizes whether a hop count from the control device is one, selects a second channel and specifies it as the transmission channel in a first case in which the receiver receives the switchover instruction information from the control device and the hop count is recognized as one, and specifies the first channel as the transmission channel in a second case in which the first case does not hold.

10 Claims, 17 Drawing Sheets

(56) References Cited

FOREIGN PATENT DOCUMENTS

| JP | 2008-219526 | 9/2008 |
|----|----|----|
| JP | 2010-50904 | 3/2010 |
| WO | WO 03/047175 A1 | 6/2003 |
| WO | WO 2006/083565 A2 | 8/2006 |

OTHER PUBLICATIONS

Japanese Office Action issued Jun. 25, 2013 in corresponding Japanese Application No. 2012-536070.

Japanese Office Action mailed Sep. 10, 2013 in corresponding Japanese Application No. 2012-536070.

International Search Report of PTC/JP2010/067010 mailed Jan. 11, 2011.

A. Raniwala et al., "Architecture and Algorithms for an IEEE 802.11-Based Multi-Channel Wireless Mesh Network", $24^{th}$ IEEE INFOCOM 2005, IEEE, Mar. 2005, pp. 2223-2234.

PCT International Preliminary Report on Patentability mailed Apr. 25, 2013 in corresponding International Application No. PCT/JP2010/067010.

* cited by examiner

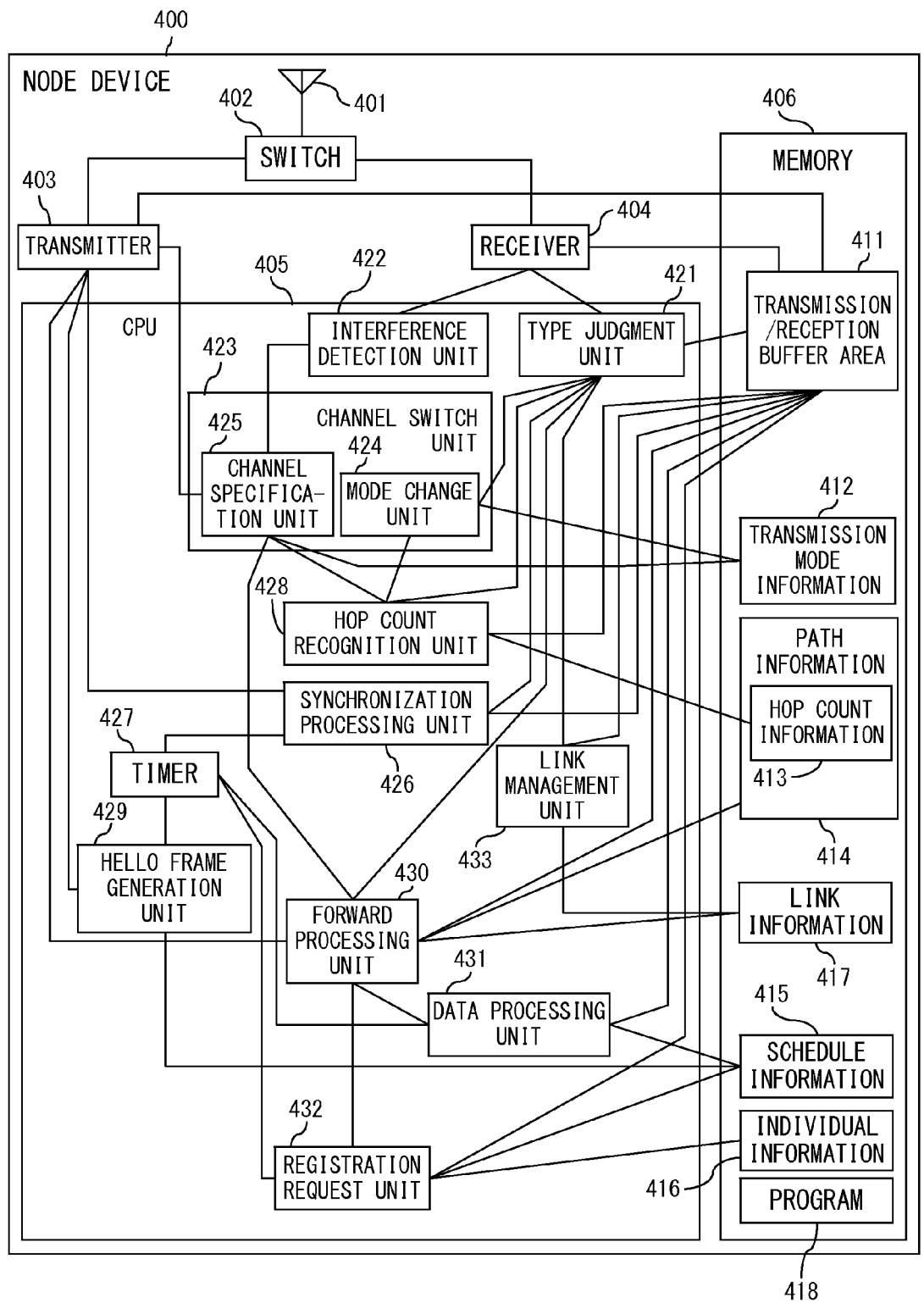
F I G. 3

314a

| NODE ID | IP ADDRESS | MAC ADDRESS | DATA RECEPTION TIME | REGISTRATION TIME | 1 HOP |
|---|---|---|---|---|---|
| ID111 | 172.16.0.111 | 00:00:0E:11:22:6F | 2010-09-29T15:00:00.723 | 2010-09-29T09:30:06.208 | True |
| ID112 | 172.16.0.112 | 00:00:0E:11:22:70 | 2010-09-29T15:00:01.084 | 2010-09-29T12:46:30.159 | True |
| ... | ... | ... | ... | ... | ... |
| ID125 | 172.16.0.125 | 00:00:0E:11:22:7D | 2010-09-29T15:00:04.529 | 2010-09-29T13:05:37.803 | False |
| ID126 | 172.16.0.126 | 00:00:0E:11:22:7E | 2010-09-29T15:00:12.482 | 2010-09-29T12:58:51.002 | False |
| ... | ... | ... | ... | ... | ... |
| ID132 | 172.16.0.132 | 00:00:0E:11:22:84 | 2010-09-29T15:00:35.247 | 2010-09-28T19:30:06.208 | False |
| ... | ... | ... | ... | ... | ... |

FIG. 4

FIG. 5

412a

| TRANSMISSION MODE INFORMATION | NORMAL MODE/ CONGESTION MODE |
|---|---|

414a

| GD | LD | EVALUATION VALUE | HOP COUNT |
|---|---|---|---|
| ID101 | ID101 | 0.0 | 1 |
| ID101 | ID111 | 0.7 | 2 |
| ⋮ | ⋮ | ⋮ | ⋮ |

414b

| GD | LD | EVALUATION VALUE | HOP COUNT |
|---|---|---|---|
| ID101 | ID112 | 0.0 | 2 |
| ID101 | ID122 | 0.9 | 3 |
| ⋮ | ⋮ | ⋮ | ⋮ |

415a

| DATA TRANSMISSION SCHEDULE | AT 15:00:00.000 EVERY DAY |
|---|---|
| HELLO FRAME TRANSMISSION SCHEDULE | EVERY MINUTE AT 2.000 SEC. AFTER THE MINUTE |
| REGISTRATION REQUEST SCHEDULE | AT 10:30:25.000 EVERY DAY |

416a

| ITEM NAME | VALUE |
|---|---|
| NODE ID | ID123 |
| IP ADDRESS | 172.16.0.123 |
| MAC ADDRESS | 00:00:0E:11:22:7B |

417a

| ADJACENT NODE |
|---|
| ID111 |
| ID112 |
| ID122 |
| ID133 |
| ID134 |

F I G. 7

| | | | | | 640 | |
|---|---|---|---|---|---|---|
| Invalid | GS | BC | LS | Hello | RESTORE INSTRUCTION | FCS |

| | | | | | 641 | |
|---|---|---|---|---|---|---|
| Invalid | ID101 | BC | ID101 | Hello | Restore | FCS |

| | | | | | 650 | |
|---|---|---|---|---|---|---|
| Invalid | GS | BC | LS | Sync | TIME INFORMATION | FCS |

| | | | | | 651 | |
|---|---|---|---|---|---|---|
| Invalid | ID101 | BC | ID101 | Sync | 2010-09-29T13:09:32.045 | FCS |

| | | | | | 660 | | |
|---|---|---|---|---|---|---|---|
| GD | GS | LD | LS | Data | LENGTH | APPLICATION DATA | FCS |

| | | | | | 661 | | |
|---|---|---|---|---|---|---|---|
| ID101 | ID142 | ID126 | ID139 | Data | 250 | DATA DETECTED BY SENSOR | FCS |

| | | | | | 670 | | |
|---|---|---|---|---|---|---|---|
| GD | GS | LD | LS | Reg | IP ADDRESS | MAC ADDRESS | FCS |

| | | | | | 671 | | |
|---|---|---|---|---|---|---|---|
| ID101 | ID137 | ID113 | ID125 | Reg | 172.16.0.137 | 00:00:0E:11:22:89 | FCS |

F I G. 9

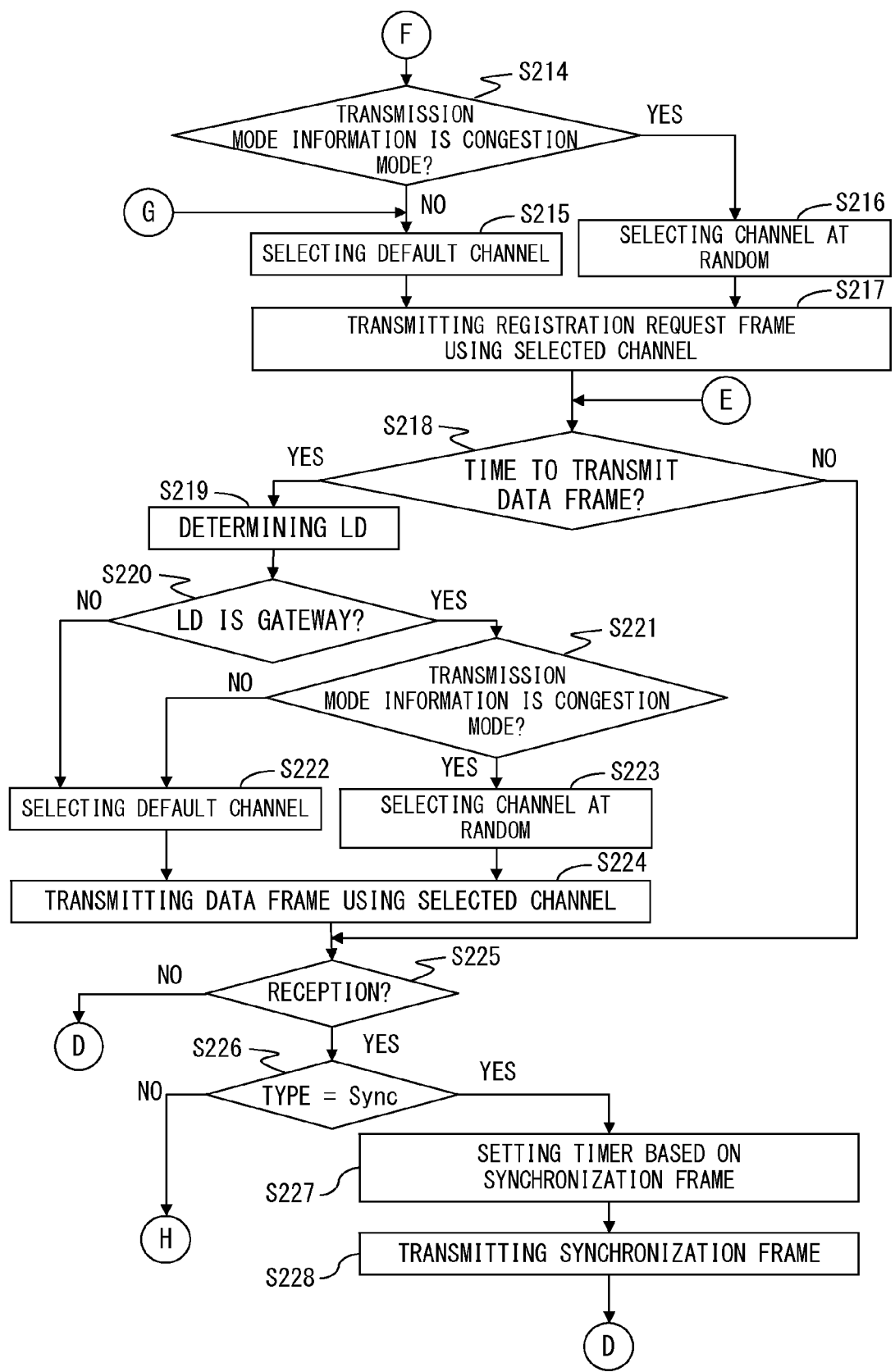
F I G. 14

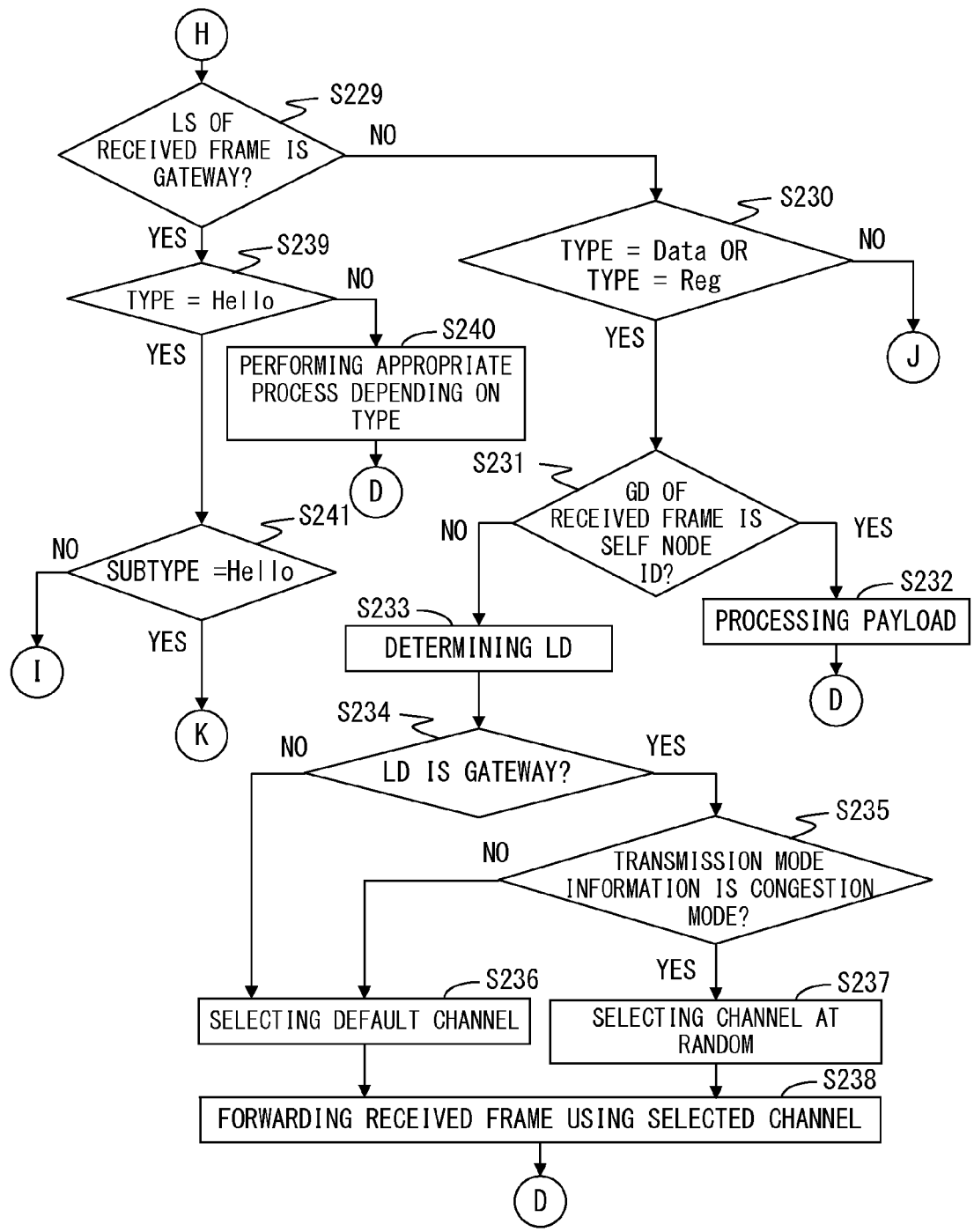
F I G. 1 5

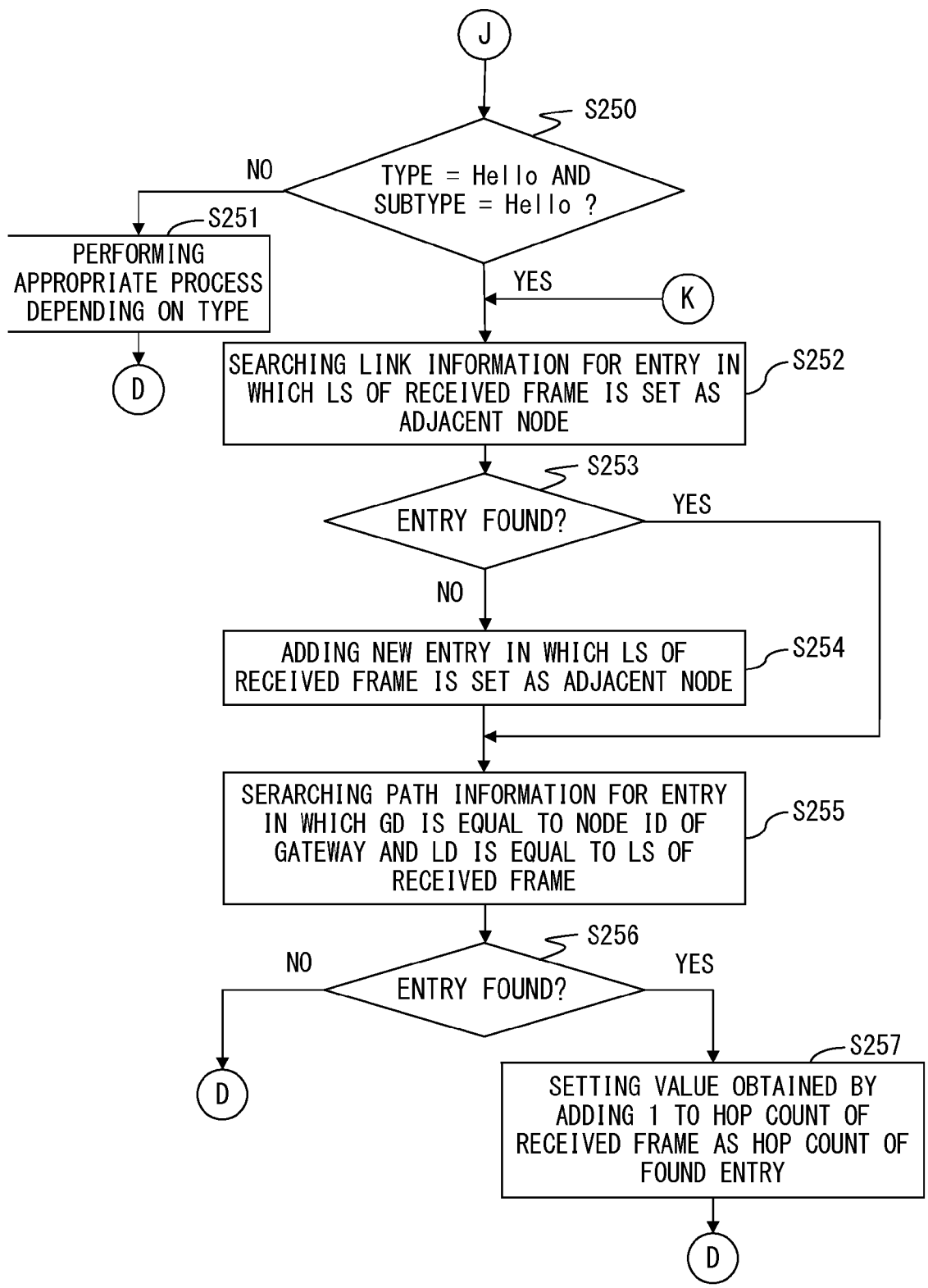
F I G. 1 7

COMMUNICATION SYSTEM, CONTROL DEVICE, AND NODE DEVICE

CROSS-REFERENCE TO RELATED APPLICATIONS

This application is a continuation application of International Application PCT/JP2010/067010 filed on Sep. 29, 2010 and designated the U.S., the entire contents of which are incorporated herein by reference.

FIELD

The embodiments discussed herein are related to wireless communication technology.

BACKGROUND

There have been various studies about the technology relating to a multihop data transmission in a wireless communication network including a plurality of communication node devices.

For example, the following method has been proposed as a method of selecting a path for transmitting a data packet between the nodes of an ad hoc network. The method includes; a step of determining the standards representing a link stability between the nodes in a network; and a step of starting a path detecting procedure for generating a plurality of candidate transmission paths between a source node and a destination node. The method further includes a step of selecting a transmission path from among a plurality of candidate paths based on the standard of anode relating to each candidate path. The standard may also be defined as a link time (that is, the length of time in which a node maintains a link to an adjacent node).

There is also the technology proposed for satisfying the following conditions even when the number of access points or mobile terminals which may be accommodated in a multihop wireless communication network increases.

The configuration is simple.

The cost does not go up greatly.

The deterioration of throughput characteristic is prevented, thereby improving the communication performance.

Practically, in the proposed technology, the wireless transmission for relay and the wireless reception for relay are performed in one base station for wireless communication using different interfaces and channels of different frequencies. Then, the channel for the interface used in the wireless transmission for relay may be dynamically adjusted to the channel of the frequency in the receiving interface used in the base station for wireless communication of the receiver.

Some documents including Japanese Laid-open Patent Publication No. 2007-221790, Japanese Laid-open Patent Publication No. 2008-172283, etc. are well known.

SUMMARY

A wireless communication system including a control device and a plurality of node devices is provided.

The control device includes a first receiver configured to be able to receive information simultaneously from a plurality of radio frequency channels. The control device further includes a first processor. The first processor judges whether a first channel in the plurality of radio frequency channels is congested. The first processor generates switchover instruction information to instruct at least one of the plurality of node devices to switch a transmission channel from the first channel to another channel, when the first channel is judged to be congested. The control device further includes a first transmitter that transmits the switchover instruction information.

Each of the plurality of node devices includes a second receiver that receives information from the control device or another node device through the first channel. Each of the plurality of node devices further includes a second transmitter that transmits information addressed to the control device through a channel specified as the transmission channel in the plurality of radio frequency channels. Each of the plurality of node devices further includes a second processor. The second processor recognizes whether a hop count from the control device is one. The second processor selects a second channel other than the first channel in a first case in which the second receiver receives the switchover instruction information from the control device and the hop count is recognized as one. The second processor specifies the second channel as the transmission channel for the second transmitter in the first case. The second processor specifies the first channel as the transmission channel for the second transmitter in a second case in which the first case does not hold.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates a configuration of a node device;

FIG. 4 is an example of registered node information;

FIG. 5 illustrates examples of system parameters and congestion information;

FIG. 7 illustrates examples of transmission mode information, path information, schedule information, individual information, and link information;

FIG. 9 is a view (No. 2) of an example of a frame;

FIG. 14 is a flowchart (No. 2) of the process performed by the node device;

FIG. 15 is a flowchart (No. 3) of the process performed by the node device;

FIG. 17 is a flowchart (No. 5) of the process performed by the node device.

DESCRIPTION OF EMBODIMENTS

Figure 1:
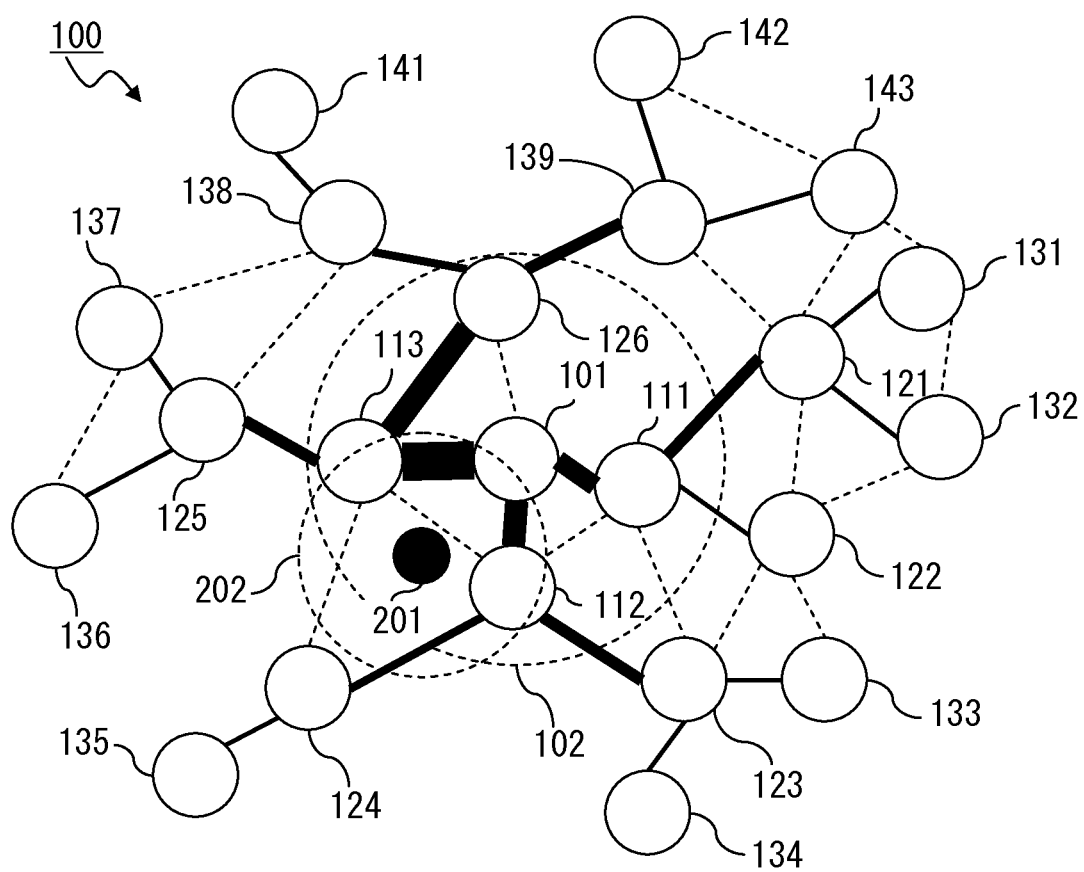
FIG. 1 illustrates a network topology of the communication system according to an embodiment.

In a certain kind of a wireless communication system, a number of node devices transmit information to a specific device. Then, since communications are concentrated in the range of one hop from the specific device, there easily occurs congestion there.

In addition, there may be a case in which there are first and second node devices within one-hop range from a specific device and the first and second node devices receive no radio signals transmitted from each other. In this case, there may occur a hidden node problem between the first and second node devices with the specific device interposed. The hidden node problem between the first and second node devices may cause or deteriorate the congestion within one-hop range from the specific device.

One of the measures to prevent or reduce the congestion is to use a plurality of radio frequency channels. However, the radio frequency channels are finite resources. Therefore, it is not preferable to use infinitely the radio frequency channels. It is preferable that the radio frequency channels are efficiently used.

Therefore, in the embodiments described below, the wireless communication system is aimed at realizing both reduced congestion and an efficient use of radio frequency channels.

In detail as described below, the communication system according to an aspect of an embodiment includes a control device and a plurality of node devices.

The control device includes a first receiver, a first processor, and a first transmitter. The first receiver is configured so that first receiver is able to receive information simultaneously from a plurality of radio frequency channels. The first processor judges whether or not a first channel in the plurality of radio frequency channels is congested. When the first processor judges that the first channel is congested, the first processor generates switchover instruction information. The switchover instruction information is a kind of information to instruct at least one of the plurality of node devices to switch a transmission channel from the first channel to another channel. The first transmitter transmits the switchover instruction information.

Each of the plurality of node devices includes a second receiver, a second transmitter, and a second processor. The second receiver receives information through the first channel from the control device or another node device. The second transmitter transmits information addressed to the control device through a channel specified as the transmission channel among the plurality of radio frequency channels. The second processor recognizes whether or not the hop count from the control device is one.

Let a "first case" stand for the case in which the second receiver receives the switchover instruction information from the control device and the second processor recognizes that the hop count is one. In the first case, the second processor selects a second channel other than the first channel, and specifies the second channel as the transmission channel for the second transmitter. In a second case other than the first case, the second processor specifies the first channel as the transmission channel for the second transmitter.

When the second transmitter of each of the plurality of node devices in the communication system transmits the information addressed to the control device through the first channel, the first channel may be congested in the range of 1 hop from the control device.

If the congestion occurs, the switchover instruction information is generated. Therefore, the second processor of each node device whose hop count from the control device is one performs the operation of the first case. Accordingly, the second transmitter of each node device whose hop count from the control device is one transmits the information addressed to the control device through the second channel as described above.

Even when there are a plurality of node devices whose hop count from the control device is one, the second processor of each of these node devices individually selects each second channel. Therefore, when there are a plurality of node devices whose hop count from the control device is one, the respective second channels are not always identical to each other for these node devices.

By using a plurality of different second channels, the communication load is distributed to the plurality of second channels, thereby reducing or solving the congestion. Furthermore, the hidden node problem, which may occur with the interposed control device, may be solved in many cases. This is because each node device having the hop count of one from the control device independently selects its second channel. The solution of the hidden node problem contributes to the reduction or solution of the congestion.

According to the communication system above, if the first processor of the control device does not judge that the first channel is congested, the second processor of each node device performs the operation of the second case regardless of the hop count from the control device. Therefore, channels other than the first channel are not excessively used when no congestion occurs, thereby realizing an efficient use of radio frequency channels.

The embodiments are further described below in detail with reference to the attached drawings. The order of the descriptions is set as follows.

First, the outline of the communication system according to an embodiment is described with reference to FIG. 1. Next, the configurations of the gateway and the node device included in the communication system in FIG. 1 are described with reference to FIGS. 2 and 3. Then, various types of information used by a gateway and a node device are described below with reference to FIGS. 4 through 7. Various frames transmitted and received in the communication system are described next with reference to FIGS. 8 and 9. Then, with reference to the flowcharts in FIGS. 10 through 17, the operations of the gateway and the node device are described. Finally, the embodiments other than those illustrated in FIGS. 1 through 17 are described.

FIG. 1 illustrates the network topology of the communication system according to an embodiment. A communication system 100 in FIG. 1 is a wireless communication system including one gateway 101 and a plurality of node devices 111 through 143. The network in FIG. 1 configured by the gateway 101 and the node devices 111 through 143 may be a wireless ad hoc network.

Each of the gateway 101 and the node devices 111 through 143 corresponds to a node in a network topology, and is expressed by a circle in FIG. 1. The link between the nodes capable of performing communications in one hop is expressed by a solid or broken straight line in FIG. 1.

Concretely, in the communication system 100 according to the present embodiment, the gateway 101 collects data from each of the node devices 111 through 143. That is, each of the node devices 111 through 143 transmits the data addressed to the gateway 101. The solid straight line in FIG. 1 indicates the link actually used in collecting data (that is, the wireless link through which the collected data is transmitted).

For example, the data transmitted by the node device 111 is directly received by the gateway 101. The data transmitted by the node device 121 is received by the gateway 101 through the node device 111. Therefore, in FIG. 1, the link between the gateway 101 and the node device 111, and the link between the node device 111 and the node device 121 are indicated by the solid lines.

The collected data may be arbitrary data. For example, each of the node devices 111 through 143 may be connected to a sensor, and the data detected by the sensor may be transmitted addressed to the gateway 101.

In the communication system 100, various types of control information are also transmitted. The link represented by the broken straight line in FIG. 1 is a link between the nodes capable of communicating with each other physically in one hop, but is not used in collecting data.

For example, in the present embodiment, the node device 126 is in a communication-enabled area 102 in which the device may physically communicate with the gateway 101 in one hop. Therefore, the node device 126 may exchange control information (for example, a hello frame described later) with the gateway 101.

However, when the node device 126 addresses the data other than the control information (for example, the data detected by the above-mentioned sensor) to the gateway 101, the gateway 101 is not specified as a destination directly. Instead, the node device 126 specifies the gateway 101 as a final destination, and specifies the node device 113 as a direct destination in the first hop, thereby transmitting the data. Therefore, the data transmitted from the node device 126 is received by the gateway 101 through the node device 113.

Therefore, in FIG. 1, the node device 126 is connected to the node device 113 by the solid line, and is connected to the gateway 101 by the broken line. In FIG. 1, other links are similarly indicated by the solid or broken lines depending on whether or not the gateway 101 is actually used in transmitting the data as a final destination.

Accordingly, in FIG. 1, the data reaches the gateway 101 in one hop from the node devices 111 through 113, the data reaches the gateway 101 in two hops from the node devices 121 through 126, the data reaches the gateway 101 in 3 hops from the node devices 131 through 139, and the data reaches the gateway 101 in 4 hops from the node devices 141 through 143.

For simple explanation in the descriptions below, the final destination in the communication system 100 may be referred to as a "GD (global destination)", the direct destination in the first hop may be referred to as an "LD (local destination)", the entire source in the communication system 100 may be referred to as a "GS (global source)", and the source of the communication in one hop between adjacent node devices may be referred to as a "LS (local source)".

For example, when data is multihop-transmitted from the node device 122 to the gateway 101 through the node device 111, the GS is constantly the node device 122, and the GD is constantly the gateway 101. However, the LS and the LD change in each hop. That is, in the transmission from the node device 122 to the node device 111, the LS is the node device 122, and the LD is the node device 111. On the other hand, in the transmission from the node device 111 to the gateway 101, the LS is the node device 111 and the LD is the gateway 101.

The thickness of the solid straight line in FIG. 1 indicates the amount of data transmitted through the link indicated by the straight line. The larger the amount of data, the thicker the straight line is. That is, the heavier the load of the link, the thicker the straight line becomes.

For example, the straight line indicating the link between the node device 123 and the node device 112 is thicker than the straight line indicating the link between the node device 133 and node device 123. Likewise, the straight line indicating the link between the node device 112 and the gateway 101 is thicker than the straight line indicating the link between the node devices 123 and 112 for the following reason.

The data addressed to the gateway 101 by the node device 133 reaches the gateway 101 through the node devices 123 and 112. That is, the node device 123 receives the data from the node device 133, and relays the data to the node device 112. Furthermore, the node device 123 relays the data received from the node device 134 to the node device 112, and functions as a GS to transmit the data using the gateway 101 as a GD to the node device 112.

Accordingly, the amount of data transmitted through he link between the node device 123 and 112 is larger than the amount of data transmitted through the link between the node devices 133 and 123. Therefore, in FIG. 1, the straight line indicating the link between the node devices 123 and 112 is thicker than the straight line indicating the link between the node devices 133 and the 123.

Similarly, the amount of data transmitted through the link between the node device 112 and the gateway 101 is larger than the amount of data transmitted through the link between the node devices 123 and 112. Therefore, the straight line indicating the link between the node device 112 and the gateway 101 is thicker than the straight line indicating the link between the node devices 123 and 112.

As described above, in the present embodiment in which the gateway 101 collects data from each of the node devices 111 through 143 in the communication system 100, the load of the link between the gateway 101 and each of the node devices 111 through 113 in the first hop from the gateway 101 is heavy. Therefore, the point where congestion occurs the most easily in the communication system 100 is the link between the gateway 101 and each of the node devices 111 through 113 in the first hop.

In addition, in the link between the gateway 101 and each of the node devices 111 through 113 in the first hop, not only the level of the load may directly causes the congestion, but also the congestion may be caused by a hidden node problem.

For example, the node device 111 is not placed in the position where the node device 111 may receive the radio waves from the node device 113. Therefore, when the node device 113 is transmitting data to the gateway 101, the node device 111 is not capable of recognizing that the node device 113 is communicating with the gateway 101.

Therefore, when the node device 113 is transmitting data to the gateway 101, the node device 111 may start transmitting data addressed to the gateway 101. As a result, there may occur a collision on the gateway 101. As a result of the collision, the data is retransmitted, and the load of the link between the gateway 101 and the node device 111, and the load of the link between the gateway 101 and the node device 113 may become further heavier.

On the other hand, for example, the load of the link between the node device 141 in the fourth hop from the gateway 101 and the node device 138 in the third hop from the gateway 101 is small. Therefore, the congestion hardly occurs in the link.

By considering the difference in possibility of occurrence of congestion, the present embodiment aims at solving the congestion by distributing the load to a plurality of radio frequency channels in the range in which communications are concentrated, and avoiding the consumption of excess radio frequency channels outside the range. In the description below, the "radio frequency channel" is referred to simply as a "channel".

The details are described later, but in the present embodiment, each device in the communication system 100 normally performs communications using the same channel predetermined as a default channel. Therefore, the communication system 100 does not unnecessarily use channels as limited resources, thereby hardly causing a disturbance on other wireless communication systems.

However, as described above, in the communication system 100, the possibility of an occurrence of congestion is not constant. Concretely, the congestion easily occurs especially in the range in which the hop count from the gateway 101 is 1.

Then, according to the present embodiment, although the details are described later, the gateway 101 monitors whether or not the congestion has occurred. Then, upon detection of the congestion, the gateway 101 instructs the node devices 111 through 113 in the range of one hop to switch the channel to be used in transmitting data to the gateway 101 from the default channel to another channel.

Then, according to the instruction, the node devices 111 through 113 switch the channels, thereby distributing the communication load to a plurality of channels. As a result of the distribution of the load, the congestion may be moderated or relieved.

In the example in FIG. 1, since the node device 126 at the second hop from the gateway 101 is positioned within the communication-enabled area 102, the node device 126 is able to receive an instruction transmitted from the gateway 101. However, the node device 126 judges "the node device 126 itself is not in the range of one hop from the gateway 101", and does not switch the channels. In addition, the node device positioned outside the communication-enabled area 102 such as the node device 123 does not switch the channels.

Therefore, all node devices 111 through 143 other than the gateway 101 only have to include a receiver which performs communications through a default channel, and do not have to include a plurality of receivers. According to the present embodiment, the node devices 111 through 143 other than the gateway 101 may be produced at low cost.

Then, in the communication system 100, the number of node devices 111 through 143 other than the gateway 101 is much larger than the number of the gateway 101. Therefore, the reduction of the production cost of the node devices 111 through 143 other than the gateway 101 largely contributes to the reduction of the initial cost of the entire communication system 100.

Furthermore, upon detection of the relief from the congestion, it is preferable that the gateway 101 instructs the node devices 111 through 113 in the first hop to return the transmission channel to the gateway 101 to the default channel because, in the state in which there is no congestion, it is preferable that the use of the channels which are finite resources is suppressed, and the disturbance on the external wireless system not illustrated in FIG. 1 is suppressed.

As exemplified in FIG. 1, there may be an interference source 201 near the gateway 101. The interference source 201 may be, for example, a terminal of another wireless communication system, or a device such as an microwave oven.

Then, for example, an interference area 202 which is subject to the influence of the interference from the interference source 201 may include the gateway 101, the node device 112, and the node device 113. For example, when the existence of the interference source 201 is detected, the gateway 101 may notify the node devices 111 through 113 to avoid the frequency of the radio wave from the interference source 201 when an instruction to switch the channels to the node devices 111 through 113 is issued.

Figure 2:
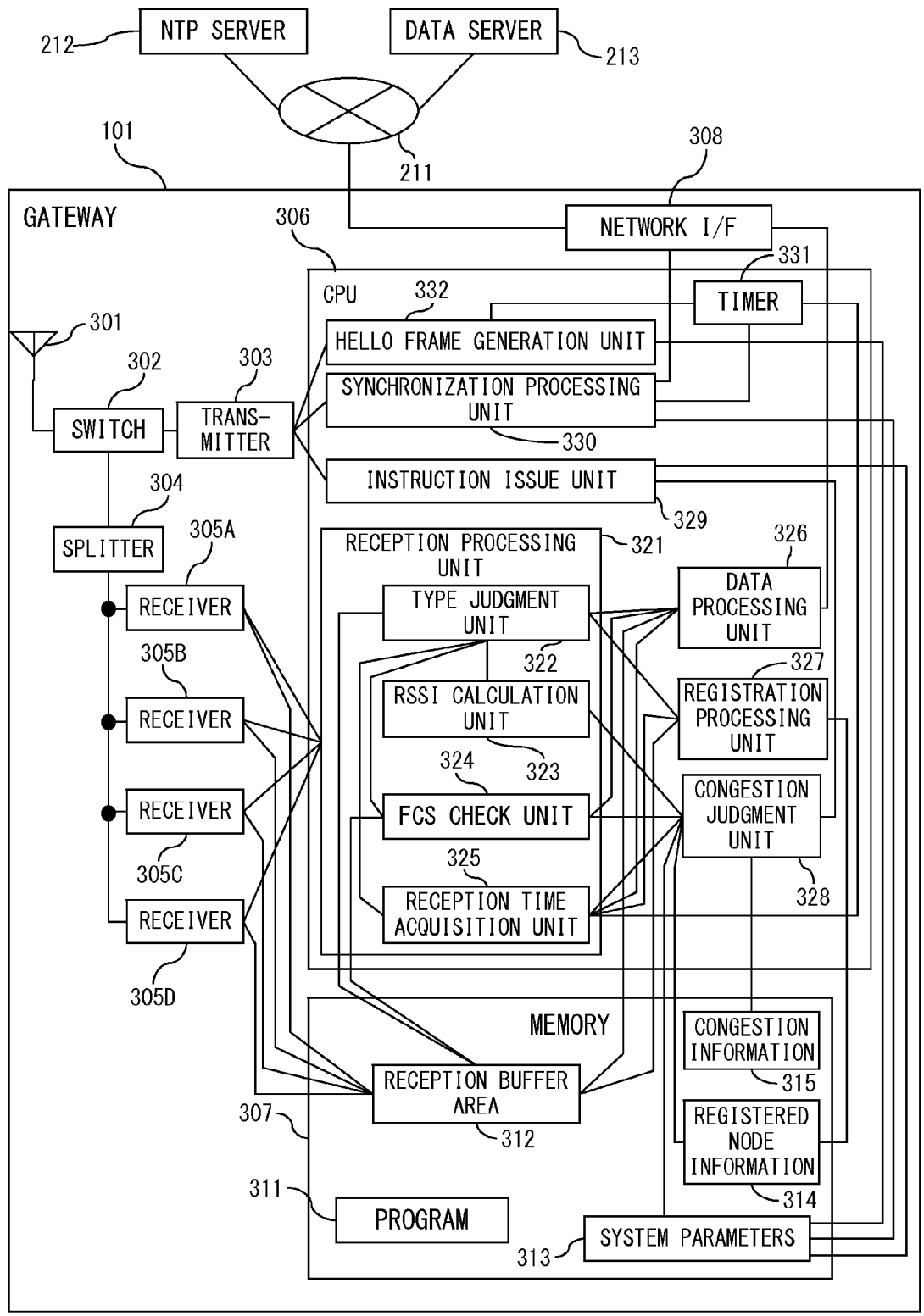
FIG. 2 illustrates a configuration of a gateway.

FIG. 2 is a configuration of the gateway 101. FIG. 2 also illustrates the connection of the gateway 101 to other devices.

As illustrated in FIG. 2, the gateway 101 is connected to a network 211 independent of the network of the communication system 100 illustrated in FIG. 1. The network 211 is, for example, a cable LAN (local area network), a wireless LAN and WAN (wide area network), and the Internet, or a combination of them.

The gateway 101 is connected to an NTP (network time protocol) server 212 and a data server 213 through the network 211. Depending on the embodiment, the gateway 101 may also function as the NTP server 212, or the data server 213.

The gateway 101 performs a time synchronizing process by communicating with the NTP server 212. In addition, the gateway 101 transmits the data collected from the node devices 111 through 143 in the communication system 100 to the data server 213. The data server 213 accumulates the data received from the gateway 101, and performs an appropriate process depending on the embodiment using the accumulated data.

Furthermore, the gateway 101 has an antenna 301, a switch 302, a transmitter 303, a splitter 304, and a plurality of receivers 305A through 305D corresponding to a plurality of different channels as the hardware for the communication with the node device in the communication system 100. The gateway 101 further includes a CPU (central processing unit) 306 for performing various processes, memory 307 for storing various types of information, and a network I/F (interface) 308 for communications through the network 211.

The gateway 101 according to the present embodiment switches between transmission and reception depending on the time by the time division duplex (TDD) system. Concretely, the antenna 301 is used for both of transmission and reception. The switch 302 is a device for switching between transmission and reception. That is, the switch 302 connects the transmitter 303 with the antenna 301 so that the gateway 101 may perform a transmission depending on the time, or connects the splitter 304 to the antenna 301 so that the gateway 101 may perform a reception.

For convenience of explanation in the description below, the four channels used in the communication system 100 are defined as channels ChA through ChD, and the channel ChA is defined as a default channel.

The transmitter 303 is a device for performing a transmission through the channel ChA, and includes a modulator, a D/A (digital-to-analog) converter, etc. The splitter 304 is a device for splitting a signal received by the antenna 301 for each channel.

The receiver 305A receives a signal of the channel ChA split by the splitter 304, and includes a demodulator, an A/D (analog-to-digital) converter, etc. Similarly, the receiver 305B is a device for receiving a signal of the channel ChB split by the splitter 304, and includes a demodulator, an A/D converter, etc.

In addition, the receiver 305C is a device for receiving a signal of the channel ChC split by the splitter 304, and includes a demodulator, an A/D converter, etc. The receiver 305D is a device for receiving a signal of the channel ChD split by the splitter 304, and includes a demodulator, an A/D converter, etc.

Since the gateway 101 includes the splitter 304 and the receivers 305A through 305D as described above, the signals of the four channels ChA through ChD may be simultaneously received. In addition, according to the present embodiment, the gateway 101 includes the four receivers 305A through 305D as described above, the number of receivers included in the gateway 101 is arbitrary depending on the embodiments.

The memory 307 includes RAM (random access memory) used as a work area and a non-volatile memory device. The non-volatile memory device may be, for example, ROM (read only memory), flash memory, etc. Furthermore, the non-volatile memory device may be a combination of a computer-readable storage medium and a drive device of a storage medium. An example of the storage medium may be a semiconductor memory card, a magnetic disk such as a hard disk, etc., an optical disk such as a CD (compact disk) and a DVD (digital versatile disk), etc., and a magneto optical disk.

The memory 307 stores a program 311 executed by the CPU 306. Concretely, the program 311 is stored in a non-volatile memory device. The program 311 may be pre-installed in the non-volatile memory device, or downloaded from the network 211 to the non-volatile memory device. Then, the program 311 is read by the CPU 306 from the non-volatile memory device, loaded on the RAM, and executed.

Furthermore, the program 311 is, for example, a firmware program for control of the gateway 101 by the CPU 306. The CPU 306 functions as each unit illustrated in FIG. 2 and described later by executing the program 311.

A part of the memory 307 (for example, a part of RAM) is used as a reception buffer area 312. That is, each of the receivers 305A through 305D outputs a received frame to the reception buffer area 312. The "frame" refers to a PDU (protocol data unit) used according to the present embodiment.

In the present embodiment, information is transmitted and received in the communication system 100 in the PDU format of a protocol. The above-mentioned "protocol" may be arbitrarily defined based on the embodiment. A concrete example of a frame format is described later with reference to FIGS. 8 and 9.

In addition, a well-known protocol may be available as a protocol of a lower order layer than the layer in which the frame of the present embodiment is defined. For example, as a protocol of a physical layer and a MAC (media access control) sublayer, the protocol of an IEEE (Institute of Electrical and Electronics Engineers) 802.11 series or 802.15 series may be used.

The memory 307 further stores system parameters 313 exemplified in FIG. 5, registered node information 314 exemplified in FIG. 4, and congestion information 315 exemplified in FIG. 5. The system parameters 313 are stored in the non-volatile memory device in the memory 307, and copied on the RAM as appropriate. It is preferable that the registered node information 314 and the congestion information 315 are stored on the RAM.

The system parameters 313 include a constant(s) etc. for defining the operation of the communication system 100. The registered node information 314 is the information about the node device in the communication system 100 for transmitting data to the gateway 101. The congestion information 315 indicates whether or not the gateway 101 has detected the congestion in the range of one hop from the gateway 101.

Although described later in detail, the node devices 111 through 113 do not transmit a frame using a channel other than the default channel ChA unless the gateway 101 detects congestion. Therefore, if the CPU 306 refers to the congestion information 315, and the congestion information 315 indicates that no congestion has been detected, then the power supply to the receivers 305B through 305D may be stopped. Thus, the power saving of the gateway 101 is realized.

The CPU 306 operates as a reception processing unit 321 by executing the program 311. As illustrated in FIG. 2, the reception processing unit 321 includes a type judgment unit 322, an RSSI (received signal strength indicator) calculation unit 323, an FCS (frame check sequence) check unit 324, and a reception time acquisition unit 325.

The CPU 306 also operates as a data processing unit 326, a registration processing unit 327, a congestion judgment unit 328, an instruction issue unit 329, a synchronization processing unit 330, and a hello frame generation unit 332 by executing the program 311. Furthermore, the CPU 306 includes a timer 331 as a hardware circuit.

Concretely, upon receipt of a frame, the receivers 305A through 305D output the received frame to the reception buffer area 312, and notifies the reception processing unit 321 of the reception of the frame. Upon receipt of the notification, the reception processing unit 321 performs various processes. Since the notification from the receivers 305A through 305D to the reception processing unit 321 includes the starting address (i.e., head address) of the frame in the reception buffer area 312, the reception processing unit 321 is able to read the value of an appropriate field in the frame if desired from the reception buffer area 312.

That is, the type judgment unit 322 reads the type of the received frame from the reception buffer area 312. Then, the type judgment unit 322 requests the RSSI calculation unit 323, the FCS check unit 324, the reception time acquisition unit 325, the data processing unit 326, and the registration processing unit 327 to perform the process depending on the type. An example of the type used in the present embodiment is described later with reference to FIGS. 8 and 9.

Furthermore, upon receipt of the request from the type judgment unit 322, the RSSI calculation unit 323 calculates the RSSI, and outputs the calculated RSSI to the congestion judgment unit 328. The RSSI calculation unit 323 may receive a parameter indicating the reception power from the receivers 305A through 305D and calculate the RSSI. The concrete method of calculating the RSSI is arbitrary depending on the embodiment, and the RSSI calculation unit 323 may use the well-known method of calculating the RSSI.

Upon receipt of the request from the type judgment unit 322, the FCS check unit 324 reads a frame from the reception buffer area 312, and calculates the FCS from the bit string of each field used in the calculation of the FCS. Then, the FCS check unit 324 compares the value of the FCS field included in the read frame with the value of the calculated FCS, and judges whether or not the two values match each other.

When the two values match each other, it is assumed that the received frame does not include an error. On the other hand, if the two values do not match each other, the received frame includes an error such as bit inversion etc. Then, the FCS check unit 324 outputs to the data processing unit 326 a judgment result as to whether or not the two values match each other. The FCS check unit 324 also calculates an error rate in a plurality of recently received frames, and outputs the calculated error rate to the congestion judgment unit 328.

Upon receipt of the request from the type judgment unit 322, the reception time acquisition unit 325 refers to a timer 331 and acquires the current time. It is assumed that the acquired current time is the reception time of the frame approximately in the present embodiment. Then, the reception time acquisition unit 325 outputs the acquired reception time to the data processing unit 326, the registration processing unit 327, and the congestion judgment unit 328.

Upon receipt of the request from the type judgment unit 322, the data processing unit 326 processes the data included in the received frame.

For example, the data processing unit 326 may read from the reception buffer area 312 the frame which is confirmed as not including an error as the judgment result output from the FCS check unit 324. Then, the data processing unit 326 may process the data of the read frame as appropriate, and transmit the processed data to the data server 213 through the network I/F 308 and the network 211. An example of the process is addition of the reception time output from the reception time acquisition unit 325, format conversion, compression, or encryption, etc.

If the judgment result output from the FCS check unit 324 indicates "the received frame includes an error", the data processing unit 326 may delete the received frame from the reception buffer area 312. In addition, when the received frame includes an error, the data processing unit 326 may generate a control frame for a request to retransmit a frame, and transmit the control frame through the transmitter 303 depending on the embodiment.

In addition, upon receipt of a request from the type judgment unit 322, the registration processing unit 327 reads the value indicating the GS of the received frame from the reception buffer area 312. Then, the registration processing unit 327 associates the value indicating the GS with the reception time output from the reception time acquisition unit 325, and stores the value in the registered node information 314.

Furthermore, the congestion judgment unit 328 judges whether or not there has occurred congestion in the range of the hop count of 1 from the gateway 101 according to the output from each of the RSSI calculation unit 323, the FCS check unit 324, and the reception time acquisition unit 325, and the system parameters 313. The details of the judgment by the congestion judgment unit 328 are described later with reference to the flowcharts in FIG. 10 through 12. The congestion judgment unit 328 overwrites the congestion information 315 with the judgment result.

Additionally, when the congestion judgment unit 328 detects the congestion, it notifies the instruction issue unit 329 of the detection of the congestion. Then, the instruction issue unit 329 generates switchover instruction information to instruct the node devices (the node devices 111 through 113 in the example in FIG. 1) in the range of one hop from the gateway 101 to switch the transmission channel to the gateway 101. The switchover instruction information is also concretely formatted as a frame. In generating switchover instruction information, the instruction issue unit 329 may refer to the system parameters 313.

The instruction issue unit 329 outputs a frame of the switchover instruction information to the transmitter 303. Then, the frame of the switchover instruction information is transmitted from the transmitter 303 through the switch 302 and the antenna 301, and received by each of the node devices 111 through 113 and 126 in the communication-enabled area 102.

Furthermore, although the details are described later, the congestion judgment unit 328 makes a judgment based on the time in the present embodiment. Therefore, the process of synchronizing the time of each device in the communication system 100 is performed in the present embodiment.

Concretely, the synchronization processing unit 330 accesses the NTP server 212 through the network I/F 308 and the network 211 according to the schedule determined by the system parameter 313 and the current time indicated by the timer 331. Then, the synchronization processing unit 330 corrects the time indicated by the timer 331 according to the NIP.

Furthermore, the synchronization processing unit 330 generates a frame for synchronization in the communication system 100 (hereafter referred to as a "synchronization frame") after correcting the timer 331, and outputs the synchronization frame to the transmitter 303. Then, the synchronization frame is transmitted from the transmitter 303 through the switch 302 and the antenna 301. As described later, the synchronization in the communication system 100 is realized using the synchronization frame. The synchronization frame includes the time information based on the time indicated by the corrected timer 331.

In addition, although the type of a frame is described later, a control frame called a "hello frame" is used according to the present embodiment. One of the functions of the hello frame in the present embodiment is to recognize a device capable of directly communicating in one hop in the communication system 100 (that is, an adjacent device). Furthermore, another function of the hello frame is to enable recognition of the hop count from the gateway 101.

The hello frame generation unit 332 generates a hello frame according to the schedule determined by the system parameter 313 and the current time indicated by the timer 331, and outputs the frame to the transmitter 303. Then, the transmitter 303 transmits the hello frame through the switch 302 and the antenna 301.

A part or all of the reception processing unit 321, the data processing unit 326, the registration processing unit 327, the congestion judgment unit 328, the instruction issue unit 329, the synchronization processing unit 330, and the hello frame generation unit 332 may be realized by a hardware circuit instead of the CPU 306. The hardware circuit may be, for example, an ASIC (application specific integrated circuit), or a reconfigurable circuit such as an FPGA (field programmable gate array) etc.

The gateway 101 may include an RTC (real time clock) not illustrated in the attached drawings. The time indicated by the RTC may be corrected by the synchronization processing unit 330 based on the time indicated by the timer 331 when, for example, the gateway 101 is powered off.

FIG. 3 illustrates a configuration of each node device included in the communication system 100 in FIG. 1. In the present embodiment, the configuration of each of the node devices 111 through 143 in FIG. 1 is similar to the configuration of a node device 400 in FIG. 3.

As illustrated in FIG. 3, the node device 400 includes an antenna 401, a switch 402, a transmitter 403, a receiver 404, a CPU 405, and memory 406.

The node device 400 according to the present embodiment switches between the transmission and the reception on a time basis in the TDD system. Concretely, the antenna 401 is used for both transmission and reception. The switch 402 connects the transmitter 403 to the antenna 401 so that the node device 400 may make a transmission depending on the time, or connects the receiver 404 to the antenna 401 so that the node device 400 may make a reception.

The transmitter 403 is to make a transmission through a specified transmission channel, and includes a modulator, a D/A converter, etc. Channels which may be specified as a transmission channel are the above-mentioned channels ChA through ChD in the present embodiment. A transmission channel is specified by a channel specification unit 425 described later. That is, the transmitter 403 may change a channel through firmware.

In addition, the receiver 404 receives a signal of the default channel ChA, and includes a demodulator, an A/D converter, etc.

The memory 406 includes RAM used as a work area and a non-volatile storage device. As a non-volatile storage device, for example, ROM, flash memory, etc. are available. Also as a non-volatile storage device, a combination of a computer-readable storage medium and a drive device of a storage medium is available. An example of a storage medium is a magnetic disk such as a semiconductor memory card, a hard disk, etc., an optical disk such as a CD, a DVD, etc., and a magneto optical disk.

A part of the memory 406 (for example, a part of the RAM) is used as a transmission/reception buffer area 411. That is, the receiver 404 outputs the received frame to the transmission/reception buffer area 411. Each unit to be realized by the CPU 405 and described later generates a frame to be transmitted and outputs the generated frame to the transmission/reception buffer area 411. Then, the transmitter 403 reads the frame from the transmission/reception buffer area 411, and transmits the frame through the switch 402 and the antenna 401.

Then, the memory 406 stores transmission mode information 412, path information 414 including hop count information 413, schedule information 415, individual information 416, and link information 417. The schedule information 415 and individual information 416 are stored in the non-volatile storage device in the memory 406, and copied on the RAM if desired. Furthermore, it is preferable that the transmission mode information 412, the path information 414, and the link information 417 are stored on the RAM. A concrete example of each type of information stored in the memory 406 is described later with reference to FIG. 7, and the outline of the information is described as follows.

The transmission mode information 412 indicates the "transmission mode" of the node device 400. In the present embodiment, the transmission mode is either a "normal mode" in which the transmission channel is fixed to the default channel ChA, or a "congestion mode" in which the transmission channel is selected for each transmission of a frame to the gateway 101.

Even in the "congestion mode", the default channel ChA is used in the transmission of a frame to a node device other than the gateway 101. In the case of the "congestion mode", the default channel ChA is used in the transmission of each type of control frame not in the multi-hop transmission.

The hop count information 413 is the information used by the node device 400 to recognize whether or not the hop count between the gateway 101 and the node device 400 is 1. Depending on the embodiment, the hop count information 413 may be the value indicating the hop count or the information indirectly indicating whether or not the hop count is 1.

The path information 414 is the information for management of at least a part of the path from the node device 400 to the gateway 101. "At least a part of the path" concretely refers to a link from the node device 400 to a node device adjacent to the node device 400 in the path from the node device 400 to the gateway 101.

For example, when the node device 400 is the node device 112 in FIG. 1, the gateway 101 as a GD is adjacent to the node device 112. Therefore, "at least a part of the path" described above and indicated by the path information 414 is, for example, a link from the node device 112 to the gateway 101 adjacent to the node device 112.

Since the hop count between the gateway 101 and the node device 112 on the path including the link is 1, the hop count information 413 included in the path information 414 indicates that "the hop count is 1." Thus, when the hop count up to the gateway 101 is 1, the GD matches the LD.

In addition, when the node device 400 is the node device 123 in FIG. 1, "at least a part of the path" described above and indicated by the path information 414 is, for example, a link from the node device 123 to the node device 112 adjacent to the node device 123. Since the hop count between the gateway 101 and the node device 123 on the path including the link is 2, the hop count information 413 included in the path information 414 indicates that "the hop count is not 1."

The schedule information 415 indicates the schedule according to which the node device 400 transmits a frame of each type. In addition, the individual information 416 is the information identifying the node device 400 specific to the node device 400.

The link information 417 includes the identification information about another device adjacent to the node device 400 in the communication system 100. For example, when the node device 400 is the node device 123 in FIG. 1, the node device 123 is adjacent to the node devices 111, 112, 122, 133, and 134. Therefore, the memory 406 of the node device 123 stores the link information 417 including the identification information about the node devices 111, 112, 122, 133, and 134.

The memory 406 further stores a program 418 executed by the CPU 405 in addition to the above-mentioned type of information. Concretely, the program 418 is stored in a non-volatile storage device. The program 418 may be pre-installed in the non-volatile storage device, or downloaded into the non-volatile storage device through a network of the communication system 100. Then, the program 418 is read by the CPU 405 from the non-volatile storage device, loaded on the RAM, and then executed.

Furthermore, the program 418 is, for example, a firmware program for control of the node device 400 by the CPU 405. The CPU 405 operates as each unit in FIG. 3 by executing the program 418 as described below.

That is, the CPU 405 operates as a type judgment unit 421, an interference detection unit 422, and a channel switch unit 423 by executing the program 418. The channel switch unit 423 includes a mode change unit 424 and a channel specification unit 425.

In addition, the CPU 405 operate also as a synchronization processing unit 426 by executing the program 418. Then, the CPU 405 also includes a timer 427 as a hardware circuit whose time is corrected by the synchronization processing unit 426.

Furthermore, the CPU 405 also operates as a hop count recognition unit 428, a hello frame generation unit 429, a forward processing unit 430, a data processing unit 431, a registration request unit 432, and a link management unit 433 by executing the program 418.

Concretely, upon receipt of a frame, the receiver 404 outputs the received frame to the transmission/reception buffer area 411, and notifies the type judgment unit 421 of the reception of the frame. Furthermore, the notification from the receiver 404 to the type judgment unit 421 includes the starting address of the frame in the transmission/reception buffer area 411. Therefore, the type judgment unit 421 and each unit which is described later and receives a request from the type judgment unit 421 are able to read from the transmission/reception buffer area 411 the value of an appropriate field in the frame if desired.

That is, the type judgment unit 421 reads the type of the received frame from the transmission/reception buffer area 411. Then, depending on the type, the type judgment unit 421 requests the mode change unit 424, the synchronization processing unit 426, the hop count recognition unit 428, the forward processing unit 430 or the link management unit 433 to perform the process depending on the type. The type judgment unit 421 also notifies the mode change unit 424, the synchronization processing unit 426, the hop count recognition unit 428, the forward processing unit 430 or the link management unit 433 of the starting address in the transmission/reception buffer area 411 of the received frame together with the request.

As described above, the receiver 404 of the node device 400 only has to receive the frame through the default channel ChA, and does not have to receive a frame transmitted through other channels ChB through ChD. However, the receiver 404 may be further provided with the function of detecting the reception power of the channels ChB through ChD. The detection of reception power may be realized by a simpler circuit than the circuit for the reception of a frame.

The interference detection unit 422 in FIG. 3 may be omitted. However, when the receiver 404 has the function of detecting the reception power of the channels ChB through ChD, the node device 400 may include the interference detection unit 422 as illustrated in FIG. 3.

The interference detection unit 422 receives from the receiver 404 a parameter indicating the reception power of each of the channels ChB through ChD other than the default channel, and detects the strength of the interference in the channels ChB through ChD. Then, the interference detection unit 422 outputs a detection result to the channel specification unit 425.

The channel switch unit 423 determines a transmission channel, and specifies the determined transmission channel for the transmitter 403. According to the present embodiment, when the transmission mode indicated by the transmission mode information 412 is the normal mode, the transmission channel is constantly the default channel ChA. In addition, when the transmission mode is the congestion mode, the transmission channel is determined each time a frame is transmitted.

Then, the transmission mode is the congestion mode only when the hop count between the node device 400 and the gateway 101 is 1, and when the gateway 101 instructs the node device 400 to switch the transmission channel. Otherwise, the transmission mode is the normal mode. Furthermore, also when the gateway 101 instructs the node device 400 to return the transmission channel to the default channel, the transmission mode is the normal mode.

Concretely, when the type of the frame received by the receiver 404 is a switchover instruction for a transmission channel, the type judgment unit 421 requests the mode change unit 424 to perform the process depending on the reception of a switchover instruction. Then, the mode change unit 424 recognizes the hop count between the node device 400 and the gateway 101 through the hop count recognition unit 428. Then, the mode change unit 424 changes the transmission mode to the congestion mode if the hop count is 1, and maintains the normal mode as a transmission mode if the hop count is not 1.

In addition, when the type of the frame received by the receiver 404 is a restore instruction to return the transmission channel to the default channel, the type judgment unit 421 requests the mode change unit 424 to perform the process depending on the reception of the restore instruction. Then, the mode change unit 424 sets the transmission mode as the normal mode.

As described above, the mode change unit 424 determines the transmission mode, and records the determined transmission mode as the transmission mode information 412 on the memory 406.

The channel specification unit 425 refers to the transmission mode information 412. If the transmission mode is the normal mode, the channel specification unit 425 specifies for the transmitter 403 the default channel ChA as the transmission channel.

On the other hand, if the transmission mode is the congestion mode, the channel specification unit 425 judges whether the default channel is to be selected as the transmission channel, or the transmission channel is to be selected from among other channels ChB through ChD. The judgment is made by recognizing through the hop count recognition unit 428 whether or not the condition that "the LD of the frame to be transmitted is the gateway 101" holds true. The condition above implies that the hop count between the node device 400 and the gateway 101 is 1.

When the condition above holds true, the channel specification unit 425 selects the transmission channel at random from among the channels ChB through ChD, and specifies the selected transmission channel for the transmitter 403. On the other hand, if the condition above does not hold true, the channel specification unit 425 specifies the default channel ChA as the transmission channel.

In addition, when the frame received by the receiver 404 is a synchronization frame, the type judgment unit 421 requests the synchronization processing unit 426 to perform the synchronizing process. Then, the synchronization processing unit 426 reads a frame from the transmission/reception buffer area 411, and corrects the time indicated by the timer 427 according to the time information included in the frame. Furthermore, the synchronization processing unit 426 generates a synchronization frame including the time information based on the corrected time indicated by the timer 427, and outputs the synchronization frame to the transmitter 403.

Then, the transmitter 403 transmits the synchronization frame output from the synchronization processing unit 426 through the switch 402 and the antenna 401. When the transmitter 403 transmits the synchronization frame output from the synchronization processing unit 426, it constantly uses the default channel ChA.

When the frame received from the receiver 404 is a hello frame, the hop count recognition unit 428 recognizes the hop count between the node device 400 and the gateway 101 at the request from the type judgment unit 421. That is, upon receipt of the request from the type judgment unit 421, the hop count recognition unit 428 reads the hello frame stored in the transmission/reception buffer area 411 and recognizes the hop count, and records the recognized hop count in the hop count information 413.

In addition, by referring to the header of the frame stored in the transmission/reception buffer area 411, the hop count recognition unit 428 may recognize whether or not the hop count between the node device 400 and the gateway 101 is 1. The hop count recognition unit 428 may also notify the mode change unit 424 and the channel specification unit 425 of the recognition result from the header.

Furthermore, like the gateway 101, the node device 400 also transmits the hello frame according to an appropriate schedule. Concretely, the hello frame generation unit 429 generates a hello frame based on the schedule described in the schedule information 415 and the current time indicated by the timer 427, and outputs the hello frame to the transmitter 403. Then, the transmitter 403 transmits the hello frame through the switch 402 and the antenna 401. When the transmitter 403 transmits the hello frame, it constantly uses the default channel ChA.

The forward processing unit 430 determines the direct destination (that is, the LD) of the frame for the frame of a specific type. That is, the forward processing unit 430 selects the LD from among the devices adjacent to the node device 400 in the communication system 100.

The forward processing unit 430 refers to the value of the field indicating the final destination (that is, the GD) of the frame stored in the transmission/reception buffer area 411, and refers to the path information 414. Then, the forward processing unit 430 records the selected LD in a specified field of the frame in the transmission/reception buffer area 411.

For example, assume that the node device 400 is the node device 124 in FIG. 1. In this case, for the frame of the specific type received by the node device 124 from the node device 135, the forward processing unit 430 of the node device 124 selects the node device 112 as the LD. Also for the frame of the specific type generated by the node device 124 itself, the forward processing unit 430 of the node device 124 selects the node device 112 as the LD.

The "frame of the specific type" above concretely refers to a frame to be multi-hop forwarded in the communication system 100, and concretely includes a "data frame" and a "registration request frame". The details of the data frame and the registration request frame are described later with reference to FIG. 9, and the outline is described below.

The data frame includes data to be collected by the gateway 101 (for example, the data detected by the sensor as exemplified in FIG. 1). The registration request frame is used by the node device 400 to request the gateway 101 to register the node device 400 in the registered node information 314 as one of the node devices in which the gateway 101 collects data.

When the receiver 404 receives and outputs a data frame or a registration request frame to the transmission/reception buffer area 411, the forward processing unit 430 according to the present embodiment receives the request from the type judgment unit 421, and selects the LD. In addition, when the data processing unit 431 generates the data frame and outputs it to the transmission/reception buffer area 411, the forward processing unit 430 receives the request from th data processing unit 431, and selects the LD. When the registration request unit 432 generates the registration request frame and outputs it to the transmission/reception buffer area 411, the forward processing unit 430 receives the request from the registration request unit 432 and selects the LD.

The forward processing unit 430 records the selected LD in the specified field of the frame in the transmission/reception buffer area 411 as described above. Furthermore, the forward processing unit 430 requests the channel specification unit 425 to specify a channel. The forward processing unit 430 notifies the transmitter 403 through the channel specification unit 425 or directly of the starting address in the transmission/reception buffer area 411 of the frame to be transmitted.

Then, at the request from the forward processing unit 430, the channel specification unit 425 appropriately selects the default channel ChA or other channels ChB through ChD as described above, and specifies the selected channel for the transmitter 403. At the notification from the forward processing unit 430, the transmitter 403 reads a frame to be transmitted from the transmission/reception buffer area 411, and transmits the frame through the switch 402 and the antenna 401 using the transmission channel specified by the channel specification unit 425.

Furthermore, the data processing unit 431 according to the present embodiment generates a data frame based on the schedule described in the schedule information 415 and the current time indicated by the timer 427, and outputs the data frame to the transmission/reception buffer area 411. Then, the data processing unit 431 requests the forward processing unit 430 to select the LD of the generated frame. Depending on the embodiment, the data processing unit 431 may irregularly generate a data frame and output it to the transmission/reception buffer area 411.

In addition, depending on the embodiment, a data frame for which a node device other than the gateway 101 is specified as the GD may be used. For example, the node device 133 may specify the node device 139 as the GD of the data frame. In this case, the data processing unit 431 of the node device 139 may appropriately process the payload of the received data frame.

Furthermore, the registration request unit 432 of the present embodiment generates a registration request frame based on the schedule described in the schedule information 415 and the current time indicated by the timer 427 and outputs the generated frame to the transmission/reception buffer area 411. Then, the registration request unit 432 requests the forward processing unit 430 to select the LD of the generated frame.

If the frame received by the receiver 404 is a hello frame, the type judgment unit 421 not only requests the hop count recognition unit 428 to update the hop count information 413, but also requests the link management unit 433 to update the link information 417.

At the request from the type judgment unit 421, the link management unit 433 recognizes the source of the hello frame with reference to the transmission/reception buffer area 411. The details are described later, but since the hello frame is not multi-hop transmitted, the source of the hello frame may be the LS and the GS.

Furthermore, the link management unit 433 confirms whether or not the link information 417 includes the identification information about the source of the hello frame. If the link information 417 does not include the identification information about the source of the hello frame, the link management unit 433 adds the identification information about the source of the hello frame to the link information 417.

A part or all of the type judgment unit 421, the interference detection unit 422, and the channel switch unit 423 may be realized by a hardware circuit instead of the CPU 306. Similarly, apart or all of the synchronization processing unit 426, the hop count recognition unit 428, the hello frame generation unit 429, the forward processing unit 430, the data processing unit 431, the registration request unit 432, and the link management unit 433 may also be realized by a hardware circuit instead of the CPU 306. The above-mentioned hardware circuit may be, for example, the ASIC, the reconfigurable circuit such as the FPGA, etc. Depending on the embodiment, the interference detection unit 422 may be omitted.

The node device 400 may include the RTC not illustrated in the attached drawings. The time indicated by the RTC may be corrected by the synchronization processing unit 426 based on the time indicated by the timer 427 when the node device 400 is turned off.

FIG. 4 illustrates an example of the registered node information 314. The registered node information 314 may concretely be the information in the format of a registered node table 314*a* illustrated in FIG. 4.

The registered node table 314*a* indicates from which node device 400 in the communication system 100 the gateway 101 collects data. That is, the registered node table 314*a* indicates which node device 400 transmits a data frame to the gateway 101.

Each entry included in the registered node table 314*a* corresponds to the node device 400 which transmits data to the gateway 101. Each entry includes the fields "node ID (identification)", "IP (Internet protocol) address", "MAC address", "data reception time", "registration time", and "1 hop".

The node ID is identification information for identifying in the communication system 100 the node device 400 corresponding to the entry. In the description below, for convenience of explanation, the node ID is configured by providing a reference number illustrated in FIG. 1 with a preceding character string "ID". For example, assume that the node IDs of the gateway 101 and the node device 111 are respectively an "ID 101" and an "ID 111". Obviously, the node ID is arbitrary depending on the embodiment.

The IP address and the MAC address are those of the node device 400 corresponding to the entry. The IP address or the MAC address may be used as a node ID depending on the embodiment. For example, the IP address and the MAC address may be added as additional information in the data to be transmitted to the data server 213.

The data reception time refers to the time at which the gateway 101 receives a data frame from the node device 400 corresponding to the entry. The registration time refers to the time at which the gateway 101 receives a registration request frame from the node device 400 corresponding to the entry.

Then, the value of the 1 hop field is true when the hop count between the node device 400 and the gateway 101 corresponding to the entry is 1, and false when the hop count is 2 or more.

For example, FIG. 4 exemplifies five entries corresponding to the node devices 111, 112, 125, 126, and 132 in the communication system 100 in FIG. 1. In the description below, for convenience of explanation, the node device 400 whose node ID is registered in the registered node table 314a is called a "registered node device".

In FIG. 4, for example, in the entry corresponding to the node device 111, the node ID is the ID 111, and the IP address is 172.16.0.111, and the MAC address is 00:00:0E:11:22:6F. The entry corresponding to the node device 111 indicates that the gateway 101 has received the data frame from the node device 111 at 15:00:0.723 on Sep. 29, 2010. Similarly, the entry corresponding to the node device 111 indicates that the gateway 101 has received the registration request frame from the node device 111 at 9:30:6.208 on Sep. 29, 2010.

Then, in the node devices 111, 112, 125, 126, and 132, only the node devices 111 and 112 have the hop count of 1 from the gateway 101. Therefore, in FIG. 4, in the two entries corresponding to the node devices 111 and 112, the value of the 1-hop field is true, but the value of the 1-hop field in the remaining three entries is false.

As illustrated in FIG. 1, the node device 126 may physically receive the frame transmitted from the node 101, but the hop count from the node 101 on the transmission path of the actual data frame is 2. Therefore, the value of the 1-hop field in the entry corresponding to the node device 126 is false.

FIG. 5 illustrates examples of the system parameters 313 and the congestion information 315. System parameters 313a illustrated in FIG. 5 are concrete examples of the system parameters 313 in FIG. 3, and include the following parameters.

The data collection schedule refers to a schedule of transmitting a data frame by a registered node device. In the present embodiment, all registered node devices simultaneously transmit data frames. Therefore, the gateway 101 receives a number of data frames in a short time, and the congestion easily occurs in a 1-hop range from the gateway 101.

The data collection schedule exemplified in FIG. 5 indicates the schedule that "every registered node device transmits a data frame at 15:00 every day". For example, the registered node table 314a in FIG. 4 is in the state at 16:00 on Sep. 29, 2010, and indicates the data reception time when the data is collected on Sep. 29, 2010.

The allowable delay time refers to the maximum delay time that is allowable as the delay time from the point in time determined by the data collection schedule to the point in time at which the gateway 101 actually completes the reception of data frames from all registered node devices. In the example in FIG. 5, the allowable delay time is 5 minutes. That is, the data collection schedule and the allowable delay time in FIG. 5 means that "the delay time is out of the allowable range if the data collection from all registered node devices is not completed before 15:05".

The concrete value of the allowable delay time may be appropriately determined depending on the embodiment. The allowable delay time may be determined by, for example, the number of registered node devices belonging to the communication system 100, the specification (for example, a bit rate) of the communication protocol used in the communication system 100, etc. Otherwise, the allowable delay time may be determined depending on the physical position where each node device 400 is set in the communication system 100, the maximum value of the hop count from the registered node device to the gateway 101 (or the distribution of the hop count), etc. The allowable delay time may be determined based on a preliminary experiment or a simulation.

Furthermore, according to the present embodiment, the minimum reception sensitivity of the receivers 305A through 305D refers to the same value. Therefore, as the minimum reception sensitivity of the system parameters 313a, for example, −90 dBm is set. The minimum reception sensitivity has the value depending on the specification of the receivers 305A through 305D. In addition, when the receivers 305A through 305D have different minimum reception sensitivity, the system parameters 313a may include four parameters indicating the minimum reception sensitivity of each of the receivers 305A through 305D.

Additionally, with an increasing number of registered node devices (that is, the number of entries of the registered node table 314a), the number of data frames received by the gateway 101 increases.

On the other hand, the reception throughput of the receiver 305A of the gateway 101 is finite. That is, the number of frames which may be received by the gateway 101 in unit time through the default channel ChA is limited. In addition, the performance of the gateway 101 itself (for example, the performance of the CPU 306, the capacity of the memory 307, the effective throughput of the network I/F 308, etc.) is also limited.

Therefore, the maximum number of the registered node devices which may be processed by the gateway 101 is set as the maximum number of registered nodes. It is preferable that the maximum number of registered nodes is determined based on at least the reception throughput of the receiver 305A for the default channel ChA.

The maximum number of registered nodes may be determined based on, for example, the specification of the gateway 101, and based on the preliminary experiment. In the example in FIG. 5, the maximum number of registered nodes is 1000.

The details are described later, but the congestion judgment unit 328 detects the congestion using the rate of the frames in which an error is detected by the FCS check unit 324. The critical error rate is a threshold to be compared with the rate of the frames in which an error is detected in detecting the congestion. In the example illustrated in FIG. 5, the critical error rate is 50%. The concrete value of the critical error rate may be appropriately determined depending on the embodiment.

Then, the synchronization schedule defines the schedule according to which the synchronization processing unit 330 performs the synchronizing process. In the example in FIG. 5, the synchronization schedule is set as "every hour at 20 minutes and 25.000 seconds after the hour".

Furthermore, since the gateway 101 is enabled to receive signals in four channels ChA through ChD, the four channels ChA through ChD are set as receivable channels. Additionally, the channel ChA is set as a default channel.

A hello frame transmission schedule defines a schedule according to which the hello frame generation unit 332 transmits hello frames. In the example in FIG. 5, the hello frame transmission schedule is set as "every minute at 25.000 seconds after the minute".

Then, a congestion flag 315*a* illustrated in FIG. 5 is a concrete example of the congestion information 315 in FIG. 3, and is a flag having the value of true or false. In the present embodiment, the value of true indicates that the congestion judgment unit 328 has detected the congestion, and the value of false indicates that the congestion judgment unit 328 has not detected the congestion.

Figure 6:
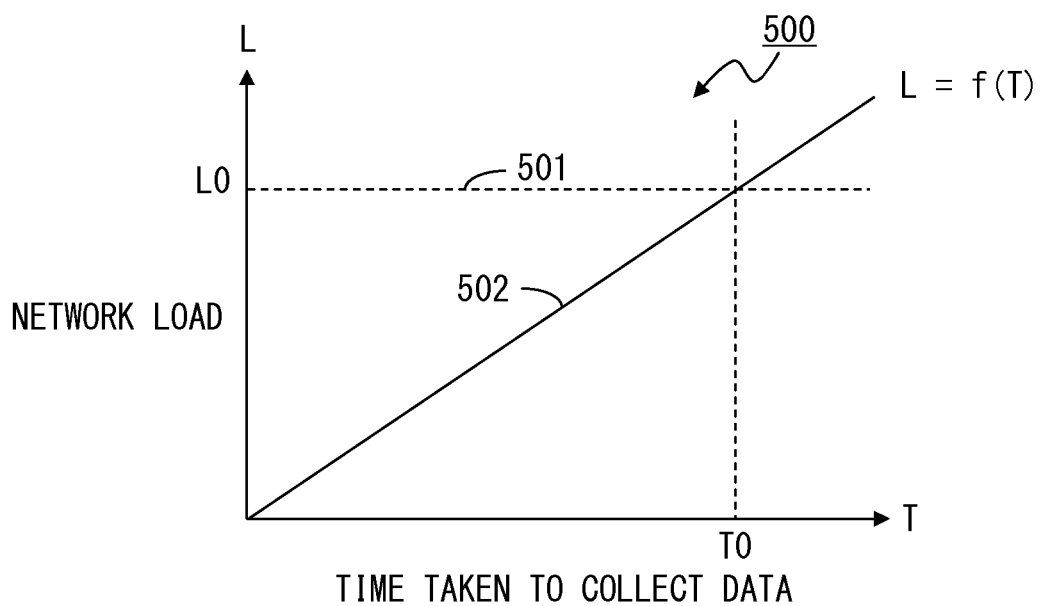
FIG. 6 is an explanatory view of allowable delay time.

FIG. 6 is an explanatory view of allowable delay time. FIG. 5 exemplifies the allowable delay time of five minutes set as one of the system parameters 313*a*; the value set for the allowable delay time of the system parameters 313*a* corresponds to a threshold T0 in a graph 500 in FIG. 6.

As illustrated by the graph 500, the longer the time T taken to collect data from all registered node devices, the heavier the work load L of the entire communication system 100 becomes. That is, when the network load L is expressed by the function f of the time T, the graph of L=f(T) is approximately expressed by, for example, a straight line 502.

Generally, the heavier the network load L, the easier the congestion occurs. Then, the network load L may be expressed by, for example, an average MAC efficiency (that is, an average value in the communication system 100 of the ratio of the time in which a radio medium is used to the entire time). For example, if the average MAC efficiency exceeds a threshold L0, the congestion easily occurs.

However, it is difficult for the gateway 101 to detect the network load L in the entire communication system 100. Then, according to the present embodiment, the congestion judgment unit 328 detects whether or not the congestion has occurred depending on whether or not the time T has exceeded the threshold T0 after indirectly recognizing the level of the network load L from the length of the time T. Concretely, the threshold T0 is the value of the T coordinate at the intersection of the straight line 501 indicating L=L0 and the straight line 502 indicating L=f(T). As described above, the threshold T0 may be determined based on various factors.

FIG. 7 illustrates examples of the transmission mode information 412, the path information 414, the schedule information 415, the individual information 416, and the link information 417.

A transmission mode information 412*a* is a concrete example of the transmission mode information 412 in FIG. 4, and has the value indicating the normal mode or the value indicating the congestion mode. The transmission mode information 412*a* may be, for example, a flag variation.

In addition, path information 414*a* is an example of path information 414 when the node device 400 is the node device 112. The path information 414*a* includes one or more entries each including fields of a GD, a LD, an evaluation value, and a hop count. According to the present embodiment, it is assumed that the evaluation value is equal to or higher than 0.0 and is equal to or lower than 1.0, the highest evaluation is 0.0, and the lowest evaluation is 1.0.

Concretely, the first entry of the path information 414*a* includes the GD of "ID101", the LD of "ID101", the evaluation value of "0.0", and the hop count of "1". The first entry indicates the following (A1) through (A3).

(A1) When the node device 112 transmits a frame whose GD is the gateway 101, the gateway 101 is one of the candidate(s) which may be selected as the LD by the forward processing unit 430.

(A2) The evaluation of the gateway 101 as the LD in the case where the GD is the gateway 101 is the highest evaluation expressed by the value of 0.0.

(A3) When the gateway 101 is selected as the LD, the hop count from the node device 112 holding the path information 414*a* to the gateway 101 as the GD is 1.

The second entry of the path information 414*a* includes the "ID 101" as the GD, the "ID 111" as the LD, the evaluation value of "0.7", and the hop count of "2". The second entry indicates the following (B1) through (B3).

(B1) When the node device 112 transmits a frame whose GD is the gateway 101, one of the candidate(s) which may be selected by the forward processing unit 430 as the LD is the node device 111.

(B2) The evaluation of the node device 111 as the LD in the case where the GD is the gateway 101 is expressed by the value of 0.7. That is, the evaluation as the LD in the case where the GD is the gateway 101 is considerably lower for the node device 111 than for the gateway 101.

(B3) When the node device 111 is selected as the LD, the hop count from the node device 112 holding the path information 414*a* to the gateway 101 as the GD is 2.

That is, the path information 414*a* indicates that there are at least two transmission paths of the frame in which the GD is the gateway 101. Then, according to the path information 414*a*, the evaluation of the transmission path indicated by the second entry (that is, the bypass by way of the node device 111) is lower than the evaluation of the transmission path indicated by the first entry.

Therefore, the forward processing unit 430 selects on the priority basis a transmission path having a higher evaluation. That is, the forward processing unit 430 selects on the priority basis the gateway 101 having a higher evaluation as the LD for the frame in which the GD is the gateway 101.

In the path information 414*a*, the hop count field itself is used as the hop count information 413. However, the GD field and the LD field may be used as the hop count information 413 because the value of the GD field being equal to the value of the LD field indicates that the hop count up to the gateway 101 is 1, and the value of the GD field being not equal to the value of the LD field indicates that the hop count up to the gateway 101 is not 1.

In addition, the node device 123 holds path information 414*b* having the same format as the path information 414*a*. The first entry of the path information 414*b* indicates the following (C1) through (C3).

(C1) When the node device 123 transmits a frame in which the GD is the gateway 101, the node device 112 is one of the candidates which may be selected by the forward processing unit 430 as the LD.

(C2) The evaluation of the node device 112 as the LD when the GD is the gateway 101 is the highest evaluation.

(C3) When the node device 112 is selected as the LD, the hop count from the node device 123 which holds the path information 414*b* to the gateway 101 as the GD is 2.

In addition, the second entry of the path information 414*b* indicates the following (D1) through (D3).

(D1) When the node device 123 transmits the frame in which the GD is the gateway 101, the node device 122 is one of the candidate which may be selected as the LD by the forward processing unit 430.

(D2) The evaluation of the node device 122 as the LD when the GD is the gateway 101 is expressed by the value of 0.9 which is nearly the lowest evaluation.

(D3) When the node device 122 is selected as the LD, the hop count from the node device 123 which holds the path information 414b to the gateway 101 as the GD is 3.

In the example in FIG. 7, the value of the GD of each entry is "ID101", but there may be an entry having the node ID of any other node device in the GD field depending on the embodiment.

Schedule information 415a is a concrete example of the schedule information 415, and indicates the transmission schedule of each of the three types of frames.

Concretely, the "data transmission schedule" included in the schedule information 415a indicates the schedule according to which the data processing unit 431 generates a data frame and the transmitter 403 transmits the generated data frame. In the data transmission schedule in the schedule information 415a held by the node device 400, the same schedule as the data collection schedule in the system parameters 313a held by the gateway 101 is set.

The "hello frame transmission schedule" included in the schedule information 415a indicates the schedule according to which the hello frame generation unit 429 generates a hello frame and the transmitter 403 transmits the generated hello frame. In the example in FIG. 7, the hello frame transmission schedule is set as "every minute at 2.000 seconds after the minute".

Furthermore the "registration request schedule" included in the schedule information 415a indicates the schedule according to which the registration request unit 432 generates a registration request frame and the transmitter 403 transmits the generated registration request frame. In the example in FIG. 7, the registration request schedule is set as "at 10:30: 25.000 every day".

Individual information 416a is a concrete example of the individual information 416 for the case where the node device 400 is the node device 123. The individual information 416a includes the node ID, the IP address, and the MAC address of the node device 123.

Link information 417a is a concrete example of link information 417 for the case where the node device 400 is the node device 123.

In FIG. 1, the node device 123 is connected to the five node devices 111, 112, 122, 133, and 134 by solid line or broken line. That is, the node device 123 is adjacent to the node devices 111, 112, 122, 133, and 134, and is able to communicate with the above-mentioned five adjacent node devices with 1 hop. Therefore, the link information 417a includes the node ID of the above five adjacent node device.

Figure 8:
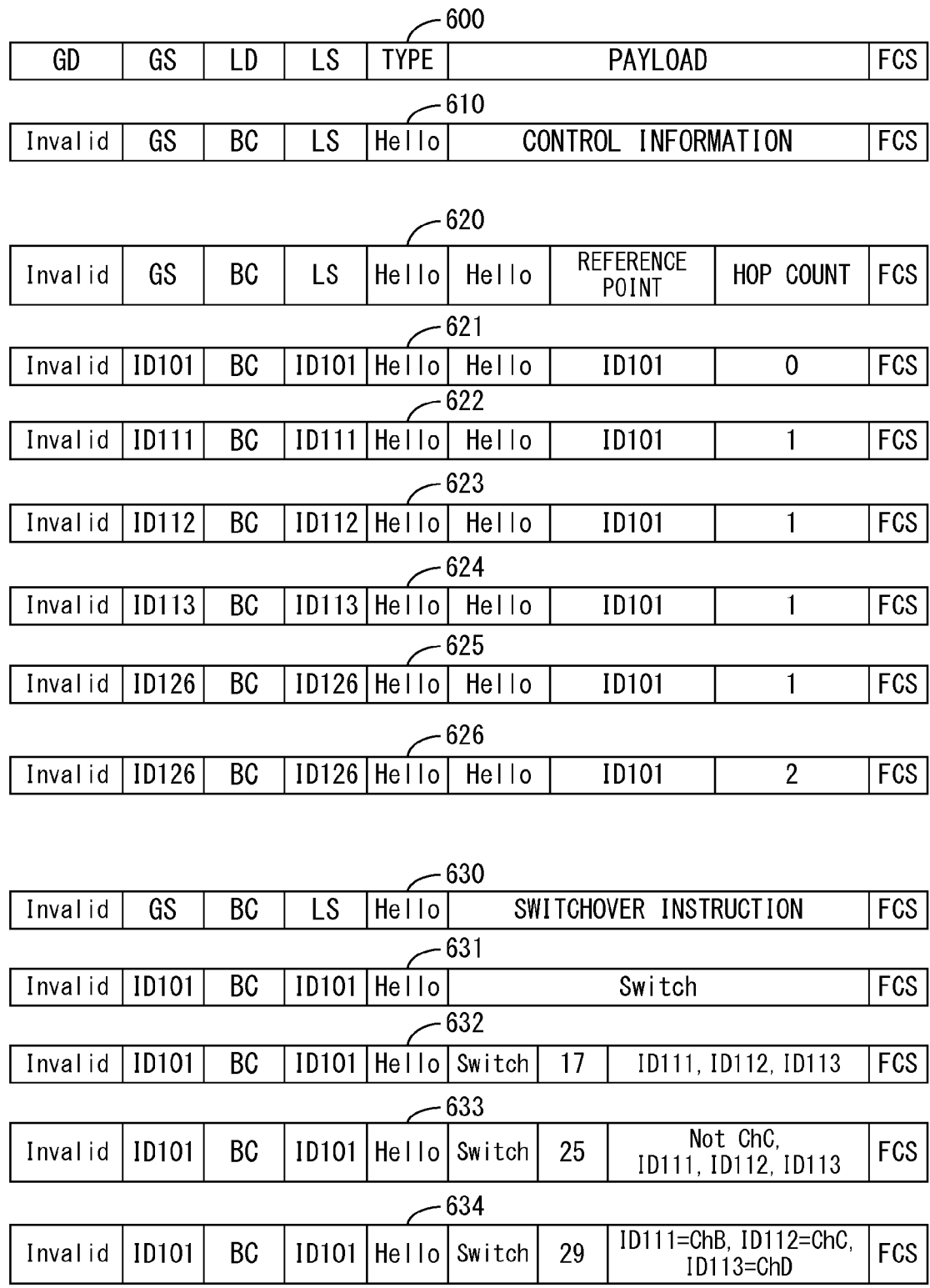
FIG. 8 is a view (No. 1) of an example of a frame.

FIGS. 8 and 9 illustrate examples of frames. The format of the frame according to the present embodiment is generally illustrated as a frame 600 in FIG. 8. The frame 600 includes the fields of GD, GS, LD, LS, type, payload, and FCS.

The fields of GD, GS, LD, and LS indicate the GD, GS, LD, and LS of the frame 600, respectively, by using the respective node IDs.

For example, assume that the frame 600 is generated by the node device 134 in FIG. 1, and transmitted from the node device 134 to the gateway 101 through the node device 123 and the node device 112. In this case, the "ID 101" as the node ID of the gateway 101 is set as the GD of the frame 600, and the "ID 134" as the ID of the node device 134 is set as the GS of the frame 600. The values of the GD and the GS are not changed while the frame 600 is forwarded in the communication system 100.

On the other hand, when the frame 600 is transmitted from the node device 134 to the node device 123, the "ID 123" is set as the LD and the "ID 134" is set as the LS. Then, when the frame 600 is transmitted from the node device 123 to the node device 112, the "ID 112" is set as the LD, and the "ID 123" is set as the LS. Finally, when the frame 600 is transmitted from the node device 112 to the gateway 101, the "ID 101" is set as the LD, and the "ID 112" is set as the LS.

In the present specification, the "GD field" may be simply expressed as "GD". Furthermore, the "node (which may be the gateway 101 or the node device 400) in the communication system 100 specified as the GD field" may be simply expressed as "GD". The GS, LD, and LS may also be simply expressed as well.

A type field indicates the type of the frame 600. In the present embodiment, four values (expressed as "Hello", "Sync", "Data", and "Reg" for convenience in explanation in the following description) are used as the values indicating the type.

A payload includes appropriate data depending on the type of the frame 600. The FCS field is to detect an error in the frame 600. For example, a CRC (cyclic redundancy check) is calculated from all fields from the GD to the payload, and the calculated value is set in the FCS field.

One of the concrete example of the frame 600 described above is a frame 610 in which the value of "Hello" is set as type. For convenience in explanation below, the frame 610 is referred to as a "hello frame 610 in a broad sense". Concretely, the hello frame 610 in a broad sense includes three types of frames, that is, a hello frame 620 in FIG. 8, a switchover instruction frame 630 in FIG. 8, and a restore instruction frame 640 in FIG. 9.

The hello frame 610 in a broad sense is broadcast only in a 1-hop range, and is not forwarded. Therefore, in the hello frame 610 in a broad sense, an invalid specific value (for convenience of explanation, it is expressed as "Invalid" hereafter) is set as a node ID for the GD. Furthermore, the value of the GS is equal to the value of the LS. Then, a specific value (for convenience of explanation, it is expressed as "BC" hereafter) indicating a broadcast is set for the LD. Then, the hello frame 610 in a broad sense has control information as a payload. For example, the value expressed as "Invalid" may be a value of 0 for all bits concretely, and the value expressed as "BC" may be the value of 1 for all bits concretely.

The hello frame 620 is an example of the hello frame 610 in a broad sense. As a concrete example of the control information in the hello frame 610 in a broad sense, the hello frame 620 has a subtype field in which the value of "Hello" is set, a reference point field, and a hop count field. The "hello frame" in the explanation up to FIG. 7 is a frame in which the values of type and subtype are "Hello".

In the reference point field, a node ID of any node in the communication system 100 is set. A hop count field indicates the hop count from the node indicated by the reference point field to the GS of the hello frame 620.

For example, at a time point, the gateway 101 transmits a hello frame 621 for which the node ID of the gateway 101 is set as the GS, the LS, and the reference point. Since the hop count from the gateway 101 to the gateway 101 is 0, the value of the hop count field of the hello frame 621 is 0.

Then, the node device 111 included in the communication-enabled area 102 receives the hello frame 621. If the link information 417 in the node device 111 does not include the "ID 101" as the LS of the hello frame 621, the node device 111 adds the "ID 101" to the link information 417.

In addition, the node device 111 searches the path information 414 for an entry whose GD is the "ID 101" and whose LD is equal to the "ID 101", which is the LS of the hello frame 621. If no entry is found, the node device 111 may add to the path information 414 the entry having the "ID 101" as the GD and the "ID 101" as the LD. Otherwise, the node device 111 may omit the addition of an entry. Furthermore, the node device 111 sets the hop count of 1 (that is, the value obtained by adding 1 to the hop count set in the hello frame 621) in the found entry or added entry.

When an entry is added, the node device 111 appropriately sets the initial value of an evaluation value. The initial value of an evaluation value may be, for example, an average value of 0.5 of 0.0 indicating the highest evaluation and 1.0 indicating the lowest evaluation.

Then, the node device 111 acquires an entry having the highest evaluation in the entries having the "ID 101" as the GD in the path information 414 when the time determined according to the schedule information 415 is reached. For example, if the LD of the entry acquired by the node device 111 is "ID 101" (that is, if an entry for which the hop count is set to 1 is acquired upon receipt of the hello frame 621), the node device 111 generates and transmits a hello frame 622.

As illustrated in FIG. 8, the node ID of the node device 111 itself is set for the GS and the LS of the hello frame 622. Furthermore, the GD of the acquired entry is copied to the reference point of the hello frame 622. Then, the value of the hop count of 1 (that is, the value set by the node device 111 upon receipt of the hello frame 621) of the acquired entry is set as the hop count of the hello frame 622.

Other node devices 112, 113, and 126 included in the communication-enabled area 102 also operate as the above-mentioned node device 111.

That is, if the LD of the entry having the highest evaluation value is "ID 101" in the entries having the "ID 101" as the GD in the path information 414 about the node device 112, then the node device 112 transmits a hello frame 623. Similarly, if the LD of the entry having the highest evaluation is "ID 101" in the entries having the "ID 101" as the GD in the path information 414 about the node device 113, then the node device 113 transmits a hello frame 624. Then, if the LD of the entry having the highest evaluation is "ID 101" in the entries having the "ID 101" as the GD in the path information 414 about the node device 126, then the node device 126 transmits the hello frame 625.

The "ID 101" is set as the reference point for the hello frames 623, 624, and 625 as with the hello frame 621, and the hop count is set to 1 (value obtained by adding 1 to the hop count of the hello frame 621).

In addition, the hello frame 622 transmitted by the node device 111 is received by the gateway 101 adjacent to the node device 111. The hello frame 622 indicates that the node device 111 as the LS of the hello frame 622 is located at 1 hop from the gateway 101 as the reference point. Therefore, the gateway 101 may register as the node device of 1 hop in the registered node information 314 the node device 111 as the LS of the hello frame 622.

In addition, the hello frame 622 is also received by other node devices 400 (concretely, the node devices 112, 121, 122, and 123) adjacent to the node device 111. Then, each node device 400 which have received the hello frame 622 compares the LD of the entry having the highest evaluation with the LS of the hello frame 622 in the entries having the "ID 101" as the GD in the path information 414. If the LD of the entry having the highest evaluation is equal to the LS of the hello frame 622, the node device 400 recognizes the hop count of 2 from the node device 400 to the gateway 101. The value of 2 in the description above is obtained by adding 1 to the hop count of the hello frame 622.

When the node device 400 recognizes the hop count from the node device 400 to the gateway 101 as described above as 2 upon receipt of the hello frame 622, it sets each field as follows when a hello frame is transmitted next. That is, the node device 400 sets its own node ID for the GS and the LS, sets the "ID 101" for the reference point as with the hello frame 622, and sets the recognized value of 2 as described above for the hop count.

For example, in FIG. 1, the node devices 121 and 122 connected to the node device 111 by solid lines recognize the hop count up to the gateway 101 as 2, and then transmit the hello frame whose hop count is set to 2.

On the other hand, for example, according to the path information 414a about the node device 112, as illustrated in FIG. 7, the LD of the entry having the highest evaluation in the entries having the "ID 101" for the GD is "ID 101". The "ID 101" is different from the LS of the received hello frame 622. Therefore, the node device 112 transmits the above-mentioned hello frame 623 even after the reception of the hello frame 622. That is, even after the reception of the hello frame 622, the node device 112 does not transmit a hello frame whose hop count is set to 2.

Each of the node devices 400 which have received other hello frames 623 through 625 performs a similar process. Thus, each node device 400 in the communication system 100 (concretely, each of the node devices 111 through 143) recognizes the hop count from the node device 400 itself to the gateway 101 in the transmission path of the actual data frame to the gateway 101. That is, the node device 400 recognizes the hop count from the node device 400 itself to the gateway 101 in the transmission path through the adjacent node device selected by the node device 400 as the LD when the GD transmits the frame of the gateway 101.

Therefore, in the unstable and transitional state of the path information 414, it may be possible that the node device 126 incidentally transmits the hello frame 625. However, the node device 126 comes to transmit the hello frame 626 after the path information 414 becomes stable.

That is, if FIG. 1 illustrates the state after the stable state, according to FIG. 1, the node device 126 selects the node device 113 (that is, the node connected to the node device 126 by solid line in FIG. 1) as the LD when the GD is the gateway 101. Therefore, when the path information 414 in the node device 126 becomes stabilized after the transitional state, the LD of the entry having the highest evaluation in the entries in which the GD is the "ID 101" in the path information 414 is "ID 113".

Therefore, in the stable state in which the node device 126 selects the node device 113 as the LD, as illustrated in FIG. 1, the node device 126 transmits the hello frame 626 whose hop count is set to 2. The node device 126 may recognize the hop count 2 by adding 1 to the hop count of the hello frame 624 received from the node device 113.

In addition, since the node device 126 is located in the communication-enabled area 102, the gateway 101 may receive the hello frame 626 from the node device 126. The gateway 101 may recognize the received node device 126 as the LS of the received hello frame 626 as a "node device whose hop count from the gateway 101 is not 1".

The switchover instruction frame 630 is also an example of the hello frame 610 in a broad sense. As a concrete example of control information in the hello frame 610 in a broad sense, the switchover instruction frame 630 includes a switchover instruction. As illustrated in the drawings of the switchover instruction frames 631 through 634, the format of the switchover instruction may be varied depending on the embodiments. Furthermore, a plurality of formats of switchover instructions may be used in combination in one embodiment.

For example, the switchover instruction frame 631 includes, as a switchover instruction, only a subtype field in which a specified value (expressed as a "Switch" for convenience in explanation) indicating a switchover instruction is set.

In addition, any of the switchover instruction frames 632 through 634 include the subtype field in which the value of "Switch" is set, a length field, and a detail field of the length set in the length field.

Concretely, in the switchover instruction frame 632, the value of the length field is "17", and the value of the detail field is "ID 111, ID 112, ID 113". The detail field in the switchover instruction frame 632 indicates the list of the node IDs of the node device 400 located at 1 hop from the gateway 101.

In a switchover instruction frame 633, the value of the length field is "25", and the value of the detail field is "not ChC, ID 111, ID 112, ID 113". The detail field in the switchover instruction frame 633 indicates a list of prohibit channels excluded from the candidates for a channel specified by the channel specification unit 425 and a list of node IDs of the node device 400 located at 1 hop from the gateway 101. That is, in the switchover instruction frame 633, the channel ChC is specified as a prohibit channel.

For example, when the interference source 201 is located near the gateway 101 as in the example illustrated in FIG. 1, it is preferable that the prohibition information (for example, the information referred to as "not ChC") for specifying a prohibited channel is included in the switchover instruction for the following reason.

For example, assume that the frequency band of the radio waves from the interference source 201 overlaps the channel ChC. The gateway 101 may fail in recognizing the correct position of the interference source 201 or the range of the interference area 202. However, the gateway 101 may estimate from the calculation result of the RSSI calculation unit 323 that there is any interference source which generates a radio wave of a frequency band overlapping the channel ChC near the gateway 101.

When the interference source is located near the gateway 101, there is a probability that the node devices 111 through 113 which may perform communications within 1 hop from the gateway 101 are also subject to the influence of the interference source. Actually, as illustrated in FIG. 1, the communication-enabled area 102 which performs communications within 1 hop from the gateway 101 may overlap the interference area 202, and the node devices 112 and 113 may be included in the interference area 202.

In addition, regardless of whether or not the node devices 111 through 113 are included in the interference area 202, the gateway 101 is still subject to the influence from the interference source 201 if the interference source 201 is closely located. Therefore, there is a strong probability that the gateway 101 fails in receiving a frame transmitted through the channel ChC.

Thus, when the gateway 101 detects that the channel ChC is subject to the interference, the prohibition information for specifying the channel ChC as a prohibited channel may be included in the switchover instruction frame 632. Then, the gateway 101 may allow the node devices 112 and 113 to transmit a frame to the gateway 101 without the channel ChC.

When there is the interference from the interference source 201 as described above, there is only a smal possibility that the gateway 101 successfully receive a frame even if the frame is transmitted through the channel ChC. Therefore, if the prohibit information is used when there is the interference source 201, such use of the prohibit information enables effective selection of a channel, thereby contributing to the reduction or solution of the congestion.

Back to the explanation with reference to FIG. 8, in the switchover instruction frame 634, the value of the length field is "29", and the value of the detail field is "ID 111=ChB, ID 112=ChC, and ID 113=ChD". That is, the detail field in the switchover instruction frame 634 is a list, and each element of the list is a pair of the node ID of the node device 400 at 1 hop from the gateway 101 and the specification of a channel.

In an embodiment, the channel specification unit 425 of the node device 111 selects the channel ChB as a transmission channel when the switchover instruction frame 634 is received. Similarly, the channel specification unit 425 of the node device 112 selects the channel ChC as a transmission channel when the switchover instruction frame 634 is received. In addition, the channel specification unit 425 of the node device 113 selects the channel ChD as a transmission channel when the switchover instruction frame 634 is received.

In another embodiment, the channel specification unit 425 of each of the node devices 111 through 113 may select again the transmission channel after receiving the switchover instruction frame 634 according to the round robin algorithm each time a frame is transmitted. Then, the channel specification unit 425 of the node device 111 may use the channel ChB as the start channel of the round robin algorithm according to the switchover instruction frame 634.

Similarly, the channel specification unit 425 of the node device 112 may use the channel ChC as the start channel of the round robin algorithm. In addition, the channel specification unit 425 of the node device 113 may use the channel ChD as the start channel of the round robin algorithm.

The switchover instruction frames 631 through 634 illustrated in FIG. 8 are examples of the switchover instruction frame 630 transmitted from the gateway 101. Therefore, the value of "ID 101" is set for the GS and LS fields of the switchover instruction frames 631 through 634.

In addition, in the explanation below, it is assumed that "the format of the switchover instruction frame 631 is adopted as the switchover instruction frame 630 according to the present embodiment." However, in other embodiments, the formats such as the switchover instruction frame 632, 633, or 634 may be adopted.

Described next are the frames in FIG. 9. The restore instruction frame 640 in FIG. 9 is also an example of the hello frame 610 in a broad sense in FIG. 8. As a concrete example of the control information in the hello frame 610 in a broad sense, the restore instruction frame 640 includes a restore instruction. The restore instruction is to instruct the node device 400 to return the transmission channel used in a transmission to the gateway 101 to the default channel (the channel ChA in the present embodiment).

For example, a restore instruction frame 641 includes as a restore instruction only the subtype field in which a specific value (hereafter referred to as "Restore" for convenience of explanation) indicating the restore instruction is set. Since the restore instruction frame 641 is an example of the restore instruction frame 640 transmitted from the gateway 101, the value of "ID 101" is set for the GS and LS fields.

In the frame 600 in FIG. 8, a synchronization frame 650 in FIG. 9 is specified by the value of "Sync" in the type field. The synchronization frame 650 is used to synchronize the time between the gateway 101 in the communication system 100 and a plurality of node devices 400.

The synchronization frame 650 is broadcast only in the range of 1 hop, and is not forwarded. Therefore, in the synchronization frame 650, an invalid value of "Invalid" for the node ID is set for the GD. The values of the GS and the LS are equal to each other. A special value of "BC" indicating a broadcast is set for the LD. The synchronization frame 650 has time information as a payload.

A synchronization frame 651 is a concrete example of the synchronization frame 650. Since the synchronization frame 651 is transmitted from the gateway 101, the "ID 101" is set for the GS and the LS. In addition, the synchronization frame 651 includes the time information indicating the time point of 13:09:32.045 on Sept. 29, 2010.

In the frame 600 in FIG. 8, the value of "Data" is specified in the type field for a data frame 660 illustrated in FIG. 9. The data frame 660 has as payloads a length field and an application data field of the length set in the length field. The data stored in the application data field is collected by the gateway 101, associated with the node ID indicated in the GS field, and stored in the data server 213.

For example, it is assumed that the data detected by the sensor connected to the node device 142 in FIG. 1 is used as the application data, and the length of the data detected by the sensor is 250. The data frame 660 including the data detected by the sensor connected to the node device 142 is transmitted from the node device 142 to the gateway 101 through the node devices 139, 126, and 113. The data frame 661 is an example of the data frame 660 transmitted from the node device 139 to the node device 126 in the process of the above-mentioned multi-hop transmission.

Therefore, in the data frame 661, the "ID 101" as the node ID of the gateway 101 is set in the GD field. Then, in the GS field, the "ID 142" as the node ID of the node device 142 which has generated the application data based on the output from the sensor is set. In the LD and LS fields, the "ID 139" and the "ID 126" are set respectively. In the length field, the value of "250" is set.

In the frame 600 in FIG. 8, the frame in which the value of "Reg" is specified in the type field is the registration request frame 670 in FIG. 9. The registration request frame 670 is used by each node device 400 to request the gateway 101 to register the node device 400 itself as the "node device 400 which transmits the data frame 660 to the gateway 101".

The registration request frame 670 may be a target to be multi-hop forwarded in the communication system 100 as with the data frame 660. In addition, the registration request frame 670 has an IP address field and a MAC address field as a payload. In the IP address field, the IP address of the node device 400 having the node ID set in the GS field is set. In the MAC address field, the MAC address of the node device 400 having the node ID set in the GS field is set.

For example, when the node device 137 in FIG. 1 generates and transmits the registration request frame 670, the registration request frame 670 is forwarded to the gateway 101 through the path similar to that of the data frame 660. That is, the registration request frame 670 is transmitted from the node device 137 to the gateway 101 through the node devices 125 and 113. A registration request frame 671 is an example of the registration request frame 670 transmitted from the node device 125 to the node device 113 in the process of the above-mentioned multi-hop transmission.

Therefore, in the registration request frame 671, the "ID 101" as the node ID of the gateway 101 is set in the GD field, and the "ID 137" as the node ID of the node device 137 is set in the GS field. In the LD and LS fields, the "ID 113" and the "ID 125" are set respectively. Then, in the IP address field, "172.16.0.137" as the IP address of the node device 137 is set.

In the MAC address field, "00:00:0E:11:22:89" as the MAC address of the node device 137 is set.

Next, the process performed by the gateway 101 is described with reference to the flowcharts in FIGS. 10 through 12.

When the gateway 101 is powered on, the initialization in step S101 is performed.

Concretely, the synchronization processing unit 330 accesses the NTP server 212 through the network I/F 308 and the network 211, and corrects the time of the timer 331 according to the NTP. Then, the synchronization processing unit 330 generates the synchronization frame 650 including the corrected time of the timer 331, and outputs it to the transmitter 303. Then, the transmitter 303 transmits the synchronization frame 650 through the switch 302 and the antenna 301.

In step S101, the hello frame generation unit 332 also generates the hello frame 621 in FIG. 8, and outputs it to the transmitter 303. Then, the transmitter 303 transmits the hello frame 621 through the switch 302 and the antenna 301.

In addition, the synchronization schedule and the hello frame transmission schedule included in the system parameters 313*a* may be predetermined constants, and may also be initialized to appropriate values based on the current time in step S101.

When the initialization is completed in step S102, the synchronization processing unit 330 refers to the system parameter 313 and the timer 331, and judges whether or not a specified time has passed from the previous synchronizing process. The "specified time" in step S102 is one hour in the example in which the synchronization schedule is determined as once in an hour as with the system parameters 313*a* in FIG. 5.

When a specified time has passed from the previous synchronizing process (that is, when the time indicated by the timer 331 has reached the specified time determined by the synchronization schedule), the process proceeds to step S103. On the other hand, if the specified time has not yet passed from the previous synchronizing process, the process proceeds to step S104.

In step S103, the synchronization processing unit 330 accesses the NTP server 212 through the network I/F 308 and the network 211, and corrects the time of the timer 331 according to the NTP. Then, the synchronization processing unit 330 generates the synchronization frame 650 according to the corrected time of the timer 331, and outputs it to the transmitter 303. Then, the transmitter 303 transmits the synchronization frame 650 through the switch 302 and the antenna 301. Then, the process proceeds to step S104.

In step S104, the hello frame generation unit 332 refers to the system parameter 313 and the timer 331 and judges whether or not a specified time has passed from the previous transmission of the hello frame. The "specified time" in step S104 is 1 minute in the example in which the hello frame transmission schedule is determined as once per minute as with the system parameters 313*a* in, for example, FIG. 5.

When the specified time has passed from the previous transmission of the hello frame (that is, when the time indicated by the timer 331 has reached the time determined by the hello frame transmission schedule), the process proceeds to step S105. On the other hand, if the specified time has not yet passed from the previous transmission of the hello frame, the process proceeds to step S106.

In step S105, the hello frame generation unit 332 specifies the gateway 101 as a reference point, generates the hello frame 621 which has specified 0 as the hop count, and outputs it to the transmitter 303. Then, the transmitter 303 transmits the hello frame 621 through the switch 302 and the antenna 301. Then, the process proceeds to step S106.

In step S106, the reception processing unit 321 judges whether or not a notification that the frame has been received has been received from any of the receivers 305A through 305D. If the gateway 101 has received any frame, the reception processing unit 321 has received the notification that the frame has been received from any of the receivers 305A through 305D, and thus the reception processing unit 321 judges "the frame has been received", and the process proceeds to step S107. On the other hand, if the gateway 101 has received no frame, the reception processing unit 321 judges "there is no reception", and the process returns to step S102.

In step S107, the type judgment unit 322 reads the type of the received frame from the reception buffer area 312 based on the starting address notified from the receiver (any of the receivers 305A through 305D) which has notified the reception processing unit 321 of the reception of a frame. Then, the type judgment unit 322 judges whether or not the value of the read type is "Reg" (that is, whether or not the received frame is the registration request frame 670).

If the value of the type is "Reg", the type judgment unit 322 requests the registration processing unit 327 to perform the process which accompanies the reception of the registration request frame 670, and requests the reception time acquisition unit 325 to acquire the reception time, thereby passing process to step S108. On the other hand, if the value of the type is any other than "Reg", the process proceeds to step S110.

In step S108, the reception time acquisition unit 325 refers to the timer 331, acquires the current time as the reception time of the registration request frame 670, and outputs the acquired reception time to the registration processing unit 327.

Furthermore, in the next step S109, the registration processing unit 327 registers the node device 400 that is the GS of the registration request frame 670, in the registered node table 314a.

For example, assume that the frame whose reception has been detected in step S106 is the registration request frame 671 in FIG. 9. In this case, the value of the GS field is "ID 137" indicating the node device 137. Thus, in step S109, the registration processing unit 327 searches the registered node table 314a for an entry in which the value of the "node ID" field is "ID 137". If the entry is found as a result of the search, the registration processing unit 327 further performs the subsequent processes (E1) through (E4) in step S109. In step S109, the process (E4) may be omitted.

(E1) The registration processing unit 327 copies the IP address of the received registration request frame 671 to the "IP address" field of the found entry.

(E2) The registration processing unit 327 copies the MAC address of the received registration request frame 671 to the "MAC address" field of the found entry.

(E3) The registration processing unit 327 sets the reception time output from the reception time acquisition unit 325 at the "registration time" field of the found entry.

(E4) The registration processing unit 327 judges whether or not the values of the GS and the LS are equal to each other in the received registration request frame 671. If the two values are equal to each other, the registration processing unit 327 sets the value of True in the "1 hop" field of the found entry. On the other hand, if the two values are different from each other, the registration processing unit 327 sets the value of False in the "1 hop" field of the found entry.

If no entry is found in the registered node table 314a as a result of the search, the registration processing unit 327 further generates a new entry in the registered node table 314a in step S109. Then, the registration processing unit 327 performs the processes similar to above-mentioned (E1) through (E4) on the generated entry. When a new entry is generated, the process of (E4) may be omitted as described above.

If the registration is completed in step S109 as described above, the process returns to step S102.

In step S110, the type judgment unit 322 judges whether or not the value of the read type in step S107 is "Hello" (that is, whether or not the received frame is the hello frame 610 in a broad sense). In the present embodiment, in the hello frames 610 in a broad sense having the value of the type of "Hello", the switchover instruction frame 630 and the restore instruction frame 640 are frames to be transmitted by the gateway 101 itself, and are not received by the gateway 101. Therefore, if the value of the type is "Hello", the received frame is the hello frame 620, and the value of subtype is also "Hello".

Accordingly, when the value of the type is "Hello", the type judgment unit 322 requests the registration processing unit 327 to perform the process which accompanies the reception of the hello frame 620, and requests the reception time acquisition unit 325 to acquire the reception time, thereby passing process to step S111. On the other hand, if the value of the type is any other than "Hello", the process proceeds to step S115.

In step S111, the reception time acquisition unit 325 refers to the timer 331, acquires the current time as the reception time of the registration request frame 670, and outputs the acquired reception time to the registration processing unit 327.

Furthermore, in the next step S112, the registration processing unit 327 judges whether the hop count specified in the received hello frame 620 is 1 or at least 2. If the hop count is 1, the process proceeds to step S113. If the hop count is two or more, the process proceeds to step S114.

Figure 10:
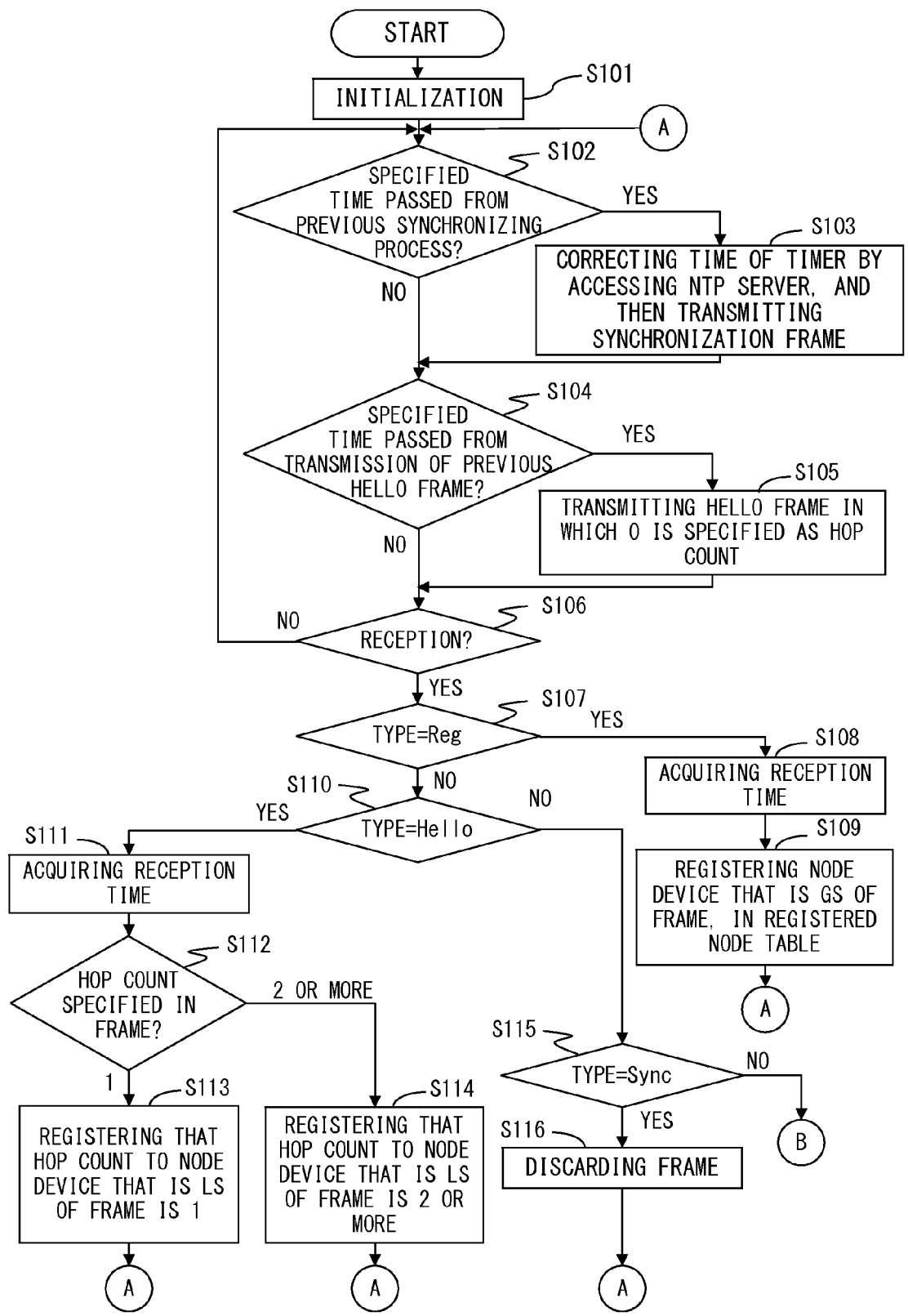
FIG. 10 is a flowchart (No. 1) of the process performed by a gateway.
Figure 11:
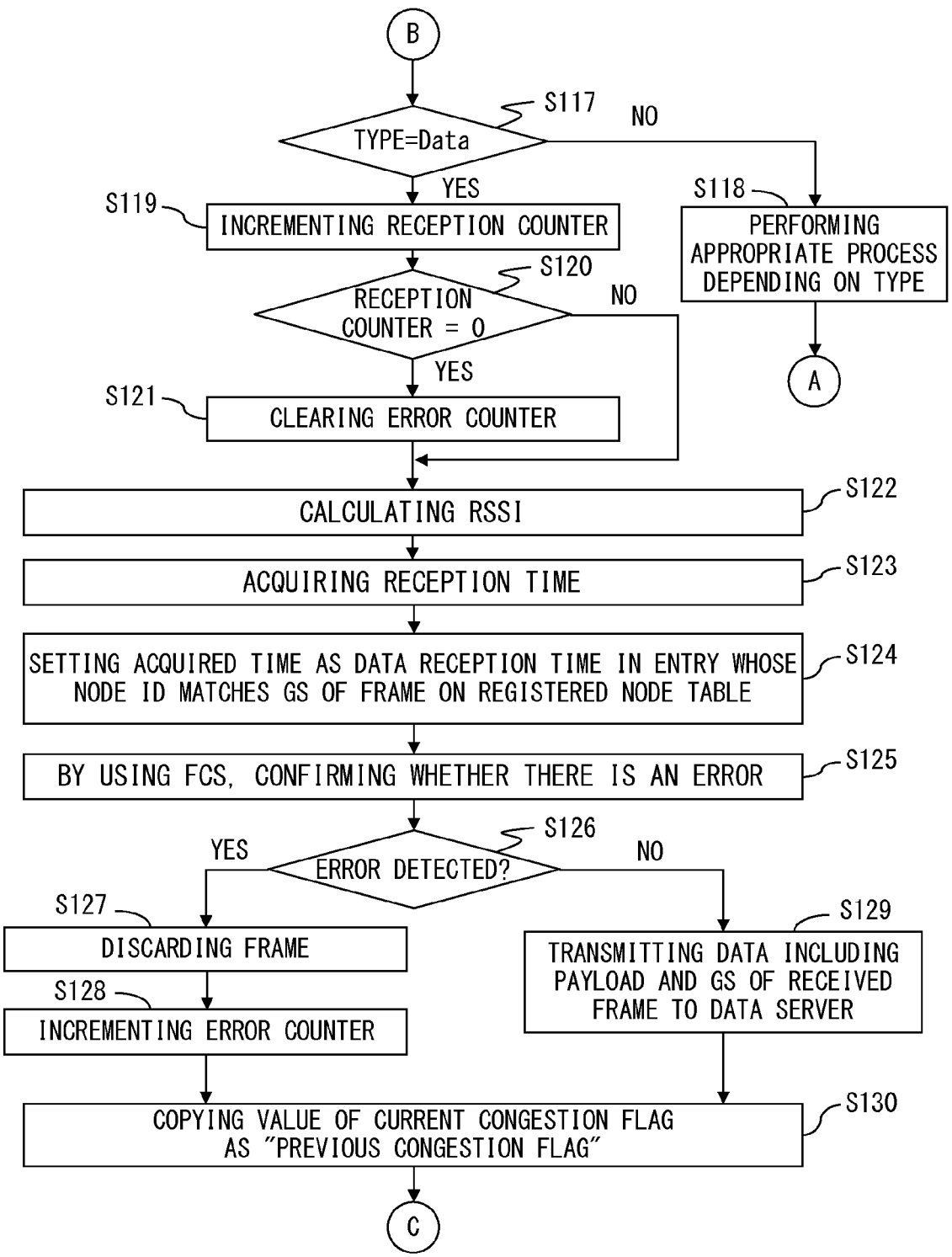
FIG. 11 is a flowchart (No. 2) of the process performed by the gateway.
Figure 12:
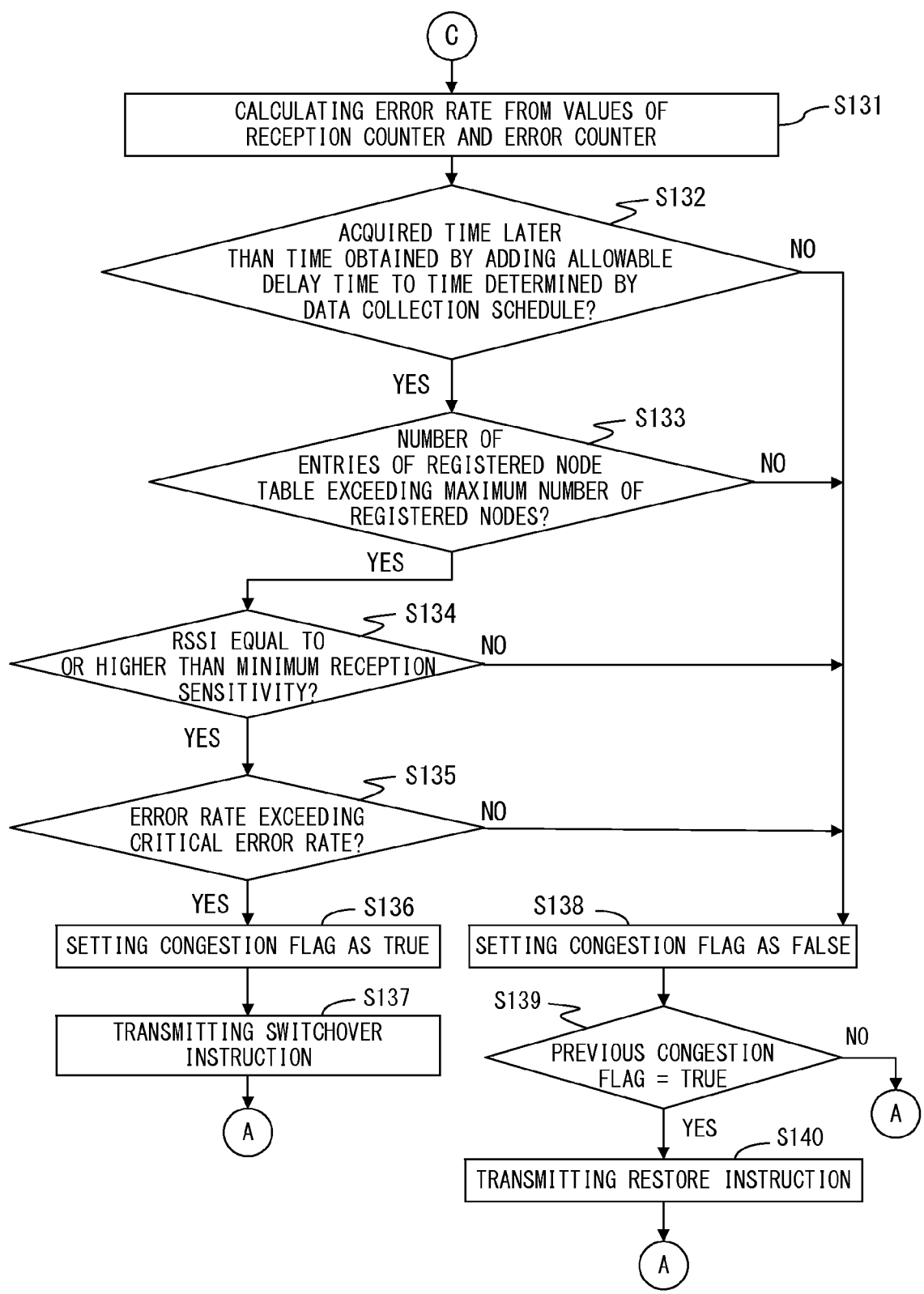
FIG. 12 is a flowchart (No. 3) of the process performed by the gateway.
Figure 13:
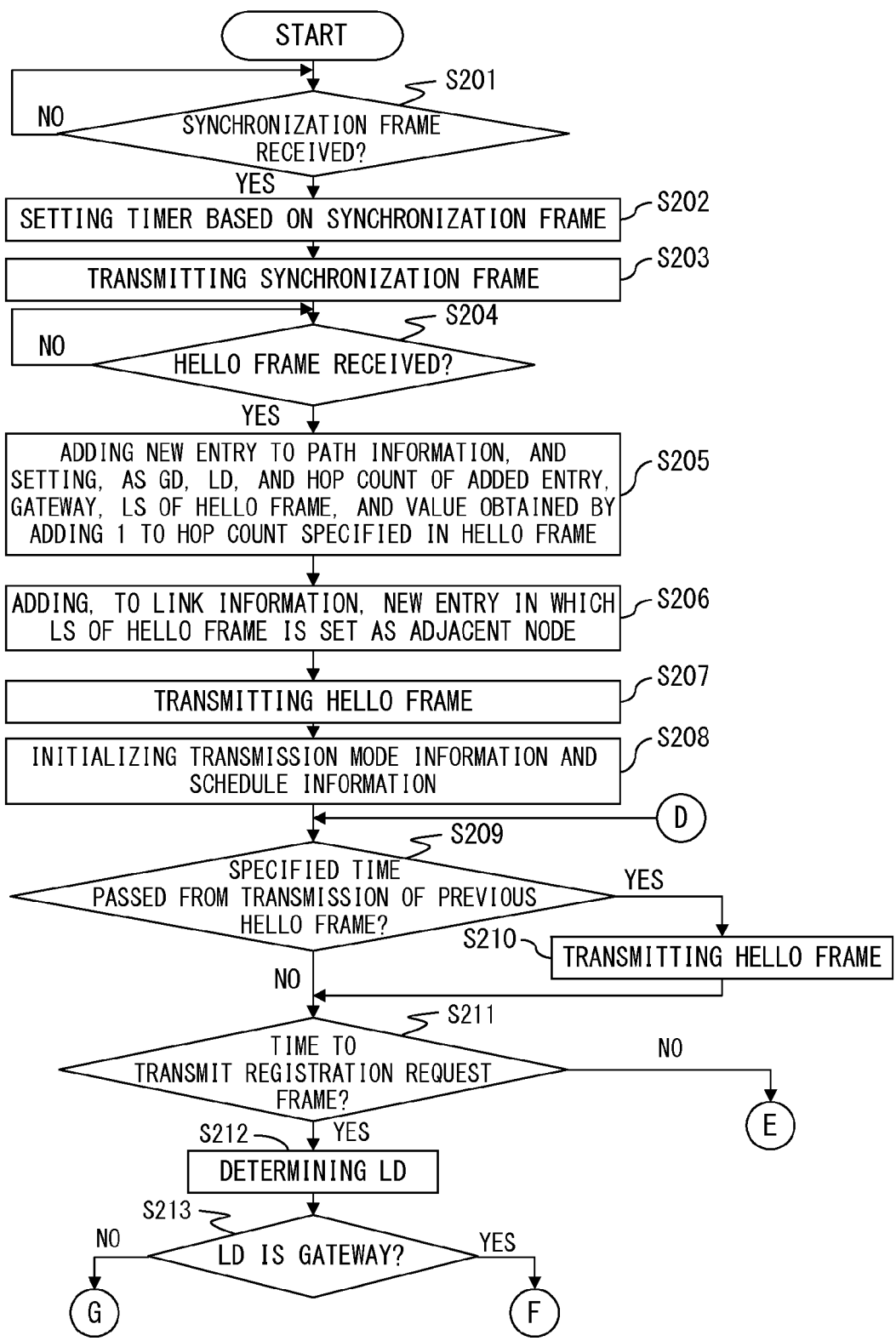
FIG. 13 is a flowchart (No. 1) of the process performed by a node device.

For simple explanation, it is assumed that only the "ID 101" as the node ID of the gateway 101 is set as a reference point in the hello frame 620 in the explanation of FIGS. 10 through 12.

Obviously, depending on the embodiment, the node ID of the node device 400 other than the gateway 101 may be set as a reference point in the hello frame 620. For example, in the embodiment in which the node device 400 other than the gateway 101 may be set as the GD, the hello frame 620 whose node ID of the node device 400 is set as a reference point may be transmitted. However, whether or not such a hello frame 620 is to be used is regardless of various types of control relating to the congestion in the range of 1 hop from the gateway 101. Therefore, by setting the above-mentioned assumption, the explanation of FIGS. 10 through 12 is simplified in the present specification.

According to the assumption above, the node ID of the gateway 101 is specified as a reference point of the received hello frame 620. Therefore, the hop count specified by the hello frame 620 is nothing less than the hop count from the gateway 101.

In step S113, the registration processing unit 327 registers in the registered node information 314 that the hop count from the gateway 101 to the node device 400 that is the LS of the received hello frame 620 is 1. The registration processing unit 327 deletes the hello frame 620 from the reception buffer area 312. Then, the process returns to step S102.

The details of step S113 are, for example, described as follows. First, the registration processing unit 327 searches the registered node table 314a for an entry having the node ID equal to the LS of the received hello frame 620. If the entry is found as a result of the search, the registration processing unit 327 sets the value of True in the 1 hop field of the found entry.

If no entry is found as a result of the search, the registration processing unit 327 performs no special process.

In step S114, the registration processing unit 327 registers in the registered node information 314 that the hop count from the gateway 101 to the node device 400 that is the LS of the received hello frame 620 is 2 or more. In addition, the registration processing unit 327 deletes the hello frame 620 from the reception buffer area 312.

The details of step S114 are similar to those of step S113, and the only difference is that the registration processing unit 327 sets not the value of True, but the value of False. Then, the process returns to step S102.

In step S115, the type judgment unit 322 judges whether or not the value of the type read in step S107 is "Sync" (that is, whether or not the received frame is the synchronization frame 650). If the value of the type is "Sync", the process proceeds to step S116. If the value of the type is not "Sync", the process proceeds to step S117 in FIG. 11.

In step S116, the type judgment unit 322 discards the last received frame by any of the receivers 305A through 305D because, according to the present embodiment, the node device 400 performs the synchronizing process depending on the synchronization result in the gateway 101 while the gateway 101 does not perform the synchronizing process depending on the synchronization result in the node device 400. Therefore, when the synchronization frame 650 from the node device 400 is received by the gateway 101, the gateway 101 discards unnecessary the synchronization frame 650 in step S116. After the discard, the process returns to step S102.

In step S117 in FIG. 11, the type judgment unit 322 judges whether or not the value of the type read in step S107 is "Data" (that is, the received frame is the data frame 660). If the value of the type is not "Data", the process proceeds to step S118.

On the other hand, when the value of the type is "Data", the type judgment unit 322 operates as follows. That is, the type judgment unit 322 requests the RSSI calculation unit 323 to calculate the RSSI, requests the FCS check unit 324 to check the FCS, and requests the reception time acquisition unit 325 to acquire the reception time. The type judgment unit 322 requests the data processing unit 326 and the registration processing unit 327 to perform the process which accompanies the reception of the data frame 660. Then, the process proceeds to step S119.

Exception handling is performed in step S118. In the present embodiment, when only the type illustrated in FIGS. 8 and 9 is used, the CPU 306 concretely performs error handling in step S118 when a frame of an illegal type is received.

However, obviously depending on the embodiment, the frame of the type other than that illustrated in FIGS. 8 and 9 may be further defined. In this case, the CPU 306 performs an appropriate process depending on the type of the frame judged by the type judgment unit 322 in step S118. Therefore, the details of step S118 are arbitrary depending on the embodiment. After the execution of step S118, the process returns to step S102 in FIG. 10.

In steps S119 through S121, the FCS check unit 324 performs preprocessing for calculating an error rate. In the present embodiment, the FCS check unit 324 has two counters, that is, a "reception counter" and an "error counter", for calculating an error rate. In addition, the FCS check unit 324 saves and stores a past error counter value.

Although omitted in the explanation of the process in step S101 above, the FCS check unit 324 initializes the values of the reception counter and the error counter to 0, for example, in step S101. Furthermore, in step S101, the FCS check unit 324 initializes the past error counter value to a specific value (−1, for example) indicating that the value from the error counter has not been copied.

For convenience of explanation, it is assumed in the following descriptions that the reception counter and the error counter are 8-bit counters capable of counting 0 through 255. However, the bit count of the counter is obviously arbitrary depending on the embodiment.

Concretely, in step S119, the FCS check unit 324 increments the reception counter.

Then, in the next step S120, the FCS check unit 324 judges whether or not the reception counter value is 0. When the reception counter value is 0, the process proceeds to step S121. If the reception counter value is not 0, the process proceeds to step S122. The reception counter value of 0 refers to that an increment is made in step S119 when the reception counter value is 255.

In step S121, the FCS check unit 324 saves the error counter value as a past error counter value. Then, to accord with the return of the value of the reception counter to 0, the FCS check unit 324 clears the error counter. Afterwards, the process proceeds to step S122.

In step S122, the RSSI calculation unit 323 calculates the RSSI, and outputs the calculated RSSI to the congestion judgment unit 328.

In the next step S123, the reception time acquisition unit 325 refers to the timer 331, and acquires the current time as the reception time of the data frame 660. The reception time acquisition unit 325 outputs the acquired time to both the registration processing unit 327 and the congestion judgment unit 328.

Furthermore, in step S124, the registration processing unit 327 searches the registered node table 314a for an entry whose node ID matches the GS of the received data frame 660. When the entry is found as a result of the search, the registration processing unit 327 sets the time output from the reception time acquisition unit 325 as the data reception time in the found entry.

On the other hand, if no entry is found as a result of the search, the registration processing unit 327 adds a new entry to the registered node table 314a. Then, the registration processing unit 327 sets the GS of the received data frame 660 as the node ID in the added entry, and sets the time output from the reception time acquisition unit 325 as the data reception time.

By the process above in step S124, the registered node table 314a is appropriately updated regardless of the case in which the data frame 660 is received from the registered node device 400 or the case in which the data frame 660 is suddenly received from the unregistered node device 400 before a register request.

In the next step S125, the FCS check unit 324 reads the received data frame 660 from the reception buffer area 312, and calculates the FCS from the range of the GD to the application data. The FCS check unit 324 then confirms whether there is an error or not by comparing the calculated FCS with the FCS included in the received data frame 660.

Next, the FCS check unit 324 judges that "there is no error" if the two FCS are equal to each other in step S126, and judges that "there is an error" if the two FCS are not equal to each other. In addition, the FCS check unit 324 notifies the data processing unit 326 of a judgment result. If there is an error, the process proceeds to step S127. If there is no error, the process proceeds to step S129.

In step S127, the FCS check unit 324 discards the received data frame 660 (that is, deletes the data frame 660 from the reception buffer area 312). The notification from the FCS check unit 324 in step S126 enables the data processing unit 326 to recognize that the data processing unit 326 is not required to process the received data frame 660.

Then, in the next step S128, the FCS check unit 324 increments the error counter. Afterwards, the process proceeds to step S130.

On the other hand, in step S126, when the data processing unit 326 receives a notification that "there is no error" from the FCS check unit 324, it performs the process relating to the received data frame 660 in step S129. Concretely, the data processing unit 326 generates application data as the payload of the data frame 660, and the data including the value of the GS field of the data frame 660. Then, the data processing unit 326 transmits the generated data to the data server 213 through the network I/F 308 and the network 211.

The data processing unit 326 may further read the IP address and the MAC address from the entry of the registered node table 314a having the same value as the GS of the data frame 660 as a node ID. Then, the data processing unit 326 may include the read IP address and MAC address in the data to be transmitted to the data server 213.

Depending on the embodiment, the gateway 101 may also function as the data server 213. In this case, in step S129, the data processing unit 326 similarly generates data as described above, and accumulates the generated data in the database in the memory 307, but not illustrated in the attached drawings.

After transmitting the data to the data server 213, the data processing unit 326 deletes the data frame 660 from the reception buffer area 312. Then, the process proceeds to step S130.

In step S130, the congestion judgment unit 328 copies the current value of the congestion flag 315a as the "preceding congestion flag". Although the details are described later with reference to step S139, the congestion judgment unit 328 may detect the recovery from the congestion by using the preceding congestion flag.

After step S130, in step S131 illustrated in FIG. 12, the FCS check unit 324 calculates the error rate using the values of the reception counter and the error counter. The method of calculating the error rate may be arbitrary depending on the embodiment.

For example, the FCS check unit 324 may calculate the error rate by the equation (1) when the past error counter value is the above-mentioned specific value (−1, for example), and by the equation (2) otherwise.

$$\text{rate}=\text{err}/\text{rcv} \quad (1)$$

$$\text{rate}=(\text{err}+\text{errOld})/(\text{rcv}+256) \quad (2)$$

In the equations (1) and (2), the "rate" indicates the error rate, the "err" indicates the error counter value, the "rcv" indicates the reception counter value, and the "errOld" indicates the past error counter value. In the equation (2), the value of 256 ($=2^8$) is based on the assumption above that "the two counters are 8-bit counters".

The FCS check unit 324 outputs the calculated error rate to the congestion judgment unit 328. Then, the process proceeds to step S132. In steps S132 through S135, the congestion judgment unit 328 judges whether or not there has occurred the congestion in the 1-hop range from the gateway 101. In the present embodiment, the congestion judgment unit 328 detects the congestion when all conditions (F1) through (F3) below hold.

(F1) The time period taken from the time specified for the data collection schedule of the system parameters 313a to the reception of the data frame 660 by the gateway 101 from all registered node devices exceeds the allowable delay time of the system parameters 313a.

(F2) The number of registered node devices exceeds the maximum number of registered nodes of the system parameters 313a.

(F3) Although the RSSI is equal to or exceeds the minimum reception sensitivity of the system parameters 313a, the error rate detected by the FCS check unit 324 exceeds the critical error rate of the system parameters 313a.

The condition (F1) is a specific condition for the present embodiment. That is, in the present embodiment, since all registered node devices are to transmit the data frame 660 at the same time, the load L of the entire network of the communication system 100 may be estimated from the time T taken by the collection of data as explained above with reference to FIG. 6. If the load L of the entire network of the communication system 100 is heavy, the load in the range in which the traffic specifically concentrates in the communication system 100 (that is, the range of one hop from the gateway 101) is naturally heavy, and the congestion in the range easily occurs.

Accordingly, on the assumption that the allowable delay time (that is, the threshold T0 in FIG. 6) is appropriately defined, the time T taken to collect data is to exceed the allowable delay time.

That is, if the congestion occurs in the range of one hop from the gateway 101, the data frame 660 is not easily transmitted from the node devices 111 through 113 at one hop from the gateway 101 to the gateway 101. As a result, the time T taken to collect data exceeds the allowable delay time.

When the congestion occurs, a long time is taken to transmit the data frame 660 from the node devices 111 through 113 to the gateway 101 for the following reasons (G1) through (G3) for example.

(G1) A transmission fails due to an occurrence of a collision, and a retry of the transmission occurs as a result of the failure.

(G2) In the radio communication system, since it is assumed that a collision occurs when no ACK (acknowledgment) signal is received within a specified time, the specified time is taken as a wait time until the detection of a collision.

(G3) Depending on the protocol of a physical layer, a longer time is set for a backoff time for each retry.

Therefore, according to the present embodiment, if the condition (F1) holds, it means a predictive sign of an occurrence of the congestion. In the present embodiment, the condition (F1) is not a sufficient condition of the occurrence of congestion because the condition (F1) may hold even when no congestion occurs. For example, the condition (F1) may incidentally hold true due to a failure of a registered node device, an incidental fluctuation of a transmission path within the communication system 100, etc.

For example, there may incidentally be a faulty registered node device. Then, the faulty registered node device may transmit the data frame 660 at a time point quite different from that in the data transmission schedule determined according to the schedule information 415.

Furthermore, the communication system 100 may be an ad hoc network system. In the communication system 100, the path from each node device 400 to the gateway 101 may be determined in an autonomous and distributed manner through an exchange of the hello frame 620 etc.

In addition, the path may be dynamically changed depending on the change of an environment. A concrete example of the change of an environment is an addition or a deletion of the node device 400, an occurrence or a movement of the interference source 201, an occurrence or a movement of a shielding, etc.

Therefore, there may incidentally be a loop in the path from a registered node device to the gateway 101 at a certain time point. Then, in the communication system 100, it may take, for example, five minutes to generate a path without a loop. Then, even if no congestion occurs, the delay time from the time point specified in the data collection schedule to the time point at which the gateway 101 completely collects data from all registered node devices may exceed the allowable delay time.

As described above, in the present embodiment, the condition (F1) is used as the necessary condition for detection of the congestion, and is not recognized as a sufficient condition.

Furthermore, for example, when a number of node devices 400 are added to the communication system 100 in FIG. 1, and each of the added node devices 400 transmits the registration request frame 670 to the gateway 101, the number of registered node devices may exceeds the maximum number of registered nodes. With an increasing number of registered node devices, the communications traffic in the one-hop range from the gateway 101 increases and the congestion easily occurs in the range immediately after the time determined by the data collection schedule.

That is, when the number of registered node devices exceeds the maximum number of registered nodes, the gateway 101 is not capable of receiving the data frame 660 from the node device at the first hop from the gateway 101 only by the receiver 305A for the default channel ChA. Accordingly, the condition (F2) is also used as one of the necessary condition for detection of congestion.

The condition (F3) is not limited to the present embodiment in which the data transmission schedule is specified, but is an effective condition in various embodiments. The condition (F3) is explained as follows.

When the RSSI is lower than the minimum reception sensitivity, the reception power is insufficient, thereby not guaranteeing that the gateway 101 is able to correctly receive a frame. Therefore, when the RSSI is lower than the minimum reception sensitivity, it is reasonably assumed that "there has occurred an error due to the influence of noise etc. by insufficient reception power" even if the error rate detected by the FCS check unit 324 has exceeded the critical error rate. That is, when the RSSI is lower than the minimum reception sensitivity, it is not appropriate to assume that "the congestion has occurred".

On the other hand, when the RSSI is equal to or higher than the minimum reception sensitivity, the following two cases may be recognized.

(H1) When the reception environment is preferable, the error rate detected by the FCS check unit 324 is low.

(H2) When the congestion occurs due to the transmission of a large number of frames from the node devices 111 through 113 in the one-hop range from the gateway 101, or due to the existence of the interference source 201 near the gateway 101, the error rate detected by the FCS check unit 324 is high.

Therefore, if the critical error rate is appropriately set, the cases of (H1) and (H2) may be discriminated. Therefore, according to the present embodiment, the condition (F3) is used as one of the necessary conditions in detecting the congestion.

Accordingly, the congestion judgment unit 328 according to the present embodiment detects the congestion only when all of the above-mentioned conditions (F1) through (F3) hold. Concretely, step S132 in FIG. 12 is to judge the condition (F1), step S133 is to judge the condition (F2), and steps S134 through S135 are to judge the condition (F3).

Concretely, in step S132, the congestion judgment unit 328 refers to the system parameter 313*a*, and calculates the time obtained by adding the allowable delay time to the time determined according to the data collection schedule. Then, the congestion judgment unit 328 judges whether or not the reception time of the data frame 660 acquired by the reception time acquisition unit 325 in step S123 and output to the congestion judgment unit 328 is later than the calculated time.

When the reception time is later than the calculated time, the condition (F1) holds. Therefore, the process proceeds to step S133.

On the other hand, if the reception time is simultaneous with or faster than the calculated time, it is not certain whether or not the condition (F1) finally holds. Therefore, the congestion judgment unit 328 judges that "the condition (F1) has not held at the current time point". Then, the process proceeds to step S138.

For example, as in the example in FIG. 4, assume that the reception time of the data frame 660 from the node device 132 is 15:00:35.247. In this case, if the reception of the data frames 660 from all registered nodes is completed within the allowable delay time, it is finally determined that "the condition (F1) does not hold". However, for example, the data frame 660 from the node device 143 may be received by the gateway 101 later than 15:05. Thus, when the data frame 660 is received from the node device 132, it is uncertain whether or not the condition (F1) finally holds.

Therefore, if the reception time is simultaneously with or faster than the calculated time, the congestion judgment unit 328 judges that "the condition (F1) has not held at the current time point" as described above.

In step S133, the congestion judgment unit 328 counts the number of entries of the registered node table 314*a*, and judges whether or not the number of entries has exceeded the maximum number of registered nodes of the system parameters 313*a*. If the number of entries has exceeded the maximum number of registered nodes, the condition (F2) holds, thereby passing process to step S134. On the other hand, when the number of entries is equal to or lower than the maximum number of registered nodes, the condition (F2) does not hold, thereby passing process to step S138.

Then, in step S134, the congestion judgment unit 328 judges whether or not the RSSI which has been output in step S122 from the RSSI calculation unit 323 is equal to or higher than the minimum reception sensitivity of the system parameters 313*a*. When the RSSI is equal to or higher than the minimum reception sensitivity, there is the possibility that the condition (F3) holds, thereby passing process to step S135. On the other hand, if the RSSI is lower than the minimum reception sensitivity, the condition (F3) does not hold as described above, thereby passing process to step S138.

In step S135, the congestion judgment unit 328 judges whether or not the error rate output from the FCS check unit 324 in step S131 has exceeded the critical error rate of the system parameters 313*a*.

Since step S135 is executed when the RSSI is equal to or higher than the minimum reception sensitivity, the condition (F3) holds if the error rate has exceeded the critical error rate. In addition, step S135 is executed when it is clear in steps S132 and S133 that the conditions (F1) and (F2) hold.

Therefore, if the error rate exceeds the critical error rate, the congestion judgment unit 328 judges that "the congestion has occurred". Then, the process proceeds to step S136.

On the other hand, if the error rate does not exceed the critical error rate, the condition (F3) does not hold. Therefore, the congestion judgment unit 328 judges that "the congestion has not occurred". Then, the process proceeds to step S138.

Steps S136 and S137 are executed when the congestion judgment unit 328 detects the congestion. Concretely, in step S136, the congestion judgment unit 328 sets the congestion flag 315a as True, and notifies the instruction issue unit 329 of the detection of the congestion.

Then, in the next step S137, the instruction issue unit 329 generates the switchover instruction frame 630, and outputs it to the transmitter 303. Then, the transmitter 303 transmits the switchover instruction frame 630 through the switch 302 and the antenna 301.

The transmitted switchover instruction frame 630 is received by the node devices 111, 112, 113, and 126 in the communication-enabled area 102. As explained above with reference to FIG. 8, the concrete format of the switchover instruction frame 630 varies depending on the embodiment. After transmitting the switchover instruction frame 630, the process returns to step S102 in FIG. 10.

Steps S138 through S140 are executed when the congestion judgment unit 328 detects no congestion. Concretely, in step S138, the congestion judgment unit 328 sets the congestion flag 315 as False.

Then, in step S139, the congestion judgment unit 328 refers to "the previous congestion flag" for which the value is set in step S130. Assuming that the value of the current congestion flag 315a is False, the case in which the value of the previous congestion flag is True refers to the case in which the congestion has been solved. Furthermore, the case in which the value of the previous congestion flag is False refers to the case in which a non-congestion state continues.

Therefore, when the value of the previous congestion flag is True, the congestion judgment unit 328 detects the solution of the congestion, and notifies the instruction issue unit 329 that the solution of the congestion has been detected. Then, the process proceeds to step S140. On the other hand, when the value of the previous congestion flag is False, the process returns to step S102 in FIG. 10.

In addition, in step S140, the instruction issue unit 329 generates the restore instruction frame 640, and outputs it to the transmitter 303. Then, the transmitter 303 transmits the restore instruction frame 640 through the switch 302 and the antenna 301.

The transmitted restore instruction frame 640 is received by the node devices 111, 112, 113, and 126 in the communication-enabled area 102. After transmitting the restore instruction frame 640, the process returns to step S102 in FIG. 10.

As described above, the gateway 101 monitors the occurrence of the congestion. When the congestion occurs, the gateway 101 transmits the switchover instruction frame 630. When the congestion is solved, the gateway 101 transmits the restore instruction frame 640. That is, the gateway 101 indirectly controls the transmission channel of the node device 400 in the 1-hop range from the gateway 101 by transmitting the switchover instruction frame 630 and the restore instruction frame 640.

As a result, the communication load is distributed to a plurality of channels as appropriate. However, unless there occurs congestion, only a default channel is used. Therefore, the wireless communication channel as a finite resource is efficiently used.

It is more preferable that the congestion judgment unit 328 refers to the previous congestion flag after the execution of step S136, and executes step S137 only when the value of the previous congestion flag is False. That is, the case in which the value of the previous congestion flag is True refers to the case in which "the congestion has already been detected, and the congestion still continues", thereby preferably omitting step S137.

The process performed by the node device 400 is described next with reference to the flowcharts in FIGS. 13 through 17. First, the outline is described as follows. The steps not appearing in the following description of the outline are those for conditional branches or for performing exception handling.

The node device 400 first performs initialization in steps S201 through S208. In and after step S209, the processes are performed iteratively.

In steps S209 through S224, the node device 400 appropriately transmits a frame according to the schedule information 415. Afterwards, if a frame is received, the node device 400 appropriately performs the processes in and after step S226.

That is, the node device 400 performs steps S227 and S228 when it receives the synchronization frame 650. The node device 400 also performs steps S231 through S238 when it receives the data frame 660 or registration request frame 670 to be multi-hop transmitted in the communication system 100.

In addition, the node device 400 performs steps S246 through S249 when it receives the switchover instruction frame 630, and performs step S244 when it receives the restore instruction frame 640. The node device 400 performs steps S252 through S257 when it receives the hello frame 620.

The process of the node device 400 the outline of which is described above is explained below in detail.

When the node device 400 is powered on, it waits for the reception of the synchronization frame 650 first in step S201. Concretely, the node device 400 waits until the synchronization processing unit 426 is notified of the reception of the synchronization frame 650 from the type judgment unit 421.

When the node device adjacent to the node device 400 transmits the synchronization frame 650, the receiver 404 receives the synchronization frame 650 through the antenna 401 and the switch 402. Then, the receiver 404 outputs the received synchronization frame 650 to the transmission/reception buffer area 411.

Furthermore, the receiver 404 notifies the type judgment unit 421 of the reception of the frame, and the starting address in the transmission/reception buffer area 411 of the received frame. Then, the type judgment unit 421 refers to the transmission/reception buffer area 411, and recognizes that the received frame is the synchronization frame 650. The type judgment unit 421 notifies the synchronization processing unit 426 of the reception of the synchronization frame 650 and the starting address in the transmission/reception buffer area 411 of the synchronization frame 650.

Until the notification is received from the type judgment unit 421 as described above after the node device 400 is powered on, the synchronization processing unit 426 waits in step S201. When the synchronization processing unit 426 receives the notification from the type judgment unit 421, the process proceeds to step S202.

In step S202, the synchronization processing unit 426 sets the timer 427 based on the synchronization frame 650. Concretely, the synchronization processing unit 426 first reads the time information included in the payload of the received synchronization frame 650 from the transmission/reception buffer area 411. Then, the synchronization processing unit 426 sets in the timer 427 the time obtained by adding the specified time (hereafter referred to as "Δt") to the time (hereafter referred to as "t1") indicated by the read time information.

For example, the time Δt is a value obtained by dividing the size of the synchronization frame 650 by the transmission rate. According to the present embodiment, the synchronization frame 650 has a fixed length. In addition, the transmission rate depends on the specification of the communication protocol of a physical layer. Therefore, for example, the time Δt may be defined by the program 418 as a constant indicating the 1-hop transmission delay time, and the synchronization processing unit 426 may recognize the time Δt.

Otherwise, when a certain time, such as the time taken for the type judgment unit 421 to judge the type, is not negligible, the value obtained by adding a predetermined time such as the processing time of the type judgment unit 421 to the 1-hop transmission delay time may be defined as the time Δt.

In addition, the synchronization processing unit 426 may recognize the time Δt as follows. Since the timer 427 starts operating immediately after the node device 400 is powered on, the receiver 404 may refer to the timer 427, and thereby recognize the point in time at which the preamble of the frame starts to be detected by the receiver 404 and the point in time at which the receiver 404 completes the reception of the synchronization frame 650. Then, the receiver 404 may notify the synchronization processing unit 426 of the difference between the two points in time as the time Δt.

Immediately after the node device 400 is powered on, the time indicated by the timer 427 may be incorrect, but it is not erroneous to use the timer 427 in measuring the length of a time period. If a certain time, such as the time taken for the type judgment unit 421 to judge the type, is not negligible, the point in time at which the synchronization processing unit 426 receives a notification from the type judgment unit 421 may be used instead of the point in time at which the receiver 404 completes the reception of the synchronization frame 650.

In any of the methods exemplified above, the synchronization processing unit 426 may recognize the time Δt. Therefore, the synchronization processing unit 426 sets the time (t1+Δt) in the timer 427.

Then, in the next step S203, the synchronization processing unit 426 generates a new synchronization frame 650, and outputs it to the transmitter 403. Then, the transmitter 403 transmits the generated new synchronization frame 650 through the switch 402 and the antenna 401.

The synchronization processing unit 426 sets the node ID of the node device 400 as the GS and the LS of the new synchronization frame 650. The synchronization processing unit 426 also sets in the payload of the new synchronization frame 650 the time information indicating the time point obtained by adding a specified time (hereafter referred to as "α") to the time (t1+Δt) set in the timer 427.

The time α refers to the time (for example, includes the time taken by the synchronization processing unit 426 to generate the synchronization frame 650) taken to perform the process in the node device 400, and may be defined as, for example, a constant by the program 418. Therefore, the synchronization processing unit 426 may recognize the time α, and generate a new synchronization frame 650 including the time information indicating the time (t1+Δt+α).

After transmitting the synchronization frame 650, the node device 400 waits for the reception of the hello frame 620 in step S204. Concretely, the node device 400 waits until the forward processing unit 430 and the link management unit 433 is notified of the reception of the hello frame 620 from the type judgment unit 421.

When the device adjacent to the node device 400 (concretely the gateway 101 or another node device) transmits the hello frame 620, the receiver 404 receives the hello frame 620 through the antenna 401 and the switch 402. Then, the receiver 404 outputs the received hello frame 620 to the transmission/reception buffer area 411.

In addition, the receiver 404 notifies the type judgment unit 421 of the reception of the frame and the starting address of the received frame in the transmission/reception buffer area 411. Then, the type judgment unit 421 refers to the transmission/reception buffer area 411, and recognizes that the received frame is the hello frame 620. Then, the type judgment unit 421 notifies the forward processing unit 430 and the link management unit 433 of the reception of the hello frame 620 and the starting address of the hello frame 620 in the transmission/reception buffer area 411.

As described above, the node device 400 waits in step S204 until the forward processing unit 430 and the link management unit 433 receive the notification from the type judgment unit 421. When the forward processing unit 430 and the link management unit 433 receive the notification from the type judgment unit 421, the process proceeds to step S205.

In step S205, the forward processing unit 430 adds a new entry to the path information 414. Then, the forward processing unit 430 reads the received hello frame 620 from the transmission/reception buffer area 411, and sets the values in the fields of the new entry according to the read hello frame 620.

For convenience of explanation, it is assumed that the path information 414 has the format of the path information 414a and the path information 414b. Immediately after the node device 400 is powered on, the path information 414 has no entry.

Concretely, the forward processing unit 430 copies the node ID set as the reference point in the received hello frame 620 to the GD of the new entry. In addition, the forward processing unit 430 copies the value of the LS of the received hello frame 620 to the LD of the new entry. Furthermore, the forward processing unit 430 sets, in the hop count of the new entry, the value obtained by adding 1 to the hop count specified in the received hello frame 620. The forward processing unit 430 sets a specified default value (0.5 for example) in the evaluation value of the new entry.

By the process in step S205 above, the node device 400 may recognize that a device as the LS of the received hello frame 620 may be a candidate for the LD of the frame addressed to the device set as a reference point in the hello frame 620. For example, when the node device 125 receives the hello frame 624, the node device 125 may recognize that "the node device 113 may be candidate for the LD of the frame addressed to the gateway 101".

Then, in the next step S206, the link management unit 433 adds the new entry to the link information 417. The link information 417 also includes no entry immediately after the node device 400 is powered on.

Concretely, the link management unit 433 sets the value of the LS of the received hello frame 620 in the new entry. As a result, the node device 400 is enabled to recognize that there is a device (concretely, the gateway 101 or another node device) adjacent to the node device 400, and is also enabled to recognize the node ID of the adjacent device.

Then, in the next step S207, the hello frame generation unit 429 generates a new hello frame 620, and outputs it to the transmitter 403. Concretely, the hello frame generation unit 429 sets the node ID of the node device 400 as the LS and the GS of the new hello frame 620. In addition, the hello frame generation unit 429 refers to the new entry generated in step S205, copies the value of the GD of the new entry to the reference point of the new hello frame 620, and copies the value of the hop count of the new entry to the hop count of the new hello frame 620. Step S07 may be executed, for example, when the link management unit 433 which has completed the process in step S206 transmits a notification to the hello frame generation unit 429.

Then, in the next step S208, the transmission mode information 412 and the schedule information 415 are initialized. For example, the type judgment unit 421 which has detected the reception of the first hello frame 620 in step S204 may initialize the information in step S208.

Concretely, the transmission mode information 412 is initialized into the value indicating the normal mode. Also according to the present embodiment, the data transmission schedule in the schedule information 415 is fixedly determined in advance. Therefore, according to the present embodiment, the hello frame transmission schedule and the registration request schedule in the schedule information 415 are initialized in step S208.

For example, the type judgment unit 421 may refer to the timer 427, acquire the current time, extract the part of the second from the current time, and set the hello frame transmission schedule according to the extracted part of the second. For example, when the extracted part of the second is "2.000 seconds", the hello frame transmission schedule is set as the "2.000 seconds per minute" as with the schedule information 415a in FIG. 7.

In addition, the type judgment unit 421 may set a random time point as a registration request schedule using, for example, random numbers. Using the random numbers, a number of registration request frames 670 may be prevented from being simultaneously transmitted in the communication system 100, thereby realizing temporal load distribution for the transmission of the registration request frame 670.

Then, after the initialization in the above steps S201 through S208, the hello frame generation unit 429 judges whether or not a specified time has passed from the transmission of the previous hello frame 620 in step S209. For example, as with the schedule information 415a in FIG. 7, when the hello frame transmission schedule indicates one transmission per minute, the "specified time" refers to one minute. Obviously, when step S209 is first executed, since the transmission of the hello frame 620 has just been performed in step S207, the specified time has not passed.

If the specified time has already passed from the transmission of the previous hello frame 620, the process proceeds to step S210. On the other hand, if the specified time has not passed from the transmission of the previous hello frame 620, the process proceeds to step S211.

In step S210, the hello frame generation unit 429 generates a new hello frame 620, and outputs it to the transmitter 403. Then, the transmitter 403 transmits the hello frame 620 through the switch 402 and the antenna 401.

For example, it is assumed that the node device 400 is the node device 123 in FIG. 1, and the path information 414 of the node device 123 at the time point in which step S210 is executed is identical to the path information 414b in FIG. 7. In addition, according to the present embodiment, it is assumed that a specified GD is actually limited to the gateway 101.

Then, the hello frame generation unit 429 of the node device 123 selects the entry having the highest evaluation (that is, having the smallest evaluation value) in the entries of "ID 101" of the GD in the path information 414b. Then, the hello frame generation unit 429 sets the value of the hop count of the selected entry as the hop count of the new hello frame 620 generated in step S210. In addition, the hello frame generation unit 429 of the node device 123 sets "ID 101" for the reference point, and sets the "ID 123" as the ID of the node device 123 for both the GS and the LS.

For example, if a new hello frame 620 is transmitted in step S210 as described above, the process proceeds to step S211.

Then, in step S211, the registration request unit 432 refers to the timer 427 and the registration request schedule of the schedule information 415, and judges whether or not it is time to transmit the registration request frame 670. If it is time to transmit the registration request frame 670, the process proceeds to step S212. On the other hand, if it is not time to transmit the registration request frame 670, the process proceeds to step S218 in FIG. 14.

Steps S212 through S217 are related to the transmission of the registration request frame 670. First, in step S212, the registration request unit 432 generates a new registration request frame 670, outputs it to the transmission/reception buffer area 411, and requests the forward processing unit 430 to determine the LD. Then, the forward processing unit 430 determines the LD of the registration request frame 670.

Concretely, the registration request unit 432 sets the "ID 101" as the GD, and sets the node ID of the node device 400 as the GS and the LS for the new registration request frame 670. The registration request unit 432 sets "Reg" as the type. Furthermore, the registration request unit 432 refers to the individual information 416, and sets the IP address and the MAC address of the node device 400 recorded in the individual information 416 as the IP address and the MAC address of the registration request frame 670.

Then, the registration request unit 432 notifies the forward processing unit 430 of the starting address in the transmission/reception buffer area 411 of the registration request frame 670, and requests the forward processing unit 430 to determine the LD of the registration request frame 670. Then, the forward processing unit 430 reads the value of the GD of the registration request frame 670 from the transmission/reception buffer area 411, and searches the path information 414 for the entry having the highest evaluation in one or more entries in which the value same as the read value is set for the GD. Then, the forward processing unit 430 sets the value of the LD of the entry found as a result of the search in the LD field of the registration request frame 670 stored in the transmission/reception buffer area 411.

Upon determination of the LD as described above, the forward processing unit 430 notifies the channel specification unit 425 of the completion of the preparation for the transmission of the registration request frame 670. The forward processing unit 430 also may further notify the channel specification unit 425 of the starting address of the registration request frame 670 in the transmission/reception buffer area 411. Then, the channel specification unit 425 may appropriately notify the hop count recognition unit 428 and the transmitter 403 of the starting address in the later step.

Upon receipt of the notification from the forward processing unit 430, the channel specification unit 425 recognizes in the next step S213 whether or not the hop count between the node device 400 and the gateway 101 is 1 through the hop count recognition unit 428. That is, the hop count recognition unit 428 refers to the transmission/reception buffer area 411, reads the value of the LD of the registration request frame 670 to be transmitted, and judges whether or not the value of the LD is the ID of the gateway 101 (that is, "ID 101"). Namely, the hop count recognition unit 428 judges whether or not the GD is equal to the LD.

If the value of the read LD is "ID 101", the registration request frame 670 is to be transmitted directly to the gateway 101 without passing through another node device, and the hop count between the node device 400 and the gateway 101 is 1. If the hop count is 1, the node device 400 performs a transmission without the default channel ChA depending on the transmission mode. Therefore, when the value of the LD is "ID 101", the hop count recognition unit 428 notifies the channel specification unit 425 that the hop count is 1, and the process proceeds to step S214.

On the other hand, if the value of the read LD is not "ID 101", the registration request frame 670 is to be transmitted to the gateway 101 through another node device, and therefore the hop count between the node device 400 and the gateway 101 is 2 or more. If the hop count is 2 or more, the default channel ChA is constantly used as described above. Therefore, when the value of the LD is not the "ID 101", the hop count recognition unit 428 notifies the channel specification unit 425 that the hop count is 2 or more, and the process proceeds to step S215 in FIG. 14.

In step S214, the channel specification unit 425 refers to the transmission mode information 412 and judges whether or not the transmission mode information 412 indicates the congestion mode. If the transmission mode information 412 indicates the congestion mode, the process proceeds to step S216. On the other hand, if the transmission mode information 412 indicates the normal mode, the process proceeds to step S215.

In step S215, the channel specification unit 425 selects the default channel ChA, and specifies in the transmitter 403 the selected channel ChA as a transmission channel. Then, the process proceeds to step S217. In step S215, the channel specification unit 425 may further notify the transmitter 403 of the starting address of the registration request frame 670 in the transmission/reception buffer area 411.

In step S216, the channel specification unit 425 selects one channel at random from among the channels ChB through ChD other than the default channel ChA, and specifies the selected channel as the transmission channel to the transmitter 403. Then, the process proceeds to step S217. In step S216, the channel specification unit 425 may further notify the transmitter 403 of the starting address of the registration request frame 670 in the transmission/reception buffer area 411.

Depending on the embodiment, the channel specification unit 425 may select at random one channel from among the four channels ChA through ChD including the default channel ChA. However, as described above, it is preferable that the channel specification unit 425 excludes the channel ChA from the candidates for the transmission channel in step S216 for the following reasons.

For example, assume that the node device 400 is the node device 113, and the transmission mode is the congestion mode. Further assume that, when the transmission mode is the congestion mode, the node device 113 incidentally transmits a frame addressed to the gateway 101 using the channel ChA as a result of random selection.

Then, while the node device 113 transmits a frame addressed to the gateway 101 using the channel ChA, the node devices 125 and 126 which are to transmit the frame to the gateway 101 through the node device 113 are not capable of transmitting a frame because the node devices 125 and 126 perform a carrier sense for a transmission, and detects as a result that the channel ChA has been occupied.

Therefore, the node devices 125 and 126 have to wait for the completion of the transmission by the node device 113. then, while the node devices 125 and 126 wait for the available channel ChA, there is the possibility that frames to be transmitted are continuously accumulated in the node devices 125 and 126. The accumulation of frames may cause the deterioration of the congestion state.

Accordingly, it is preferable that the node device 113 excludes the channel ChA from the candidate for the transmission channel when the transmission mode is the congestion mode not to interfere with the transmission by the node devices 125 and 126.

In step S217, the transmitter 403 transmits the registration request frame 670 stored in the transmission/reception buffer area 411 through the switch 402 and the antenna 401 using the channel selected by the channel specification unit 425. After the transmission, the transmitter 403 deletes the registration request frame 670 from the transmission/reception buffer area 411. Then, the process proceeds to step S218.

In the next steps S218 through S224, the data frame 660 is transmitted. First in step S218, the data processing unit 431 refers to the timer 427 and the data transmission schedule of the schedule information 415, and judges whether or not it is time to transmit the data frame 660. If it is time to transmit the data frame 660, the process proceeds to step S219. On the other hand, if it is not yet time to transmit the data frame 660, the process proceeds to step S225.

Then, in step S219, the data processing unit 431 generates a new data frame 660, outputs it to the transmission/reception buffer area 411, and requests the forward processing unit 430 to determine the LD. Then, the forward processing unit 430 determines the LD of the data frame 660.

Concretely, the data processing unit 431 sets the "ID 101" for the GD, and the node ID of the node device 400 for the GS and the LS in the new data frame 660. Furthermore, the data processing unit 431 sets type as "Data". Furthermore, the data processing unit 431 generates appropriate application data, and stores the data in the payload of the data frame 660. For example, the data processing unit 431 may read the value from the sensor not illustrated in the attached drawings, and use the read value as application data.

Then, the data processing unit 431 notifies the forward processing unit 430 of the starting address in the transmission/reception buffer area 411 of the data frame 660, and requests the forward processing unit 430 to determine the LD of the data frame 660. Then, the forward processing unit 430 determines the LD based on the value of the GD of the data frame 660 as in step S212, and sets the value in the LD field of the data frame 660.

Then, the forward processing unit 430 notifies the channel specification unit 425 that the preparation for the transmission of the data frame 660 has been completed. Furthermore, the forward processing unit 430 may further notify the channel specification unit 425 of the starting address in the transmission/reception buffer area 411 of the data frame 660.

Upon receipt of the notification from the forward processing unit 430, the channel specification unit 425 recognizes through the hop count recognition unit 428 in the next step S220 whether or not the hop count between the node device 400 and the gateway 101 is 1. Concretely, the hop count recognition unit 428 reads the value of the LD of the data frame 660 as in step S213.

If the value of the LD is "ID 101", the hop count recognition unit 428 notifies the channel specification unit 425 that the hop count is 1, and the process proceeds to step S221. On the other hand, if the read value of the LD is not "ID 101", the hop count recognition unit 428 notifies the channel specification unit 425 that the hop count is 2 or more, and the process proceeds to step S222.

In step S221, the channel specification unit 425 refers to the transmission mode information 412, and judges whether or not the transmission mode information 412 indicates the congestion mode. If the transmission mode information 412 indicates the congestion mode, the process proceeds to step S223. On the other hand, if the transmission mode information 412 indicates the normal mode, the process proceeds to step S222.

In step S222, the channel specification unit 425 selects the default channel ChA, and specifies the selected channel ChA as a transmission channel for the transmitter 403. Then, the process proceeds to step S224.

In step S223 the channel specification unit 425 selects one channel at random from among the channels ChB through ChD other than the default channel ChA, and specifies the selected channel as a transmission channel for the transmitter 403. Then, the process proceeds to step S224. In steps S222 and S223, the channel specification unit 425 may further notify the transmitter 403 of the starting address as in steps S215 and S216.

In step S224, the transmitter 403 transmits the data frame 660 stored in the transmission/reception buffer area 411 through the switch 402 and the antenna 401 using the channel selected by the channel specification unit 425. After the transmission, the transmitter 403 deletes the data frame 660 from the transmission/reception buffer area 411. Then, the process proceeds to step S225.

In step S225, it is judged, for example, by the type judgment unit 421, whether or not there is a frame that has been received by the node device 400 and still remains unprocessed in the transmission/reception buffer area 411.

For example, upon receipt of a frame, the receiver 404 outputs it to the transmission/reception buffer area 411, and notifies the type judgment unit 421 of the head address of the received frame in the transmission/reception buffer area 411. Upon receipt of the notification from the receiver 404, the type judgment unit 421 performs the background process not illustrated in the attached drawings.

In the background process described above, the type judgment unit 421 reads the value of the field of the LD of the received frame. If the read value is neither the node ID of the node device 400 nor the broadcast address (the "BC" in FIGS. 8 and 9), the type judgment unit 421 deletes the received frame from the transmission/reception buffer area 411. That is, when a frame not related to the node device 400 is received, the type judgment unit 421 deletes the unrelated frame from the transmission/reception buffer area 411.

For example, according to the notification from the receiver 404 to the type judgment unit 421 and the result of the background process by the type judgment unit 421 as described above, the type judgment unit 421 may perform a judgment in step S225.

When a frame that has been received by the node device 400 and remains unprocessed exists in the transmission/reception buffer area 411, the process proceeds to step S226. On the other hand, if there is no frame that remains unprocessed after received by the node device 400, the process returns to step S209 in FIG. 13.

In step S226, the type judgment unit 421 refers to the transmission/reception buffer area 411, reads the type of the received frame, and judges whether or not the type is "Sync".

When the type is "Sync", the type judgment unit 421 notifies the synchronization processing unit 426 of the reception of the synchronization frame 650 and the starting address in the transmission/reception buffer area 411 of the synchronization frame 650. Then, the process proceeds to step S227. On the other hand, if the type is not "Sync", the process proceeds to step S229 in FIG. 15.

In step S227, the synchronization processing unit 426 sets the timer 427 based on the synchronization frame 650 as in step S202, and deletes the synchronization frame 650 from the transmission/reception buffer area 411 when the setting is completed.

In the next step S228, the synchronization processing unit 426 generates a new synchronization frame 650 as in step S203, and outputs it to the transmitter 403. Then, the transmitter 403 transmits the newly generated synchronization frame 650 through the switch 402 and the antenna 401.

Although omitted for simplicity of the explanation in FIG. 14, it is preferable that the synchronization processing unit 426 does not generate a new synchronization frame 650 in step S228 when a particular time has not passed from the transmission of the previous synchronization frame 650 for the following reason.

For example, the node devices 111 and 112 may receive the first synchronization frame 650 transmitted by the gateway 101, and the node device 111 may transmit the second synchronization frame 650 and the node device 112 may transmit the third synchronization frame 650 upon receipt of the first synchronization frame 650. Then, since the node devices 111 and 112 are adjacent to each other, the second synchronization frame 650 is also received by the node device 112, and the third synchronization frame 650 is also received by the node device 111.

To prevent the communication system 100 from being flooded with a large number of synchronization frames 650, it is preferable that the node device 111 does not newly transmit the fourth synchronization frame 650 upon receipt of the third synchronization frame 650. Similarly, it is preferable that the node device 112 does not newly transmit the fifth synchronization frame 650 upon receipt of the second synchronization frame 650.

As described above in step S228, it is preferable that the generation and transmission of a new synchronization frame 650 are omitted depending on the case. For example, the above-mentioned "particular time" may be the time period obtained by adding an appropriate margin to the RTT (round trip time) between adjacent node devices. It is preferable that the margin is determined based on the switching cycle of the switch 402, the processing time of the synchronization processing unit 426, etc. After step S228, the process returns to step S209 in FIG. 13.

In step S229 in FIG. 15, the type judgment unit 421 reads the LS of the frame received by the receiver 404 from the transmission/reception buffer area 411, and judges whether or not the value of the LS is the node ID (that is, "ID 101") of the gateway 101. If the value of the LS is "ID 101", the process proceeds to step S239. If the value of the LS is not the "ID 101", the process proceeds to step S230. The meaning of the conditional branch in step S229 is explained as follows.

Depending on the embodiment, the gateway 101 may forward (that is, relay) a frame. However, according to the present embodiment, the gateway 101 does not forward a frame. On the other hand, the node device 400 forwards the data frame 660 and the registration request frame 670 as appropriate.

In addition, although the gateway 101 according to the present embodiment generates and transmits a control frame such as the hello frame 620, the synchronization frame 650, etc., the gateway 101 does not transmit a non-control frame such as the data frame 660 etc. to any node device 400 in the communication system 100. On the other hand, the node device 400 transmits a non-control frame.

Furthermore, although the hello frame 620 and the synchronization frame 650 may be transmitted from the gateway 101 and the node device 400, the switchover instruction frame 630 and the restore instruction frame 640 are transmitted only from the gateway 101.

As described above, according to the present embodiment, there are differences between the gateway 101 and the node device 400 in the process to be performed and in the type and subtype of the frame to be transmitted. According to the present embodiment, to prevent the conditional branch in the subsequent process from becoming complicated, the type judgment unit 421 judges in step S229 whether or not the LS of the received frame is the gateway 101.

As described above, step S230 is executed when the value of the LS of the received frame is not the "ID 101". In step S230, the type judgment unit 421 refers to the transmission/reception buffer area 411, reads the type of the received frame, and judges whether or not the type is "Data" or "Reg". That is, the type judgment unit 421 judges whether or not the received frame may be multi-hop transmitted.

If the type is "Data" or "Reg", the type judgment unit 421 notifies the forward processing unit 430 of the type and the starting address of the received frame in the transmission/reception buffer area 411. Then, the process proceeds to step S231. On the other hand, if the type is neither "Data" nor "Reg", the process proceeds to step S250 in FIG. 17.

In step S231, the forward processing unit 430 refers to the transmission/reception buffer area 411 and reads the value of the GD of the received frame. Then, the forward processing unit 430 judges whether or not the value of the read GD is equal to the node ID (also referred to as a "self node ID") of the node device 400 itself.

When the two values are equal to each other, the final destination of the received frame is the node device 400 itself. In addition, according to the present embodiment, only the gateway 101 may be specified as the GD of the registration request frame 670. Therefore, when the two values are equal to each other, the received frame is the data frame 660.

Accordingly, when the two values are equal to each other, the forward processing unit 430 notifies the data processing unit 431 of the starting address of the received data frame 660 in the transmission/reception buffer area 411, and requests the data processing unit 431 to process the data frame 660. Then, the process proceeds to step S232.

On the other hand, when two values are different from each other, the forward processing unit 430 performs the process for forwarding the received frame. Then, the process proceeds to step S233.

In step S232, the data processing unit 431 refers to the transmission/reception buffer area 411, reads the payload of the received data frame 660, and appropriately processes the payload. Afterwards, the data processing unit 431 deletes the data frame 660 from the transmission/reception buffer area 411.

The contents of the payload are arbitrary depending on the embodiment. For example, when the payload includes the up data of the program 418, the data processing unit 431 may update the program 418. After the execution in step S232, the process returns to step S209 in FIG. 13.

Furthermore, in step S233, the forward processing unit 430 determines to which adjacent node device the received frame is forwarded based on the value of the read GD in step S231. That is, the forward processing unit 430 determines the value to be newly set in the LD field based on the value of the GD. In step S233, the forward processing unit 430 determines the LD with reference to the path information 414 as in step S212.

Then, the forward processing unit 430 overwrites the LD field of the frame received and stored in the transmission/reception buffer area 411 with the node ID determined as the LD. Furthermore, the forward processing unit 430 overwrites the LS field of the frame received and stored in the transmission/reception buffer area 411 with the node ID of the node device 400 itself.

In addition, the forward processing unit 430 calculates the FCS after the overwrite of the LD and the LS. Then, the forward processing unit 430 overwrites the FCS field of the frame received and stored in the transmission/reception buffer area 411 with the calculated FCS value.

For example, when the node device 400 is the node device 126 and the received frame is the data frame 661 in FIG. 9, the forward processing unit 430 of the node device 126 determines the node ID of "ID 113" of the node device 113 as the value of the new LD. Then, the forward processing unit 430 of the node device 126 overwrites the LD field of the data frame 661 with the "ID 113", and overwrites the LS field of the data frame 661 with the "ID 126".

Then, after the overwrite of the LD, the LS, and the FCS in step S233, the forward processing unit 430 notifies the channel specification unit 425 of the completion of the preparation for the transmission (concretely, transmission for forward) of the data frame 660 or the registration request frame 670. In addition, the forward processing unit 430 may also notify the channel specification unit 425 of the starting address in the transmission/reception buffer area 411 of the data frame 660 or the registration request frame 670.

Then, the channel specification unit 425 which has received the notification recognizes through the hop count recognition unit 428 in the next step S234 whether or not the hop count between the node device 400 and the gateway 101 is 1. Concretely, the hop count recognition unit 428 reads the value of the LD of the data frame 660 or the registration request frame 670 as in step S213.

Then, if the value of the LD is "ID 101", the hop count recognition unit 428 notifies the channel specification unit 425 that the hop count is 1, and the process proceeds to step S235. On the other hand, if the value of the LD is not "ID 101", the hop count recognition unit 428 notifies the channel specification unit 425 that the hop count is 2 or more, and then the process proceeds to step S236.

Then, in step S235, the channel specification unit 425 refers to the transmission mode information 412, and judges whether or not the transmission mode information 412 indicates the congestion mode. If the transmission mode information 412 indicates the congestion mode, the process proceeds to step S237. On the other hand, if the transmission mode information 412 indicates the normal mode, the process proceeds to step S236.

In step S236, the channel specification unit 425 selects the default channel ChA, and specifies the selected channel ChA as a transmission channel for the transmitter 403. Then, the process proceeds to step S238.

In step S237, the channel specification unit 425 selects one channel at random from among the channels ChB through ChD other than the default channel ChA, and specifies the selected channel as a transmission channel for the transmitter 403. Then the process proceeds to step S238. Also in steps S236 and S237, as in S215 and S216, the channel specification unit 425 may further notify the transmitter 403 of the starting address of the frame.

In step S238, the transmitter 403 transmits the data frame 660 or the registration request frame 670 stored in the transmission/reception buffer area 411 through the switch 402 and the antenna 401 using the channel selected by the channel specification unit 425. After the transmission, the transmitter 403 deletes the data frame 660 or the registration request frame 670 from the transmission/reception buffer area 411. Then, the process returns to step S209 in FIG. 13.

In step S229 above, when the value of the LS of the received frame is judged as the "ID 101", the type judgment unit 421 refers to the transmission/reception buffer area 411, and reads the type of the received frame in step S239. Then, the type judgment unit 421 judges whether or not the type is "Hello". That is, the type judgment unit 421 judges whether or not the received frame is the hello frame 610 in a broad sense.

When the type is "Hello", the process proceeds to step S241 to perform classification by subtype. When the type is any other than "Hello", the process proceeds to step S240.

Step S240 refers to the exception handling. In the present embodiment, when only the type illustrated in FIGS. 8 and 9 is used, the CPU 405 concretely performs in step S240 the error handling which is performed when a frame of illegal type is received.

However, obviously depending on the embodiment, a frame of a type other than those illustrated in FIGS. 8 and 9 may further defined. In this case, the CPU 405 performs in step S240 an appropriate process depending on the type of the frame judged by the type judgment unit 421. Therefore, the details of the step S240 are arbitrary depending on the embodiment. After executing step S240, the process returns to step S209 in FIG. 13.

In addition, in step S241, the type judgment unit 421 refers to the transmission/reception buffer area 411, reads the subtype of the received hello frame 610 in a broad sense, and judges whether or not the subtype is "Hello". That is, the type judgment unit 421 judges whether or not the received frame is the hello frame 620.

If the subtype is "Hello", the process proceeds to step S252 in FIG. 17. On the other hand, if the subtype is not "Hello", the process proceeds to step S242 in FIG. 16.

In step S242, the type judgment unit 421 judges whether or not the subtype read in step S241 is "Switch". That is, the type judgment unit 421 judges whether or not the received frame is the switchover instruction frame 630.

When the subtype is "Switch", the type judgment unit 421 notifies the mode change unit 424 that the switchover instruction frame 630 has been received.

In the present embodiment, the switchover instruction frame 630 which does not include a payload other than the subtype such as, concretely, the switchover instruction frame 631 is used. Therefore, the mode change unit 424 is not to refer to the received switchover instruction frame 630. Accordingly, when the subtype is "Switch", the type judgment unit 421 deletes the received switchover instruction frame 630 from the transmission/reception buffer area 411. Then, the process proceeds to step S246.

On the other hand, when the subtype is not "Switch", the process proceeds to step S243.

In step S243, the type judgment unit 421 judges whether or not the subtype read in step S241 is "Restore". That is, the type judgment unit 421 judges whether or not the received frame is the restore instruction frame 640.

When the subtype is "Restore", the type judgment unit 421 notifies the mode change unit 424 that the restore instruction frame 640 has been received.

In the present embodiment, the restore instruction frame 640 which does not include a payload other than the subtype such as, concretely, the restore instruction frame 641 is used. Therefore, the mode change unit 424 is not to refer to the received restore instruction frame 640. Accordingly, when the subtype is "Restore", the type judgment unit 421 deletes the received restore instruction frame 640 from the transmission/ reception buffer area 411. Then, the process proceeds to step S244.

On the other hand, when the subtype is not "Restore", the process proceeds to step S245.

In step S244, the mode change unit 424 sets the transmission mode information 412 as the value indicating the normal mode. Then, the process proceeds to step S209 in FIG. 13.

The process in step S244 causes no problem even if it is performed regardless of whether or not the hop count between the node device 400 and the gateway 101 is 1 in the transmission path used when the node device 400 transmits the frame in which the gateway 101 is specified as the GD. Therefore, in step S244, the mode change unit 424 sets the transmission mode information 412 in step S244 without confirming the hop count through the hop count recognition unit 428. Furthermore, as described above, since step S244 has no problem when it is executed by any node device 400, a simple restore instruction frame 640 which does not include a parameter other than the subtype such as the restore instruction frame 641 is used in the present embodiment.

Step S245 refers to the exception handling. In the present embodiment, when only the subtype illustrated in FIGS. 8 and 9 is used relating to the type of "Hello", concretely the CPU 405 performs the error handling which is performed when a frame of an illegal subtype is received in step S245.

However, obviously depending on the embodiment, a frame of the subtype other than that illustrated in FIGS. 8 and 9 may be further defined. In this case, the CPU 405 performs an appropriate process depending on the subtype of the frame judged by the type judgment unit 421 in step S245. Therefore, the details of step S245 are arbitrary depending on the embodiment. After the execution in step S245, the process returns to step S209.

In step S246, the mode change unit 424 inquires of the 428 whether or not the hop count between the node device 400 and the gateway 101 is 1. Then, the hop count recognition unit 428 searches the path information 414 for an entry in which the value of "ID 101", which is the LS of the received switchover instruction frame 630 (concretely the switchover instruction frame 631), is set as the GD.

Then, in the next step S247, the hop count recognition unit 428 identifies the entry having the highest evaluation (that is, having the smallest evaluation value) in one or more entries detected as a result of the search.

Furthermore, in the next step S248, the hop count recognition unit 428 judges on the entry identified in step S247 whether or not the values of the GD and the LD are equal to each other.

If the values of the GD and the LD are equal to each other, the hop count recognition unit 428 notifies the mode change unit 424 that the hop count between the node device 400 and the gateway 101 is 1. Then, the process proceeds to step S249. For example, when the node device 400 is the node device 111, the hop count recognition unit 428 of the node device 111 notifies the mode change unit 424 that the hop count is 1, and the process proceeds to step S249.

On the other hand, when the values of the GD and the LD are not equal to each other, the hop count recognition unit 428 notifies the mode change unit 424 that the hop count between the node device 400 and the gateway 101 is 2 or more. Then, the mode change unit 424 recognizes that "the transmission mode information 412 is not to be changed". Therefore, the process returns to step S209 in FIG. 13. For example, when the node device 400 is the node device 126, the hop count recognition unit 428 of the node device 126 notifies the mode change unit 424 that the hop count is 2 or more, and the process proceeds to step S209.

In step S249, the mode change unit 424 sets the transmission mode information 412 as the value indicating the congestion mode. Then, the process proceeds to step S209 in FIG. 13.

Figure 16:
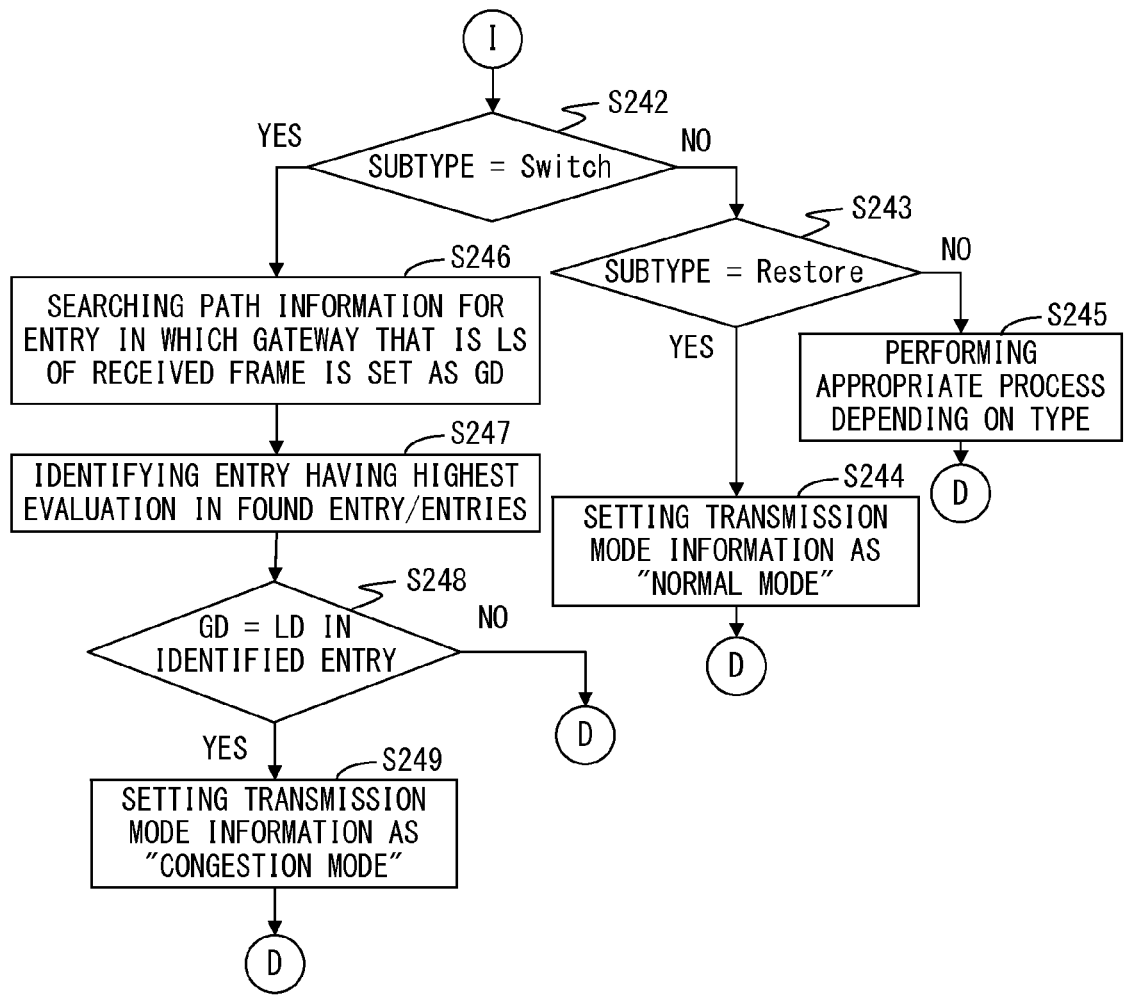
FIG. 16 is a flowchart (No. 4) of the process performed by the node device.

By the process in each step in FIG. 16, with the node device 400 (for example, the node devices 121 through 143) having the hop count of 2 or more from the gateway 101, the transmission mode information 412 constantly indicates the normal mode. That is, even when the switchover instruction frame 630 or the restore instruction frame 640 is received, the transmission mode information 412 does not indicate the congestion mode with the node device 400 having the hop count of 2 or more. On the other hand, with the node device 400 having the hop count of 1 from the gateway 101 (for example, the node devices 111 through 113), the transmission mode information 412 changes each time the switchover instruction frame 630 or the restore instruction frame 640 is received.

Step S250 in FIG. 17 is performed when the node device 400 receives the frame not to be multi-hop transmitted from the device other than the gateway 101 (that is, from another node device adjacent to the node device 400).

Concretely, in step S250, the type judgment unit 421 refers to the transmission/reception buffer area 411 and reads the type of the received frame. If the type if "Hello", the type judgment unit 421 further reads the subtype.

Then, the type judgment unit 421 judges whether or not the condition that the type is "Hello" and the subtype is "Hello" holds. That is, the type judgment unit 421 judges whether or not the received frame is the hello frame 620.

When the type is "Hello" and the subtype is "Hello", the process proceeds to step S252. On the other hand, when the condition that the type is "Hello" and the subtype is "Hello" does not hold, the process proceeds to step S251.

Step S251 refers to the exception handling. According to the present embodiment, when only the type and the subtype illustrated in FIGS. 8 and 9 are used, in step S251, concretely the error handling performed when a frame of an illegal type or an illegal subtype is received is performed by the CPU 405.

However, obviously depending on the embodiment, a frame of the type or the subtype other than those illustrated in FIGS. 8 and 9 may further be defined. In this case, the CPU 405 performs an appropriate process depending on the type and the subtype of the frame judged by the type judgment unit 421 in step S251. Therefore, the details of step S251 are arbitrary depending on the embodiment. After the execution in step S251, the process returns to step S209 in FIG. 13.

Step S252 is executed when the node device 400 receives the hello frame 620 from any device adjacent to the node device 400 (that is, the gateway 101 or another node device).

Concretely, in step S252, the type judgment unit 421 requests the link management unit 433 to update the link information 417 as appropriate according to the received hello frame 620. Upon receipt of the request, the type judgment unit 421 notifies the link management unit 433 of the starting address of the hello frame 620 in the transmission/reception buffer area 411.

Then, the link management unit 433 refers to the transmission/reception buffer area 411, and reads the value of the LS of the received hello frame 620. Then, the link management unit 433 searches the link information 417 for an entry in which the read value of the LS is set as the adjacent node.

In the next step S253, the link management unit 433 judges whether or not the entry has been found as a result of the search in step S252.

Since the case in which the entry has been found refers to the case in which the hello frame 620 has been received from the well known device as an adjacent node, it is not necessary to further add an entry to the link information 417. Therefore, the process proceeds to step S255.

On the other hand, the case in which the entry has not been found refers to the case in which the hello frame 620 has been received from an unknown device as an adjacent node. To add an entry, the process proceeds to step S254.

In step S254, the link management unit 433 adds to the link information 417 the new entry in which the value of the LS read from the hello frame 620 in step S252 is set as an adjacent node. Then, the process proceeds to step S255.

Then, in step S255, the type judgment unit 421 requests the hop count recognition unit 428 to update the hop count information 413 in the path information 414 as appropriate according to the received hello frame 620. At the request, the type judgment unit 421 notifies the hop count recognition unit 428 of the starting address of the hello frame 620 in the transmission/reception buffer area 411.

Then, the hop count recognition unit 428 refers to the transmission/reception buffer area 411, and reads the value of the LS of the received hello frame 620. Then, the hop count recognition unit 428 searches the path information 414 for an entry which satisfies both of the following conditions (I1) and (I2).

(I1) The GD is equal to the "ID 101" as the node ID of the gateway 101. That is, the GD is equal to the node ID specified as the reference point in the received hello frame 620.

(I2) The LD is equal to the value of the LS read from the hello frame 620.

Then, in the next step S256, the hop count recognition unit 428 judges whether or not the entry has been found as a result of the search in step S255.

The case in which the entry has been found refers to the case in which the hello frame 620 has been received from the device which may be selected as the LD when the node device 400 transmits the frame in which the gateway 101 is specified as the GD. In this case, the process proceeds to step S257 in order to update the hop count between the node device 400 and the gateway 101 along the path which passes through the device at the source (that is, the LS) of the received hello frame 620.

On the other hand, the case in which the entry has not been found refers to the case in which the hello frame 620 has received from the device which is not selected as the LD when the node device 400 transmits the frame in which the gateway 101 is specified as the GD. In this case, according to the present embodiment, the reception of the hello frame 620 has no influence on the hop count information 413 in the path information 414. Therefore, the hop count recognition unit 428 deletes the hello frame 620 from the transmission/reception buffer area 411, and the process returns to step S209 in FIG. 13.

In step S257, the hop count recognition unit 428 refers to the transmission/reception buffer area 411 and reads the hop count from the received hello frame 620. Then, the hop count recognition unit 428 sets the value obtained by adding 1 to the read hop count as the hop count of the entry found in the search in step S255. Afterwards, the hop count recognition unit 428 deletes the hello frame 620 from the transmission/reception buffer area 411, and the process returns to step S209 in FIG. 13.

As described above, the node device 400 executes initialization of steps S201 through S208, and then repeatedly performs the processes in steps S209 through S257.

The processes illustrated in FIGS. 13 through 17 include double countermeasures to prevent the node device 400 having the hop count of 2 or more from the gateway 101 from erroneously transferring to the congestion mode. That is, the first countermeasure is to check the hop count which is performed when the data frame 660 or the registration request frame 670 is transmitted as in steps S213, S220, and S234. The second countermeasure is to check the hop count which is performed when the switchover instruction frame 630 is received as in steps S246 through S248. In the above-mentioned present embodiment, the two countermeasures are used in combination because the path in the communication system 100 may change with a lapse of time.

For example, the node device 126 in FIG. 1 may receive the switchover instruction frame 630 or the restore instruction frame 640, but the hop count from the gateway 101 on the transmission path of the data frame 660 and the registration request frame 670 is 2.

However, in the transitional state until the path becomes stable, the node device 126 as the LD may select the gateway 101, not the node device 113. That is, in the transitional state, there is the possibility that the hop count of the node device 126 and the gateway 101 is 1.

Otherwise, with the fluctuation of the environment, the node device 126 may change the path information 414 (concretely, the evaluation value) in the node device 126, and as a result, the hop count between the node device 126 and the gateway 101 may be 1. For example, if there is a shielding object placed between the node device 113 and the node device 126, or the node device 113 is removed, then the path information 414 of the node device 126 may be changed.

How each node device 400 rewrites the path information 414 is arbitrary depending on the embodiment, but the node device 400 may rewrite the evaluation value of the path information 414 to follow the fluctuation of the environment.

For example, the node device 400 may lower the evaluation as the LD of the adjacent node device having a low reception frequency of the hello frame 620 (that is, may increase the evaluation value).

Otherwise, when the transmission of the data frame 660 is successfully performed in one operation, the node device 400 may increase the evaluation of the LD which is specified when the data frame 660 is transmitted (that is, the evaluation value may be reduced). On the other hand, when a retry is performed when the data frame 660 is transmitted, the node device 400 may lower the evaluation of the LD which has been specified when the data frame 660 is transmitted.

Furthermore, the node device 400 may monitor whether or not the transmitted data frame 660 may be returned to the node device 400 after looping in the communication system 100. If the data frame 660 is returned, the node device 400 may lower the evaluation of the LD specified when the data frame 660 is transmitted. The above-mentioned monitoring may be performed using a frame including the identification information for identifying a frame.

Anyway, with a changing the path information 414, the hop count between the node device 400 and the gateway 101 may be changed with a lapse of time. Therefore, to allow the node device 400 to appropriately operate even if the hop count changes, the processes illustrated in FIGS. 13 through 17 include double countermeasures.

The present invention is not limited to the above-mentioned embodiments. For example, the concrete numeric value and the concrete value such as the "Hello", etc. exemplified in the present specification and the attached drawings are only examples for convenience of explanation, and may be arbitrarily changed depending on the embodiment.

In addition, for example, relating to the conditions (F1) through (F3), some examples of comparing process are exemplified. However, the process of comparing with a threshold may be appropriately changed depending on the embodiment. That is, the process of comparison with a threshold may be the process of judging "whether or not the value to be compared exceeds a threshold", or the process of judging "whether or not the value to be compared is equal to or larger than the threshold".

Otherwise, the embodiment above may be variously changed from the view point below, for example. Variations above and below may be arbitrarily combined so far as no contradiction occurs.

The first viewpoint of the variation is related to the judgment reference of the congestion judgment unit 328. The congestion judgment unit 328 according to the embodiment above detects the congestion when all of the conditions (F1) through (F3) hold. However, depending on the embodiment, the congestion judgment unit 328 may judge that "the congestion has occurred" when one of the conditions (F1) through (F3) holds, or may judge that "the congestion has occurred" when two of the conditions (F1) through (F3) hold.

To avoid as much as possible the event that "the congestion judgment unit 328 does not detect the congestion while the congestion has actually occurred", the congestion judgment unit 328 may judge that "the congestion has occurred" when at least one of the conditions (F1) through (F3) holds. Otherwise, to avoid as much as possible the event that "the congestion judgment unit 328 detects the congestion while the congestion has not actually occurred", the congestion judgment unit 328 may judge that "the congestion has occurred" only when all of the conditions (F1) through (F3) hold.

In addition, the condition (F1) is an example of the condition for detecting the congestion using the difference in time, but the congestion judgment unit 328 may use another condition based on the temporal difference instead of the condition (F1).

For example, the congestion judgment unit 328 may judge whether or not the condition that "the data frame 660 has been collected from 80% or more of the registered node devices within 3 minutes from the time determined by the data collection schedule" holds instead of the judgment in step S132.

In this case, it is assumed that the temporal difference of "3 minutes" and the ratio of "80%" above are defined in the system parameters 313. Then, the congestion judgment unit 328 may judge whether or not the above-mentioned conditions hold as follows.

The congestion judgment unit 328 first judges whether or not the difference between the time acquired by the reception time acquisition unit 325 and the time determined by the data collection schedule exceeds 3 minutes. If the difference exceeds 3 minutes, the congestion judgment unit 328 refers to the data reception time field of the registered node information 314, and calculates the ratio of the registered node devices which have already received the data frame 660. If the calculated ratio is lower than 80%, the congestion judgment unit 328 judges the condition above holds.

Otherwise, the congestion judgment unit 328 may use the condition other than the condition exemplified above in detecting the congestion. For example, the condition that "the number of frames received in a unit time (for example, the number of frames received in the latest 10 seconds) exceeds a specified threshold defined by the system parameter 313" may be used as one of the conditions for judgment of the congestion. The above-mentioned specified threshold may be determined based on, for example, the bandwidth regulated by a physical layer protocol.

In addition, the congestion judgment unit 328 may use different conditions between the case in which the occurrence of congestion is detected and the case in which the recovery from congestion is detected.

For example, when the congestion judgment unit 328 sets the congestion flag 315*a* as True in step S136, a specified value may be subtracted from the value of the critical error rate of the system parameters 313*a*. Then, the congestion judgment unit 328 may add the above-mentioned specified value to the value of the critical error rate in step S140.

For example, when the specified value is "20%", the error rate is compared with 30% (=50%−20%) if step S135 is executed when the value of the congestion flag 315a is True. If step S135 is executed when the value of the congestion flag 315a is False, the error rate is compared with 50%.

If the load is distributed to a plurality of channels after the occurrence of congestion, it is expected that the error rate is gradually reduced as a result of the load distribution. Therefore, by the rewrite of the critical error rate above, the congestion judgment unit 328 may indirectly detect the level of the moderation of the congestion through the error rate.

When the congestion flag 315a is False, the RSSI calculation unit 323 calculates the RSSI based on the output from the receiver 305A for the default channel ChA in step S122.

On the other hand, when the congestion flag 315a is True, the RSSI calculation unit 323 may calculate the RSSI based on the output from the receiver which has received a frame. Otherwise, when the congestion flag 315a is True, the RSSI calculation unit 323 may calculate the RSSI of the default channel ChA based on the output from the receiver 305A independent of the receiver which has received the frame in step S122.

For example, assume that the receiver 305B has received a frame when the congestion flag 315a is True. In this case, the RSSI calculation unit 323 may calculate the RSSI of the channel ChB to allow the congestion judgment unit 328 to judge whether or not the channel ChB is congested after the distribution of the load to a plurality of channels.

If the moderation of the congestion is insufficient even with the load distributed, it is almost certain that the channel ChA is congested when it is assumed that the load is concentrated on the channel ChA. Therefore, when the congestion flag 315a is True and the receiver 305B receives a frame, the RSSI calculation unit 323 may calculate the RSSI of the channel ChB.

Otherwise, even when the congestion flag 315a is True and the receiver 305B receives a frame, the RSSI calculation unit 323 may calculate the RSSI of the default channel ChA based on the output from the receiver 305A. In this way, the congestion judgment unit 328 is able to judge whether or not the communication load of the channel ChA is still heavy.

For example, the frame transmitted from the node device 126 to the node device 113 through the channel ChA may be received by the gateway 101. Therefore, when the traffic of the node device 126 is heavy, the transmission from the node device 126 may be the cause of the congestion. Thus, the RSSI calculation unit 323 may constantly calculate the RSSI of the default channel ChA without the channel through which the frame has actually be received when the congestion flag 315a is True.

Otherwise, when the congestion flag 315a is True, the RSSI calculation unit 323 may calculate the RSSI of all channels ChA through ChD, and the congestion judgment unit 328 may make a judgment based on the RSSI of all channels ChA through ChD.

The second viewpoint of the variation is related to the method of recognizing the hop count by the hop count recognition unit 428. For example, as with the switchover instruction frames 632 through 634 in FIG. 8, the hop count recognition unit 428 may recognize the hop count as follows in the embodiment in which the switchover instruction frame 630 having the node ID included in the payload is used.

That is, the hop count recognition unit 428 refers to the transmission/reception buffer area 411 and reads the payload of the switchover instruction frame 630. Then, the hop count recognition unit 428 judges whether or not the node ID of the node device 400 is included in the read payload.

Then, when the node ID of the node device 400 is included in the read payload, the hop count recognition unit 428 recognizes that the hop count between the node device 400 and the gateway 101 is 1. On the other hand, if the node ID of the node device 400 is not included in the read payload, the hop count recognition unit 428 recognizes that the hop count is 2 or more.

The hop count recognition unit 428 may notify the mode change unit 424 and the channel specification unit 425 of the result of the recognition above.

Furthermore, whether or not the value of the LD of the frame to be transmitted is "ID 101" is judged insteps S213, S220, and S234 to judge whether or not the hop count between the node device 400 and the gateway 101 is 1.

However, depending on the embodiment, whether the hop count between the node device 400 and the gateway 101 is 1 or not may be judged depending on whether the value of the hop count of the entry selected from the path information 414 in determining the LD is 1 or not. The hop count of the entry in the path information 414 is updated to reflect the latest path by executing steps S252 through S257. Therefore, a judgment may be made based on the hop count of the entry in the path information 414.

The third viewpoint of the variation is related to the frequency of re-selecting a channel by the channel specification unit 425. According to the processes in FIGS. 13 through 17, in the node device 400 at the first hop from the gateway 101, the channel specification unit 425 re-selects a channel each time the data frame 660 or the registration request frame 670 is transmitted when the transmission mode information 412 indicates the congestion mode.

However, depending on the embodiment, the channel specification unit 425 may constantly select the default channel ChA in the congestion mode relating to the registration request frame 670. For example, in the embodiment in which the registration request schedule of the schedule information 415 about each of the node devices 111 through 143 in the communication system 100 is temporally distributed, the registration request frame 670 may be constantly transmitted through the default channel ChA.

In addition, the channel specification unit 425 of the node device 400 at the first hop from the gateway 101 may re-select the transmission channel once each time F (F≥1) data frames 660 are transmitted when the transmission mode information 412 indicates the congestion mode. However, obviously the smaller the value of F, the more preferable the value is, and the case in which F=1 is the most preferable as illustrated in FIGS. 13 through 17

That is, the larger the value of F, the more easily the state in which "a plurality of node devices 400 at the first hop from the gateway 101 incidentally and simultaneously select the same channel as a transmission channel" occurs. That is, the larger the value of F, the more easily a collision takes place, thereby reducing the effect of moderating the congestion. Therefore, "F=1" is the most preferable.

Even when the value of F is the minimum value of 1, the frequency at which the transmission channel is switched is lower than the frequency at which a transmission channel is switched in the case where the frequency hopping, which is adopted by Bluetooth (registered trademark), is used. However, to realize the frequency hopping, it is desired to perform the process such as negotiation etc. for determination of a hopping pattern in advance. On the other hand, according to the embodiment above, since the channel specification unit 425 of each node device 400 independently (that is, autonomously) selects a transmission channel at random, an overhead such as a negotiation does not occur. It is a merit of the above embodiment that excess communications are not required for the negotiation when congestion occurs.

In a cellular system, a terminal (for example, a mobile telephone) may switch the transmission channel according to an instruction from the base station. However, the terminal does not autonomously determine the transmission channel, but uses a channel specified by the base station. Therefore, the channel switch in the embodiment above in which the channel specification unit 425 of the node device 400 independently (that is, autonomously) selects a transmission channel is different from the channel switch in the cellular system.

The fourth viewpoint of the variation is related to the omission of the synchronizing process. In the embodiment above, the congestion judgment unit 328 makes a judgment based on time in step S132 in FIG. 12. Therefore, to allow the congestion judgment unit 328 to appropriately make a judgment, the process of synchronizing the time indicated by the timer of each device in the communication system 100 is performed.

However, depending on the embodiment, the congestion judgment unit 328 may judge the congestion when both of the conditions (F2) and (F3) hold, and the condition (F1) may be ignored. If the condition (F1) is not used, the timer of each device in the communication system 100 is not to be necessarily synchronized. Therefore, when the condition (F1) is not used (that is, the condition (F1) is ignored), the synchronizing process using the synchronization frame 650 may be omitted.

For example, the data transmission schedule of each of the node devices 111 through 143 in the communication system 100 may be different. In this case, it is probable in an embodiment that the congestion judgment unit 328 does not use the condition (F1).

When data transmission schedules are different, there is a low probability that the congestion occurs. However, when a large number of node devices 400 are included in the communication system 100, the congestion may incidentally occur. Therefore, the congestion judgment unit 328 may judge the case in which both of the conditions (F2) and (F3) hold as the congestion.

The fifth viewpoint of the variation is related to the update of the registered node information 314. In the embodiment above, the registration request frame 670 which requests a registration in the gateway 101 is used. Depending on the embodiment, the frame (referred to as a "deletion request frame", for convenience) which requests a deletion of the registration in the gateway 101 may be further used.

For example, when the second gateway is added to the communication system 100, apart of the node devices 111 through 143 may transmit a deletion request frame to the gateway 101, and transmit the registration request frame 670 to the second gateway. Upon receipt of the deletion request frame, the gateway 101 deletes the entry corresponding to the node device 400 of the GS of the deletion request frame from the registered node information 314.

In addition, according to the embodiment above, the registration processing unit 327 updates the registered node table 314*a* in steps S112 through S114 when the receiver 305A receives the hello frame 620. However, the registration processing unit 327 may update the "1-hop" field of the registered node table 314*a* when the receiver 305A receives the data frame 660 or the registration request frame 670. Thus, the registration processing unit 327 may reflect the latest information about the hop count up to each node device 400 in the registered node table 314*a*.

That is, the registration processing unit 327 may set the "1-hop" field in the entry having the same node ID as the GS of the received frame as True if the GS is equal to the LS in the received data frame 660 or registration request frame 670. On the other hand, if the GS is not equal to the LS, the registration processing unit 327 may set the "1-hop" field as False.

The sixth viewpoint of the variation is related to the order of processes. The order of the processes illustrated in the flowcharts in FIGS. 10 through 17 is an example. So far as there is no contradiction, the order of the steps may be appropriately changed depending on the embodiment, and some processes may be parallelized.

For example, in FIGS. 10 through 12, the gateway 101 performs the processes relating to the transmission in steps S102 through S105, and then processes are performed in steps S107 through S140 when the reception is made. However, the gateway 101 may first perform the process upon the reception, and then perform the process relating to the transmission. The node device 400 may first perform the process upon the reception, and then perform the process relating to the transmission as well.

The order of steps S132 through S135 may be arbitrarily changed. Even if the order of steps S132 through S135 is changed, the congestion judgment unit 328 is able to judge whether or not all of the conditions (F1) through (F3) hold.

The seventh viewpoint of the variation is related to the forward of a frame by the gateway 101. In the embodiment above, the gateway 101 does not forward the frame. Therefore, each node device 400 does not specify the gateway 101 as the LD except the case in which the gateway 101 is the GD in transmitting a frame.

However, obviously, depending on the embodiment, the gateway 101 may forward the frame as with the node device 400. In addition, the gateway 101 may generate the data frame 660 addressed to any node device 400.

That is, the CPU 306 of the gateway 101 may perform the processes similar to those performed by the forward processing unit 430 and the link management unit 433. Then, the memory 307 of the gateway 101 may further hold the information in the same format as the path information 414 and the link information 417, and also may be used as a transmission buffer.

The eighth viewpoint of the variation is related to the format of a frame. The format of a frame may be varied depending on the embodiment. According to the variation of the format of a frame, the steps of the flowcharts in FIGS. 10 through 17 may be appropriately changed.

For example, if the types indicating a switchover instruction and a restore instruction are defined, the subtypes illustrated as the examples in FIGS. 8 and 9 may be undefined.

Then, the types or subtypes other than the exemplification in FIGS. 8 and 9 may be further defined. Various frames may further include the fields other than those exemplified in FIGS. 8 and 9. The sequential order of the fields may be also arbitrarily determined depending on the embodiment.

For example, although the detailed explanation is omitted in the above description, an "ACK frame" may be used as a frame of a specific type for a transmission of an ACK signal. In this case, each frame may include an identification information field for unique identification of a frame for association between a frame to which the ACK frame is to be returned (for example, a data frame) and an ACK frame.

The ninth viewpoint of the variation is related to a check using the FCS. In the embodiment above, only the FCS error in the data frame 660, which is related to the error rate used in the judgment by the congestion judgment unit 328, is explicitly explained. However, depending on the embodiment, the FCS check unit 324 may detect the presence/absence of an error using the FCS relating to the frame of another type. Then, the FCS check unit 324 may calculate the error rate in the entire frames of all types.

In addition, the error detecting process using the FCS may be performed at a stage earlier than step S125 in FIG. 11. For example, immediately after the notification of the reception of the frame from any of the receivers 305A through 305D, the FCS check unit 324 may detect the presence/absence of the error using the FCS. Furthermore, only when there is no error, the FCS check unit 324 may request the transmitter 303 to return the above-mentioned ACK frame. On the other hand, when there is an error, the FCS check unit 324 may delete the erroneous frame from the reception buffer area 312.

Obviously, each node device 400 may also check whether or not there is an error in the received frame using the FCS of the received frame.

The tenth viewpoint of the variation is related to the method of calculating the error rate by the FCS check unit 324. In FIGS. 11 and 12, the calculating method using two counters is exemplified, but obviously the calculating method for an error rate may be appropriately varied depending on the embodiment.

For example, the FCS check unit 324 may calculate the error rate using the ring buffer for storing the specified number of flags. The value of the above-mentioned "specified number" is arbitrary, but for convenience of explanation, for example, it is assumed to be 256. Then, for example, the FCS check unit 324 may calculate the error rate as follows.

When the FCS error is detected, the FCS check unit 324 sets the flag pointed to by the buffer pointer of the ring buffer as True. When the FCS error is not detected, the flag pointed to by the buffer pointer is set as False. After a value is set in the flag, the FCS check unit 324 increments the buffer pointer. Then, the FCS check unit 324 may obtain the error rate in the last received 256 frames by dividing the number of flags having the value of True by 256.

The outline of various embodiments described above is summarized as follows.

The communication system 100 in FIG. 1 is a concrete example of a wireless communication system including a control device and a plurality of node devices. The control device includes a first receiver, a first processor, and a first transmitter, and the first processor operates as a judgment unit and a control unit. Each of a plurality of node devices includes a second receiver, a second transmitter, and a second processor. The second processor operates as a recognition unit and a channel switch unit.

That is, the gateway 101 illustrated in FIGS. 1 and 2 are concrete examples of the control device. The node devices 111 through 143 in FIG. 1 and the node device 400 illustrated in FIG. 3 are concrete examples of the node devices in the above-mentioned wireless communication system.

The above-mentioned first receiver is configured so that information may be simultaneously received from a plurality of radio frequency channels. For example, in the example in FIG. 2, the first receiver is realized by an antenna 301, a switch 302, a splitter 304, and receivers 305A through 305D, and may receive the information of a frame format simultaneously from the four channels ChA through ChD.

The above-mentioned judgment unit (that is, the first processor) judges whether or not the first channel in the plurality of radio frequency channels is congested. For example, in the example in FIG. 2, the above-mentioned judgment unit is realized by the congestion judgment unit 328. The concrete example of the first channel is a default channel ChA in the example in FIG. 2.

When the judgment unit judges that the first channel is congested, the control unit above (that is, the first processor) generates switchover instruction information. The control unit is realized by the instruction issue unit 329, for example, in the example illustrated in FIG. 2.

The switchover instruction information generated by the control unit is to instruct at least one of the plurality of node devices to switch a transmission channel from the first channel to another channel. "At least one of the plurality of node devices" concretely indicates a device having the hop count of 1 from the control device in the plurality of node devices. Concrete examples of the switchover instruction information are the switchover instruction frames 630 through 634 in FIG. 8.

The above-mentioned first transmitter transmits switchover instruction information. The first transmitter is realized by the transmitter 303, the switch 302, and the antenna 301, for example in the example in FIG. 2.

The above-mentioned second receiver receives the information from the control device or another node device through the first channel. For example, in the example in FIG. 3, the second receiver is realized by the antenna 401, the switch 402, and the receiver 404, and receives the information in the frame format through the default channel ChA.

The above-mentioned second transmitter transmits the information addressed to the control device through the channel specified as a transmission channel in a plurality of radio frequency channels. For example, in the example in FIG. 3, the second transmitter is realized by the transmitter 403, the switch 402, and the antenna 401. In the example in FIG. 3, the second transmitter transmits the information in the frame format addressed to the gateway 101 (that is, the "ID 101" is specified as the GD) through the channel specified as a transmission channel by the channel specification unit 425 in the channels ChA through ChD.

The above-mentioned recognition unit (that is, the second processor) recognizes whether or not the hop count from the control device is 1. The recognition unit is realized by, for example, the hop count recognition unit 428 in the example in FIG. 3.

The above-mentioned channel switch unit (that is, the second processor) selects the second channel other than the first channel, specifies the second channel as a transmission channel for the second transmitter in the first case, and specifies the first channel as a transmission channel for the second transmitter in the second case other than the first case. The "first case" refers to the case in which the second receiver receives the switchover instruction information from the control device, and the recognition unit recognizes that the hop count is 1.

For example, in the example in FIG. 3, the channel switch unit is realized by the channel switch unit 423 including the mode change unit 424 and the channel specification unit 425. For discrimination between the first case and the second case, the transmission mode information 412 is referenced, and the LD of the transmitted frame is referenced.

The judgment unit may judge whether or not the first channel is congested using the difference between the schedule predetermined for transmission of the information from a plurality of node devices to the control device, and the time in which the information is actually transmitted from the plurality of node devices to the control device. The concrete example of the judgment is step S132.

Otherwise, the judgment unit may judge whether or not the first channel is congested using the number of node devices registered in the control device that the information is transmitted to the control device in the plurality of node devices. The concrete example of the judgment is step S133.

Otherwise, the judgment unit may judge whether or not the first channel is congested using the combination of reception power in the control device and the error rate of the information transmitted from the plurality of node devices and the control device. The concrete example of the judgment is steps S134 and S135.

In the first case, the channel switch unit may re-select one of the plurality of radio frequency channels as a new second channel each time a transmission from the second transmitter is performed. One of the concrete examples of the process of re-selecting the second channel for each transmission is any of the processes insteps S212 through S217 for transmission of the registration request frame 670. Another example is any of the processes in steps S219 through S224 for transmission of the data frame 660. A further example is any of the processes in steps S233 through S238 for transmission of the data frame 660 or the registration request frame 670.

The channel switch unit may re-select the second channel at random as in steps S216, S223, and S237.

Otherwise, the channel switch unit may re-select the second channel according to the round robin algorithm.

It is preferable that the channel switch unit determines at random the starting point channel in the round robin algorithm. Otherwise, the control device may specify a different channel for each node device as a starting point in the switchover instruction information. In either case, the probability that the channel switch units of the plurality of node devices simultaneously and incidentally select the same channel as the second channel may be reduced. That is, since the distribution of the starting point suppresses the occurrence of a collision, the congestion may be effectively moderated.

Otherwise, the channel switch unit may re-select the second channel depending on the use state of each of the plurality of radio frequency channels. For example, the channel switch unit may inquire of the interference detection unit 422 about the use state of the plurality of radio frequency channels when re-selecting the second channel.

For example, when the interference detection unit 422 detects that "the channel ChB is used, but the channels ChC and ChD are not used", the channel switch unit may select the second channel from among the channels ChC and ChD. That is, the channel switch unit may remove the channel ChB which is being used (that is, has larger reception power) from the candidate for the second channel.

Otherwise, depending on the reception power of each of the channels ChB through ChD detected by the interference detection unit 422, the weighting process is performed so that the higher the reception power of the channel, at the lower frequency the channel is selected as the second channel, thereby allowing the channel switch unit to select the second channel.

Furthermore, the switchover instruction information may include the channel specification information for specifying the second channel as with, for example, the switchover instruction frame 634. Then, the channel switch unit may select the second channel according to the channel specification information. For example, the channel specification unit 425 of the node device 111 which has received the switchover instruction frame 634 may select the channel ChB specified by the channel specification information instead of selecting the channel at random in steps S216, S223, and S237.

Otherwise, the switchover instruction information may include the prohibition information for specifying the prohibited channel to be excluded from the candidate for the second channel in a plurality of radio frequency channels as with, for example, the switchover instruction frame 633. The prohibited channel in the switchover instruction frame 633 is the channel ChC. Then, the channel switch unit may select the channel other than the prohibited channel as the second channel according to the prohibition information.

For example, when the congestion judgment unit 328 detects the congestion, the gateway 101 may monitor the reception power of the channels ChB through ChD. The monitoring may be performed by, for example, the RSSI calculation unit 323. Then, for example, when the reception power of the channel ChC is equal to or exceeds a specified threshold, the instruction issue unit 329 may generate the switchover instruction frame 633 for specifying the channel ChC as a prohibited channel.

Furthermore, the judgment unit may repeatedly perform a judgment as to whether or not the first channel is congested. Then, in the new judgment performed after a temporary judgment by the judgment unit that the first channel is congested, the control unit may generate the restore instruction information for an instruction to return the transmission channel to the first channel when the judgment unit judges that the congestion has been solved. The restore instruction information is also transmitted by the first transmitter.

In the examples in FIGS. 10 through 12, the congestion judgment unit 328 performs a judgment each time the data frame 660 is received, but the frequency of the judgment by the congestion judgment unit 328 may be different depending on the embodiment. For example, the congestion judgment unit 328 may repeatedly perform the process for periodically detecting the congestion independently of the process relating to a transmission and a reception.

Furthermore, when the second receiver receives the restore instruction information, the channel switch unit may return to the first channel (that is, the default channel) the transmission channel to be specified for the second transmitter. The concrete examples of the restore instruction information are the restore instruction frames 640 and 641 in FIG. 9.

The control device may further include a registration processing unit for recognizing one or more node devices having the hop count of 1 from the control device using the information received by the first receiver, and registering the one or more recognized node devices. That is, the above-mentioned first processor may further operate as a registration processing unit.

For example, the registration processing unit 327 in FIG. 3 registers the node device 400 having the hop count of 1 from the gateway 101 in step S113 using the received hello frame 620. Otherwise, the registration processing unit 327 may judge whether or not the GS and the LS of the received frame are equal to each other when the data frame 660 or the registration request frame 670 are received. When the GS and the LS are equal to each other, the registration processing unit 327 may register the node device 400 which is the source of the transmission of the received frame as the "node device having the hop count of 1 from the gateway 101".

Then, when one or more node devices having the hop count of 1 from the control device are registered as described above, the control unit may include in the switchover instruction information the identification information for identifying the one or more node devices registered by the registration processing unit. For example, the switchover instruction frames 632 through 634 include the node IDs as the identification information for identifying the node devices 111 through 113 registered as the node devices 400 having the hop count of 1 from the gateway 101.

When the switchover instruction information includes the identification information, the recognition unit may recognize whether or not the hop count from the control unit is 1 as follows when the second receiver receives the switchover instruction information. That is, the recognition unit may recognize that "the node device has the hop count of 1 from the control device if the node device provided with the recognition unit is identified by the identification information included in the switchover instruction information".

For example, when the switchover instruction frame 630 including the node ID such as the switchover instruction frames 632 through 634 is received, the hop count recognition unit 428 may judge whether or not the node ID of the node device 400 is included in the switchover instruction frame 630. The hop count recognition unit 428 is able to recognize that "if the node ID of the node device 400 is included in the switchover instruction frame 630, the hop count is 1; otherwise, the hop count is 2 or more".

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system comprising:
   a control device; and
   a plurality of node devices, wherein
   the control device includes:
      a first receiver configured to be able to receive information simultaneously from a plurality of radio frequency channels;
      a first processor that
         judges whether a first channel in the plurality of radio frequency channels is congested, and
         generates switchover instruction information to instruct at least one of the plurality of node devices to switch a transmission channel from the first channel to another channel, when the first channel is judged to be congested; and
      a first transmitter that transmits the switchover instruction information, and
   each of the plurality of node devices includes:
      a second receiver that receives information from the control device or another node device through the first channel;
      a second transmitter that transmits information addressed to the control device through a channel specified as the transmission channel in the plurality of radio frequency channels;
      a memory that stores path information, transmission information or reception information; and
      a second processor that
         recognizes whether a hop count from the control device is one based on identification information for identifying whether the hop count from the control device is one, the identification information being included in the path information, header information of the transmission information, header information of the reception information or the switchover instruction information,
         selects a second channel other than the first channel in a first case in which the second receiver receives the switchover instruction information from the control device and the hop count is recognized as one,
         specifies the second channel as the transmission channel for the second transmitter in the first case, and
         specifies the first channel as the transmission channel for the second transmitter in a second case in which the first case does not hold.

2. The wireless communication system according to claim 1, wherein
   the first processor judges whether the first channel is congested using at least one of:
      a difference between a schedule specified in advance for transmission of the information from the plurality of node devices to the control device and a time point at which the information is actually transmitted from the plurality of node devices to the control device;
      a number of node devices which are among the plurality of node devices and are registered with the control device as transmitting the information to the control device; and
      a combination of reception power in the control device and an error rate of the information transmitted from the plurality of node devices to the control device.

3. The wireless communication system according to claim 1, wherein
   in the first case, the second processor re-selects one of the plurality of radio frequency channels newly as the second channel each time a transmission is made from the second transmitter, and
   re-selection of the second channel in the first case is performed at random, according to a round robin algorithm, or based on a use state of each of the plurality of radio frequency channels.

4. The wireless communication system according to claim 1, wherein
   the switchover instruction information includes channel specification information for specifying the second channel, and
   the second processor selects the second channel according to the channel specification information.

5. The wireless communication system according to claim 1, wherein
   the switchover instruction information includes prohibition information for specifying a prohibited channel to be excluded from a candidate for the second channel in the plurality of radio frequency channels, and
   the second processor selects a channel other than the prohibited channel as the second channel according to the prohibition information.

6. The wireless communication system according to claim 1, wherein
   the first processor repeatedly judges whether the first channel is congested,
   when the first processor judges that the congestion has been solved in a new judgment performed after a previous judgment in which the first channel has been judged to be congested, the first processor generates restore instruction information to give an instruction to restore the transmission channel to the first channel,
   the first transmitter transmits the restore instruction information, and
   the second processor of each of the plurality of node devices restores the transmission channel specified for the second transmitter to the first channel when the second receiver receives the restore instruction information.

7. The wireless communication system according to claim 1, wherein
the identification information includes node information for identifying each of one or more node devices whose hop count from the control device is one, and
when the second receiver of a certain node device receives the switchover instruction information and the certain node device is identified by the node information, the second processor of the certain node device recognizes that the hop count of the certain node device from the control device is one.

8. A control device used in a wireless communication system including a plurality of node devices, the control device comprising:
a receiver configured to be able to receive information simultaneously from a plurality of radio frequency channels;
a processor that
judges whether a first channel in the plurality of radio frequency channels is congested by using at least statistics information of time points at which the control device receives the information transmitted from the plurality of node devices or a combination of reception power in the control device and an error rate of the information transmitted from the plurality of node devices to the control device, and
when judging that the first channel is congested, generates switchover instruction information for instructing one or more node devices whose hop count from the control device is one in the plurality of node devices to switch a transmission channel used in transmitting information to the control device from the first channel to a second channel; and
a transmitter that transmits the switchover instruction information.

9. The control device according to claim 8, wherein
using the information received by the receiver, the processor recognizes the one or more node devices whose hop count is one,
the processor registers the one or more recognized node devices, and the processor includes identification information for identifying the one or more registered node devices in the switchover instruction information.

10. A node device comprising:
a receiver that receives information from a control device or another node device by wireless communication through a first channel;
a transmitter that transmits information addressed to the control device through a channel specified as a transmission channel in a plurality of radio frequency channels including the first channel;
a memory that stores path information, transmission information or reception information; and
a processor that
recognizes whether a hop count from the control device is one based on identification information for identifying whether the hop count from the control device is one, the identification information being included in the path information, header information of the transmission information, header information of the reception information or switchover instruction information for an instruction to switch the transmission channel from the first channel to another channel,
selects a second channel other than the first channel for each transmission from the transmitter in a first case in which the hop count is recognized as one and the receiver receives, from the control device, the switchover instruction information,
specifies the second channel as the transmission channel for the transmitter for each transmission from the transmitter in the first case, and
specifies the first channel as the transmission channel for the transmitter in a second case in which the first case does not hold.

* * * * *